(12) United States Patent
Matsui et al.

(10) Patent No.: US 6,593,266 B1
(45) Date of Patent: Jul. 15, 2003

(54) OLEFIN POLYMERIZATION CATALYST AND POLYMERIZATION PROCESS

(75) Inventors: Shigekazu Matsui, Yamaguchi (JP); Kazutaka Tsuru, Yamaguchi (JP); Masatoshi Nitabaru, Yamaguchi (JP); Terunori Fujita, Yamaguchi (JP); Makoto Mitani, Yamaguchi (JP); Yukihiro Takagi, Yamaguchi (JP); Takashi Nakano, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/291,950

(22) Filed: Apr. 15, 1999

(30) Foreign Application Priority Data

| Apr. 16, 1998 | (JP) | 10-106440 |
| Jun. 3, 1998 | (JP) | 10-155076 |
| Sep. 7, 1998 | (JP) | 10-253071 |
| Mar. 24, 1999 | (JP) | 11-079292 |

(51) Int. Cl.$^7$ ............ B01J 31/00; B01J 37/00; C08F 4/02; C08F 4/60; C08F 4/06

(52) U.S. Cl. ............ 502/103; 502/117; 526/135; 526/147

(58) Field of Search ............ 502/123, 155, 502/167, 103, 117; 526/135, 147

(56) References Cited

U.S. PATENT DOCUMENTS

| 4,994,534 A | * | 2/1991 | Rhee et al. ............ 526/88 |
| 5,304,588 A | * | 4/1994 | Boysen et al. ............ 523/204 |
| 6,309,997 B1 | * | 10/2001 | Fujita et al. ............ 502/103 |
| 6,333,292 B1 | * | 12/2001 | Gibson et al. ............ 502/167 |
| 6,521,561 B1 | * | 2/2003 | Jacobsen et al. ............ 502/162 |

FOREIGN PATENT DOCUMENTS

| EP | 0 798 313 | 10/1997 |
| EP | 874005 A1 | 10/1998 |
| EP | 0 924 223 A2 | 6/1999 |

(List continued on next page.)

OTHER PUBLICATIONS

Herman F. Mark et al. "Encyclopedia of Polymer Sciences and Engineering" vol. 7, 2nd edition, 1987, pp. 480–488, Jun. 1987.*

(List continued on next page.)

Primary Examiner—Mark L. Bell
Assistant Examiner—J. Pasterczyk
(74) Attorney, Agent, or Firm—Birch, Stewart, Kolasch & Birch, LLP

(57) ABSTRACT

An olefin polymerization catalyst having an excellent polymerization activity and an olefin polymerization process using the catalyst are disclosed. The olefin polymerization catalyst comprises (A) a transition metal compound represented by, for example, the following formula (I) and optionally (B) at least one compound selected from an organometallic compound, an organoaluminum oxy-compound and a compound which reacts with the transition metal compound (A) to from an ion pair;

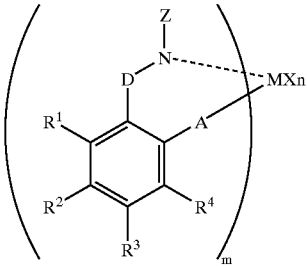

(I)

wherein M is a transition metal atom of Group 3 to Group 11 of the periodic table; m is an integer of 1 to 6; A is —O—, —S—, —Se— or —N(R5)—; D is —C($R^7$)($R^8$)—, —Si($R^9$)($R^{10}$)— or the like; Z is —$R^{13}$ and —$R^{14}$, =C($R^{15}$)$R^{16}$, =$NR^{17}$ or the like; $R^1$ to $R^{17}$ are each H, a hydrocarbon group or the like; n is a number satisfying a valence of M; and X is halogen, a hydrocarbon group or the like.

25 Claims, 1 Drawing Sheet

FOREIGN PATENT DOCUMENTS

| EP | 0 924 223 A3 | | 8/2000 |
|---|---|---|---|
| JP | 11199592 | | 7/1999 |
| WO | WO 96/00245 | * | 1/1996 |
| WO | WO96 23010 | | 8/1996 |
| WO | WO 97/02298 | * | 1/1997 |
| WO | WO98 30609 | | 7/1998 |
| WO | WO98 42664 | | 10/1998 |
| WO | WO98 42665 | | 10/1998 |
| WO | WO 99/19335 A | | 4/1999 |

OTHER PUBLICATIONS

L.K. Johnson et al., "New Pd (II)–and Ni (II)–Based Catalysts for Polymerization of Ethylene and α–Olefins", J. Am. Cem. Soc., 1995, 117, pp. 6414–6415.

US 2003/0004290 A1, US Pre–Grant publication to Matsukawa et al., published Jan./2003.*

US 2002/0115557 A1, US Pre–Grant publication to Fujita et al., published Aug./2002.*

US 2002/01690972 A1, US Pre–Grant publication to Nakayama et al., published Nov./2002.*

Gauvin, Regis et al., European Journal of Inorganic Chemistry, 2001, pp. 2337–2346.

Wang, Chunning et al., Organometallics, 1998, vol. 17, No. 15, pp. 3149–3151.

Jeon, You–Moon et al., Organometallics, 1999, vol. 18, pp. 4107–4113.

* cited by examiner

Fig.1

(A) Transition metal compound

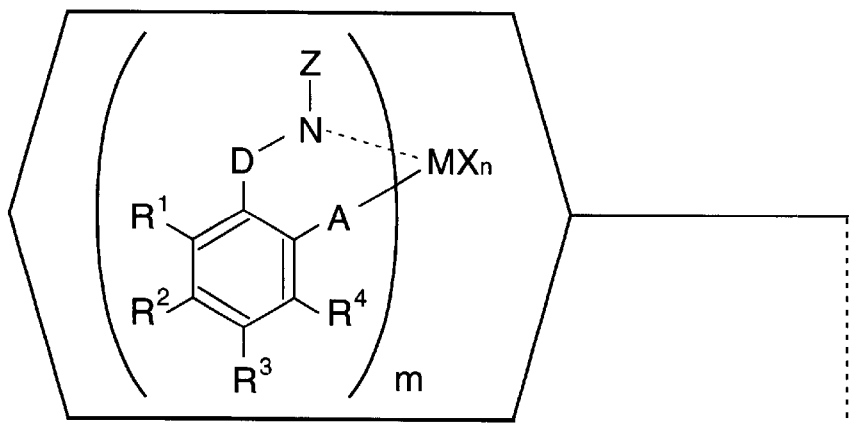

M : Transition metal atom of Group 3 to Group 11 of the periodic table m : 1 – 6

A : –O–, –S–, –Se–, –N($R^5$)–

D : –C($R^7$)($R^6$)–, –Si($R^9$)($R^{10}$)– or the like

Z : –$R^{13}$ and –$R^{14}$, =C($R^{15}$)$R^{16}$, =N$R^{17}$ or the like $R^1 - R^{17}$ : Hydrogen, Hydrocarbon group or the like n : Number satisfying valence of M X : Hydrogen, Hydrocarbon group or the like (B)
- Organometallic compound
- Organoaluminium oxy-compound
- Compound which reacts with the transition metal compound to form ion pair → Olefin (C) Third compound (Carrier)

OLEFIN POLYMERIZATION CATALYST AND POLYMERIZATION PROCESS

FIELD OF THE INVENTION

The present invention relates to olefin polymerization catalysts comprising a transition metal compound and to an olefin polymerization process using the olefin polymerization catalysts.

BACKGROUND OF THE INVENTION

As olefin polymerization catalysts, "Kaminsky catalysts" are well known. The Kaminsky catalysts have extremely high polymerization activities, and by the use of them, polymers of narrow molecular weight distribution can be obtained. Transition metal compounds known as components employable for the Kaminsky catalysts are, for example, bis(cyclopentadienyl)zirconium dichloride (see Japanese Patent Laid-Open Publication No. 19309/1983) and ethylenebis(4,5,6,7-tetrahydroindenyl)zirconium dichloride (see Japanese Patent Laid-Open Publication No. 130314/1986). It is also known that the olefin polymerization activities or the properties of the resulting polyolefins greatly vary when different transition metal compounds are used in the polymerization. Recently, transition metal compounds having a ligand of diimine structure have been proposed as novel olefin polymerization catalysts (see International Patent Publication No. 9623010).

By the way, polyolefins generally have excellent mechanical properties, so that they are used in many fields such as fields of various molded products. However, with variation of requirements for the polyolefins, polyolefins of various properties have been desired in recent years. Moreover, increase of productivity has been also desired.

Under such circumstances as mentioned above, there has been desired development of an olefin polymerization catalyst having an excellent olefin polymerization activity and capable of producing polyolefins of excellent properties.

OBJECT OF THE INVENTION

It is an object of the invention to provide an olefin polymerization catalyst comprising a transition metal compound and having an excellent olefin polymerization activity and to provide an olefin polymerization process using the catalyst.

SUMMARY OF THE INVENTION

The first olefin polymerization catalyst according to the invention comprises:

(A) a transition metal compound which is obtained by bond-forming reaction of a compound represented by the following formula (a) with a metallic compound represented by the following formula (e) and in which the molar ratio of ligands to metal atoms is in the range of 1 to 6, said ligands being derived from the compound of the formula (a) and bonded to said metal atoms, and optionally (B) at least one compound selected from the group consisting of:
(B-1) an organometallic compound,
(B-2) an organoaluminum oxy-compound, and
(B-3) a compound which reacts with the transition metal compound (A) to form an ion pair;

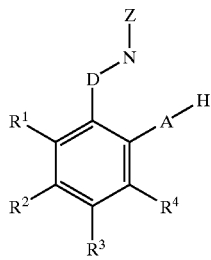

(a)

wherein
A is an oxygen atom, a sulfur atom, a selenium atom or a nitrogen atom having a bonding group —$R^5$,
D is —$C(R^7)(R^8)$—, —$Si(R^9)(R^{10})$—, —$P(O)(R^{11})$—, —$P(R^{12})$—, —SO— or —S—,
Z is a bonding group of N and represents —$R^{13}$ and —$R^{14}$, =$C(R^{15})R^{16}$ or =$NR^{17}$, and
$R^1$ to $R^{17}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring;

$$MX_k \quad (e)$$

wherein
M is a transition metal atom of Group 3 to Group 11 of the periodic table,
k is a number satisfying a valence of M, and
X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when k is 2 or greater, plural groups X may be the same or different, and may be bonded to each other to form a ring.

The second olefin polymerization catalyst according to the invention comprises:

(A) a transition metal compound which is obtained by bond-forming reaction of a compound represented by the following formula (b) with a metallic compound represented by the above formula (e) and in which the molar ratio of ligands to metal atoms is in the range of 1 to 6, said ligands being derived from the compound of the formula (b) and bonded to said metal atoms, and optionally (B) at least one compound selected from the group consisting of:
(B-1) an organometallic compound,
(B-2) an organoaluminum oxy-compound, and
(B-3) a compound which reacts with the transition metal compound (A) to form an ion pair;

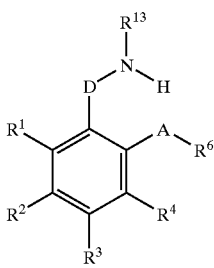

(b)

wherein
A is an oxygen atom, a sulfur atom, a selenium atom or a nitrogen atom having a bonding group —$R^5$,
D is —$C(R^7)(R^8)$—, —$Si(R^9)(R^{10})$—, —$P(O)(R^{11})$—, —$P(R^{12})$—, —SO— or —S—, and
$R^1$ to $R^{13}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring.

The third olefin polymerization catalyst according to the invention comprises:
(A) a transition metal compound which is obtained by bond-forming reaction of a compound represented by the following formula (c) with a metallic compound represented by the above formula (e) and in which the molar ratio of ligands to metal atoms is in the range of 1 to 6, said ligands being derived from the compound of the formula (c) and bonded to said metal atoms, and optionally
(B) at least one compound selected from the group consisting of:
(B-1) an organometallic compound,
(B-2) an organoaluminum oxy-compound, and
(B-3) a compound which reacts with the transition metal compound (A) to form an ion pair;

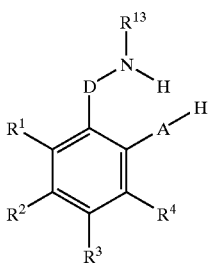

(c)

wherein
A is an oxygen atom, a sulfur atom, a selenium atom or a nitrogen atom having a bonding group —$R^5$,
D is —$C(R^7)(R^8)$—, —$Si(R^9)(R^{10})$—, —$P(O)(R^{11})$—, —$P(R^{12})$—, —SO— or —S—, and
$R^1$ to $R^{13}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring.

The fourth olefin polymerization catalyst according to the invention comprises:
(A) a transition metal compound which is obtained by bond-forming reaction of a compound represented by the following formula (d) with a metallic compound represented by the above formula (e) and in which the molar ratio of ligands to metal atoms is in the range of 1 to 6, said ligands being derived from the compound of the formula (d) and bonded to said metal atoms, and optionally
(B) at least one compound selected from the group consisting of:
(B-1) an organometallic compound,
(B-2) an organoaluminum oxy-compound, and
(B-3) a compound which reacts with the transition metal compound (A) to form an ion pair;

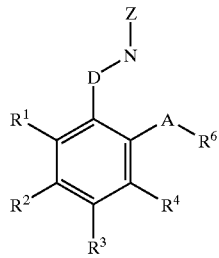

(d)

wherein
A is an oxygen atom, a sulfur atom, a selenium atom or a nitrogen atom having a bonding group —$R^5$,
D is —$C(R^7)(R^8)$—, —$Si(R^9)(R^{10})$—, —$P(O)(R^{11})$—, —$P(R^{12})$—, —SO— or —S—,
Z is a bonding group of N and represents —$R^{13}$ and —$R^{14}$, =$C(R^{15})R^{16}$ or =$NR^{17}$, and
$R^1$ to $R^{17}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring.

The fifth olefin polymerization catalyst according to the invention comprises:
(A) a transition metal compound represented by the following formula (I), and optionally
(B) at least one compound selected from the group consisting of:
(B-1) an organometallic compound,
(B-2) an organoaluminum oxy-compound, and
(B-3) a compound which reacts with the transition metal compound (A) to form an ion pair;

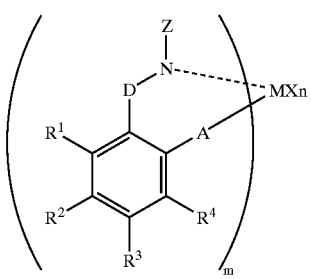

(I)

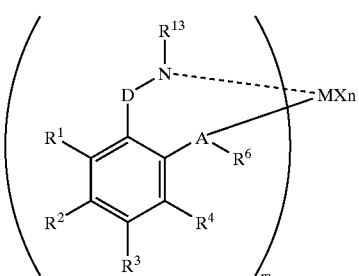

(II)

wherein

M is a transition metal atom of Group 3 to Group 11 of the periodic table, m is an integer of 1 to 6, A is an oxygen atom, a sulfur atom, a selenium atom or a nitrogen atom having a bonding group $—R^5$, D is $—C(R^7)(R^8)—$, $—Si(R^9)(R^{10})—$, $—P(O)(R^{11})—$, $—P(R^{12})—$, $—SO—$ or $—S—$, Z is a bonding group of N and represents $—R^{13}$ and $—R^{14}$, $=C(R^{15})R^{16}$ or $=NR^{17}$, $R^1$ to $R^{17}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them may be bonded to each other to form a ring, and when m is a plural number, one group of $R^1$ to $R^{17}$ contained in one ligand and one group of $R^1$ to $R^{17}$ contained in other ligands may be bonded, and $R^1$s, $R^2$s, $R^3$s, $R^4$s, $R^5$s, $R^7$s, $R^8$s, $R^9$s, $R^{10}$s, $R^{11}$s, $R^{12}$s, $R^{13}$s, $R^{14}$s, $R^{15}$s, $R^{16}$s, or $R^{17}$s may be the same or different, respectively, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups X may be the same or different, and may be bonded to each other to form a ring.

The sixth olefin polymerization catalyst according to the invention comprises:

(A) a transition metal compound represented by the following formula (II), and optionally (B) at least one compound selected from the group consisting of:
(B-1) an organometallic compound,
(B-2) an organoaluminum oxy-compound, and
(B-3) a compound which reacts with the transition metal compound (A) to form an ion pair;

wherein

M is a transition metal atom of Group 3 to Group 11 of the periodic table, m is an integer of 1 to 6, A is an oxygen atom, a sulfur atom, a selenium atom or a nitrogen atom having a bonding group $—R^5$, D is $—C(R^7)(R^8)—$, $—Si(R^9)(R^{10})—$, $—P(O)(R^{11})—$, $—P(R^{12})—$, $—SO—$ or $—S—$, $R^1$ to $R^{13}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them may be bonded to each other to form a ring, and when m is a plural number, one group of $R^1$ to $R^{13}$ contained in one ligand and one group of $R^1$ to $R^{13}$ contained in other ligands may be bonded, and $R^1$s, $R^2$s, $R^3$s, $R^4$s, $R^5$s, $R^6$s, $R^7$s, $R^8$s, $R^9$s, $R^{10}$s, $R^{11}$s, $R^{12}$s, or $R^{13}$s may be the same or different, respectively, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups X may be the same or different, and may be bonded to each other to form a ring.

The seventh olefin polymerization catalyst according to the invention comprises:

(A) a transition metal compound represented by the following formula (III), and optionally (B) at least one compound selected from the group consisting of:
(B-1) an organometallic compound,
(B-2) an organoaluminum oxy-compound, and
(B-3) a compound which reacts with the transition metal compound (A) to form an ion pair;

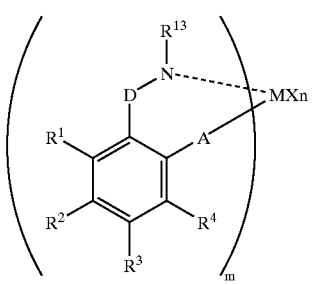 (III)

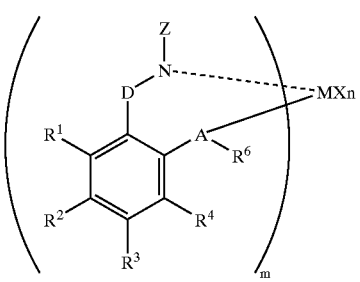 (IV)

wherein

M is a transition metal atom of Group 3 to Group 11 of the periodic table, m is an integer of 1 to 3, A is an oxygen atom, a sulfur atom, a selenium atom or a nitrogen atom having a bonding group —$R^5$, D is —$C(R^7)(R^8)$—, —$Si(R^9)(R^{10})$—, —$P(O)(R^{11})$—, —$P(R^{12})$—, —SO— or —S—, $R^1$ to $R^{13}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them may be bonded to each other to form a ring, and when m is a plural number, one group of $R^1$ to $R^{13}$ contained in one ligand and one group of $R^1$ to $R^{13}$ contained in other ligands may be bonded, and $R^1$s, $R^2$s, $R^3$s, $R^4$s, $R^5$s, $R^7$s, $R^8$s, $R^9$s, $R^{10}$s, $R^{11}$s, $R^{12}$s, or $R^{13}$s may be the same or different, respectively n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups X may be the same or different, and may be bonded to each other to form a ring.

The eighth olefin polymerization catalyst according to the invention comprises:

(A) a transition metal compound represented by the following formula (IV), and optionally (B) at least one compound selected from the group consisting of:

(B-1) an organometallic compound, (B-2) an organoaluminum oxy-compound, and (B-3) a compound which reacts with the transition metal compound (A) to form an ion pair;

wherein

M is a transition metal atom of Group 3 to Group 11 of the periodic table, m is an integer of 1 to 6, A is an oxygen atom, a sulfur atom, a selenium atom or a nitrogen atom having a bonding group —$R^5$, D is —$C(R^7)(R^8)$—, —$Si(R^9)(R^{10})$—, —$P(O)(R^{11})$—, —$P(R^{12})$—, —SO— or —S—, Z is a bonding group of N and represents —$R^{13}$ and —$R^{14}$, =$C(R^{15})R^{16}$ or =$NR^{17}$, $R^1$ to $R^{17}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them may be bonded to each other to form a ring, and when m is a plural number, one group of $R^1$ to $R^{17}$ contained in one ligand and one group of $R^1$ to $R^{17}$ contained in other ligands may be bonded, and $R^1$s, $R^2$s, $R^3$s, $R^4$s, $R^5$s, $R^6$s, $R^7$s, $R^8$s, $R^9$s, $R^{10}$s, $R^{11}$s, $R^{12}$s, $R^{13}$s, $R^{14}$s, $R^{15}$s, $R^{16}$s, or $R^{17}$s may be the same or different, respectively, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups X may be the same or different, and may be bonded to each other to form a ring.

The ninth olefin polymerization catalyst according to the invention comprises:

(A) a transition metal compound represented by the following formula (V), and optionally (B) at least one compound selected from the group consisting of:

(B-1) an organometallic compound, (B-2) an organoaluminum oxy-compound, and (B-3) a compound which reacts with the transition metal compound (A) to form an ion pair;

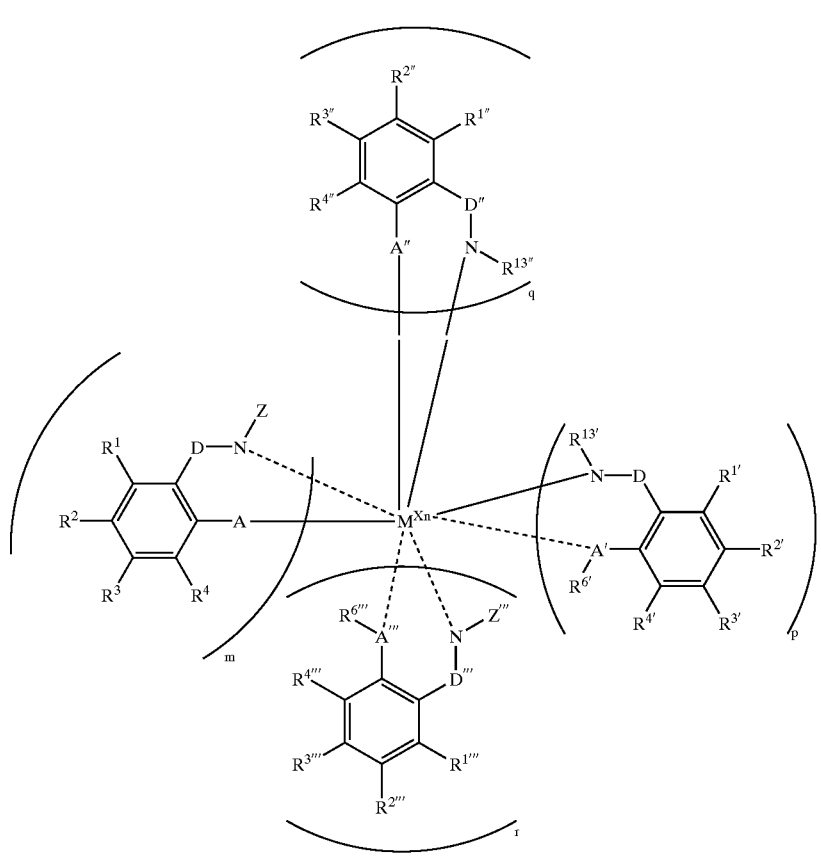

(V)

wherein

M is a transition metal atom of Group 3 to Group 11 of the periodic table, m is an integer of 0 to 6, p is an integer of 0 to 6, q is an integer of 0 to 3, r is an integer of 0 to 6, three or more of them is not 0 at the same time, and they are numbers satisfying the conditions of m+p+q+r≦6 and m+p+2q≦6, A, A', A" and A'" may be the same or different and are each an oxygen atom, a sulfur atom, a selenium atom or a nitrogen atom having a bonding group —$R^5$ (or —$R^{5'}$, —$R^{5''}$ and —$R^{5'''}$ correspondingly to A', A" and A'", respectively, and the same shall apply hereinafter), D, D', D" and D'" may be the same or different and are each —$C(R^7)(R^8)$—, —$Si(R^9)(R^{10})$—, —$P(O)(R^{11})$—, $P(R^{12})$—, —SO— or —S—, Z and Z'" may be the same or different and each of them is a bonding group of N and represents —$R^{13}$ and —$R^{14}$, =$C(R^{15})R^{16}$ or =$NR^{17}$, $R^1$ to $R^{17}$, $R^{1'}$ to $R^{13'}$, $R^{1''}$ to $R^{13''}$, or $R^{1'''}$ to $R^{17'''}$ may be the same or different, they are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them may be bonded to each other to form a ring, and in case of m+p+q+r≧2, one group of $R^1$ to $R^{16}$, $R^{1'}$ to $R^{13'}$, $R^{1''}$ to $R^{13''}$, or $R^{1'''}$ to $R^{17'''}$ contained in one ligand and one group of $R^1$ to $R^{17}$, $R^{1'}$ to $R^{13'}$, $R^{1''}$ to $R^{13''}$, or $R^{1'''}$ to $R^{17'''}$ contained in other ligands may be bonded, and $R^1$, $R^{1'}$, $R^{1''}$ and $R^{1'''}$, $R^2$, $R^{2'}$, $R^{2''}$ and $R^{2'''}$, $R^3$, $R^{3'}$, $R^{3''}$ and $R^{3'''}$, $R^4$, $R^{4'}$, $R^{4''}$ and $R^{4'''}$, $R^5$, $R^{5'}$, $R^{5''}$ and $R^{5'''}$, $R^6$, $R^{6'}$, $R^{6''}$ and $R^{6'''}$, $R^7$, $R^{7'}$, $R^{7''}$ and $R^{7'''}$, $R^8$, $R^{8'}$, $R^{8''}$ and $R^{8'''}$, $R^9$, $R^{9'}$, $R^{9''}$ and $R^{9'''}$, $R^{10}$, $R^{10'}$, $R^{10''}$ and $R^{10'''}$, $R^{11}$, $R^{11'}$, $R^{11''}$ and $R^{11'''}$, $R^{12}$, $R^{12'}$, $R^{12''}$ and $R^{12'''}$, $R^{13}$, $R^{13'}$, $R^{13''}$ and $R^{13'''}$, $R^{14}$ and $R^{14'}$, $R^{15}$ and $R^{15'''}$, $R^{16}$ and $R^{16'''}$, or $R^{17}$ and $R^{17'''}$ may be the same or different, respectively, n is a number satisfying a valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups X may be the same or different, and may be bonded to each other to form a ring.

In the olefin polymerization catalysts of the invention, the transition metal compound (A) is preferably a compound represented by any of the formulas (a) to (d) and (I) to (V) wherein D (including D', D" and D'" in the formula (V)) is —$C(R^7)(R^8)$—.

Also, the olefin polymerization catalysts according to the invention may further comprise a carrier (C) in addition to the transition metal compound (A) and at least one compound (B) selected from the group consisting of the organometallic compound (B-1), the organoaluminum oxycompound (B-2) and the compound (B-3) which reacts with the transition metal compound (A).

The olefin polymerization process according to the invention comprises polymerizing or copolymerizing an olefin in the presence of any of above-mentioned catalysts.

BRIEF DESCRIPTION OF THE DRAWING

FIG. 1 is an explanatory view showing steps of a process for preparing an olefin polymerization catalyst according to the invention.

DETAILED DESCRIPTION OF THE INVENTION

The olefin polymerization catalyst of the present invention and the olefin polymerization process using the catalyst are described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

The olefin polymerization catalyst of the invention is formed from:

(A) a transition metal compound, and optionally
(B) at least one compound selected from the group consisting of:
   (B-1) an organometallic compound,
   (B-2) an organoaluminum oxy-compound, and
   (B-3) a compound which reacts with the transition metal compound (A) to form an ion pair.

First, the transition metal compounds (A) and other catalyst components which may optionally be added for forming the olefin polymerization catalyst of the invention are described.

(A) Transition Metal Compound

The first transition metal compound (A) for use in the invention is obtained by bond-forming reaction of a compound represented by the following formula (a) with a metallic compound represented by the following formula (e). The compounds of the formulas (a) to (d) are sometimes referred to as "ligand precursors" hereinafter.

The "bond-forming reaction" used herein means a reaction conducted for the purpose of bonding, and the bond-forming reaction is not specifically limited.

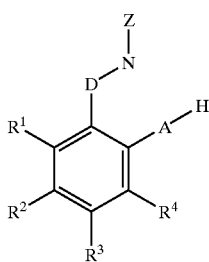

(a)

In the formula (a), A is an oxygen atom, a sulfur atom, a selenium atom or a nitrogen atom having a bonding group $-R^5$.

D is $-C(R^7)(R^8)-$, $-Si(R^9)(R^{10})-$, $-P(O)(R^{11})-$, $-P(R^{12})-$, $-SO-$ or $-S-$. Of these, $-C(R^7)(R^8)-$ and $-Si(R^9)(R^{10})-$ are preferable, and $-C(R^7)(R^8)-$ is particularly preferable.

Z is a bonding group of N and represents $-R^{13}$ and $-R^{14}$, $=C(R^{15})R^{16}$ or $=NR^{16}$. (The symbols "—" and "=" mean a single bond and a double bond, respectively. The same shall apply hereinafter.)

$R^1$ to $R^{17}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring. However, it is preferable that $R^{12}$ or $R^{13}$ is an atom or a group other than a hydrogen atom.

$R^1$ to $R^{17}$ may be the same or different and are each preferably a hydrogen atom, a halogen atom, a hydrocarbon group, a heterocyclic compound residual group, an oxygen-containing group, a nitrogen-containing group, an aluminum-containing group, a sulfur-containing group or a silicon-containing group.

More specifically, $R^1$ to $R^{17}$ are each preferably a hydrogen atom, a halogen atom, a hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonato ester group, a sulfonamido group, a cyano group, a nitro group, a carboxyl group, a sulfo group, a mercapto group, an aluminum-containing group or a hydroxyl group. However, it is preferable that $R^{13}$ or $R^{14}$ is an atom or a group other than a hydrogen atom.

$R^1$ to $R^4$ are each preferably a hydrogen atom, a hydrocarbon group, a heterocyclic compound residual group, a hydrocarbon-substituted silyl group or a hydrocarbon-substituted siloxy group, and particularly preferably a hydrogen atom, a hydrocarbon group, a heterocyclic compound residual group or a hydrocarbon-substituted silyl group.

Also, $R^5$ to $R^{17}$ are each preferably a hydrogen atom, a hydrocarbon group, a heterocyclic compound residual group, a hydrocarbon-substituted silyl group, a hydrocarbon-substituted siloxy group or an aluminum-containing group, and particularly preferably a hydrogen atom, a hydrocarbon group, a heterocyclic compound residual group or an aluminum-containing group.

The halogen atoms include fluorine, chlorine, bromine and iodine.

Examples of the hydrocarbon groups include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; straight-chain or branched alkenyl groups of 2 to 30 carbon atoms, preferably 2 to 20 carbon atoms, such as vinyl, allyl and isopropenyl; straight-chain or branched alkynyl groups of 2 to 30 carbon atoms, preferably 2 to 20 carbon atoms, such as ethynyl and propargyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; cyclic unsaturated hydrocarbon groups of 5 to 30 carbon atoms, such as cyclopentadienyl, indenyl and fluorenyl; aryl groups of 6 to 30 carbon atoms, preferably 6 to 20 carbon atoms, such as phenyl, benzyl, naphthyl, biphenyl, terphenyl, phenanthryl and anthracenyl; and alkyl-substituted aryl groups, such as tolyl, isopropylphenyl, t-butylphenyl, dimethylphenyl and di-t-butylphenyl.

In the above hydrocarbon groups, hydrogen may be replaced with a halogen atom, and examples of these halogenated hydrocarbon groups of 1 to 30 carbon atoms, preferably 1 to 20 carbon atoms, include trifluoromethyl, pentafluorophenyl and chlorophenyl.

In the above hydrocarbon groups, hydrogen may also be replaced with another hydrocarbon group, and examples of these aryl-substituted alkyl groups include benzyl and cumyl.

Further, the above hydrocarbon groups may have heterocyclic compound residual groups; oxygen-containing groups, such as an alkoxy group, an aryloxy group, an ester group, an ether group, an acyl group, a carboxyl group, a carbonato group, a hydroxyl group, a peroxy group and a carboxylic anhydride group; nitrogen-containing groups, such as an amino group, an imino group, an amido group, an imido group, a hydrazino group, a hydrazono group, a nitro group, a nitroso group, a cyano group, an isocyano group, a cyanato ester group, an amidino group, a diazo group and ammonium salts derived from an amino group; boron-containing groups, such as a boranediyl group, a boranetriyl group and a diboranyl group; sulfur-containing groups, such as a mercapto group, a thioester group, a dithioester group, an alkylthio group, an arylthio group, a thioacyl group, a thioether group, a thiocyanato ester group, an isothiocyanato ester group, a sulfonato ester group, a sulfonamido group, a thiocarboxyl group, a dithiocarboxyl group, a sulfo group, a sulfonyl group, a sulfinyl group and a sulfenyl group; phosphorus-containing groups, such as a phosphido group, a phosphoryl group, a thiophosphoryl group, a phosphato group; silicon-containing groups; germanium-containing groups; or tin-containing groups.

Of the above groups, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30 carbon atoms, preferably 6 to 20 carbon atoms, such as phenyl, naphthyl, biphenyl, terphenyl, phenanthryl and anthracenyl; and substituted aryl groups such as the above aryl groups which are substituted with 1 to 5 substituents such as halogen atoms, alkyl or alkoxy groups of 1 to 30 carbon atoms, preferably 1 to 20 carbon atoms, and aryl or aryloxy groups of 6 to 30 carbon atom, preferably 6 to 20 carbon atoms.

Examples of the heterocyclic compound residual groups include residual groups of nitrogen-containing compounds (e.g., pyrrole, pyridine, pyrimidine, quinoline and triazine), oxygen-containing compounds (e.g., furan and pyran) and sulfur-containing compounds (e.g., thiophene), and these heterocyclic compound residual groups which are substituted with substituents such as alkyl groups and alkoxy groups of 1 to 30 carbon atoms, preferably 1 to 20 carbon atoms.

Examples of the oxygen-containing groups, nitrogen-containing groups, sulfur-containing groups and phosphorus-containing groups for $R^1$ to $R^{17}$ include those previously exemplified as substituents which may be contained in the hydrocarbon groups.

$R^4$ is preferably an atom or a group other than a hydrogen atom. Thus, preferable $R^4$ is a halogen atom, a hydrocarbon group, a heterocyclic compound residual group, an oxygen-containing group, a boron-containing group, a sulfur-containing group, a silicon-containing group, a germanium-containing group or a tin-containing group. Particularly preferable $R^4$ is a halogen atom, a hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an amino group, an imido group, an imino group, a sulfonato ester group, a sulfonamido group, a cyano group, a nitro group or a hydroxy group. Examples of preferable hydrocarbon groups as $R^4$ include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; aryl groups of 6 to 30 carbon atoms, preferably 6 to 20 carbon atoms, such as phenyl, benzyl, naphthyl, biphenylyl and triphenylyl; and these groups mentioned above which are substituted with alkyl or alkoxy groups of 1 to 30 carbon atoms, preferably 1 to 20 carbon atoms, halogenated aryl groups of 6 to 30 carbon atoms, preferably 6 to 20 carbon atoms, aryloxy groups of 6 to 30 carbon atoms, preferably 6 to 20 carbon atoms, halogen atoms, cyano, nitro and hydroxy. Examples of preferable hydrocarbon-substituted silyl groups as R4 include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Particularly preferable are trimethylsilyl, triethylsilyl, diphenylmethylsilyl, triphenylsilyl, dimethylphenylsilyl, dimethyl-t-butylsilyl and dimethyl(pentafluorophenyl)silyl. Of the above groups, it is preferable that R4 is any one selected from straight-chain or branched alkyl groups of 1 to 30 carbon atoms, preferably 1 to 20 carbon atoms, such as isopropyl, isobutyl, sec-butyl, tert-butyl and neopentyl; and these alkyl groups in which hydrogen atoms are replaced with aryl groups of 6 to 30 carbon atoms, preferably 6 to 20 carbon atoms (such as cumyl); and cyclic saturated hydrocarbon groups of 3 to 30 carbon atoms, preferably 3 to 20 carbon atoms, such as adamantyl, cyclopropyl, cyclobutyl, cyclopentyl and cyclohexyl. It is also preferable that $R^4$ is an aryl group of 6 to 30 carbon atoms, preferably 6 to 20 carbon atoms, such as phenyl, naphthyl, fluorenyl, anthranyl or phenanthryl; or a hydrocarbon-substituted silyl group.

Examples of the boron-containing groups include those previously exemplified as substituents which may be contained in the hydrocarbon groups, alkyl-substituted boron, aryl-substituted boron, halogenated boron and alkyl-substituted halogenated boron. Specifically, there can be mentioned alkyl-substituted boron, such as $(Et)_2B-$, $(iPr)_2B-$, $(iBu)_2B-$, $(Et)_3B$, $(iPr)_3B$ and $(iBu)_3B$; aryl-substituted boron, such as $(C_6H_5)_2B-$, $(C_6H_5)_3B$, $(C_6F_5)_3B$ and $(3,5-(CF_3)_2C_6H_3B$; halogenated boron, such as $BCl_2-$ and $BCl_3$; and alkyl-substituted halogenated boron, such as $(Et)BCl-$, $(iBu)BCl-$ and $(C_6H_5)_2BCl$. Of these, the tri-substituted boron may be in a state of coordinate bond. The symbols "Et", "iPr" and "iBu" used herein denote an ethyl group, an isopropyl group and an isobutyl group, respectively.

Examples of the aluminum-containing groups include alkyl-substituted aluminum, aryl-substituted aluminum, halogenated aluminum and alkyl-substituted halogenated aluminum. Specifically, there can be mentioned alkyl-substituted aluminum, such as $(Et)_2Al-$, $(iPr)_2Al-$, $(iBu)_2Al-$, $(Et)_3Al$, $(iPr)_3Al$ and $(iBu)_3Al$; aryl-substituted aluminum, such as $(C_6H_5)_2Al-$; halogenated aluminum, such as $AlCl_2-$ and $AlCl_3$; and alkyl-substituted halogenated aluminum, such as (Et)AlCl— and (iBu)AlCl—. Of these, the tri-substituted aluminum may be in a state of coordinate bond. The symbols "Et", "iPr" and "iBu" used herein denote an ethyl group, an isopropyl group and an isobutyl group, respectively.

Examples of the silicon-containing groups include a silyl group, a siloxy group, a hydrocarbon-substituted silyl group and a hydrocarbon-substituted siloxy group. Particular examples of the hydrocarbon-substituted silyl groups include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl. Particular examples of the hydrocarbon-substituted siloxy groups include trimethylsiloxy.

Examples of the germanium-containing groups or the tin-containing groups include groups wherein silicon is replaced with germanium or tin in the above-exemplified silicon-containing groups.

The above examples of the groups $R^1$ to $R^{17}$ are more specifically described below.

Of the oxygen-containing groups, preferred examples of the alkoxy groups include methoxy, ethoxy, n-propoxy, isopropoxy, n-butoxy and tert-butoxy; preferred examples of the aryloxy groups include phenoxy and 2,6-dimethylphenoxy, 2,4,6-trimethylphenoxy; preferred examples of the acyl groups include formyl, acetyl, benzoyl, p-chlorobenzoyl and p-methoxybenzoyl; and preferred examples of the ester groups include acetyloxy, benzoyloxy, methoxycarbonyl, phenoxycarbonyl and p-chlorophenoxycarbonyl.

Of the nitrogen-containing groups, preferred examples of the amido groups include acetamido, N-methylacetamido and N-methylbenzamido; preferred examples of the amino groups include dimethylamino, ethylmethylamino and diphenylamino; preferred examples of the imido groups include acetimide and benzimide; and preferred examples of the imino groups include methylimino, ethylimino, propylimino, butylimino and phenylimino.

Of the sulfur containing groups, preferred examples of the alkylthio groups include methylthio and ethylthio; preferred examples of the arylthio groups include phenylthio, methylphenylthio and naphthylthio; preferred examples of the thioester groups include acetylthio, benzoylthio, methylthiocarbonyl and phenylthiocarbonyl; preferred examples of sulfonato ester groups include methylsulfonato, ethylsulfonato and phenylsulfonato; and preferred examples of the sulfonamido groups include phenylsulfonamido, N-methylsulfonamide and N-methyl-p-toluenesulfonamide.

Two or more groups of $R^1$ to $R^{17}$, preferably adjacent groups, may be bonded to each other to form an aliphatic ring, an aromatic ring or a hydrocarbon ring containing a hetero atom such as a nitrogen atom. These rings may further have a substituent.

D is $-C(R^7)(R^8)-$, $-Si(R^9)(R^{10})-$, $-P(O)(R^{11})-$, $-P(R^{12})-$, $-SO-$ or $-S-$.

Preferred examples of $-C(R^7)(R^8)-$ include divalent hydrocarbon groups of 1 to 20 carbon atoms, such as alkylene groups (e.g., methylene, dimethylmethylene, 1,2-ethylene, dimethyl-1,2-ethylene, 1,3-trimethylene, 1,4-tetramethylene, 1,2-cyclohexylene and 1,4-cyclohexylene) and arylalkylene groups (e.g., diphenylmethylene and diphenyl-1,2-ethylene). Of these, methylene is preferable.

Preferred examples of $-Si(R^9)(R^{10})-$ include divalent silicon-containing groups, such as alkylsilylene, alkylarylsilylene and arylsilylene groups (e.g., methylsilylene, dimethylsilylene, diethylsilylene, di(n-propyl)silylene, di(i-propyl)silylene, di(cyclohexyl)silylene, methyphenylsilylene, diphenylsilylene, di(p-tolyl)silylene and di(p-chlorophenyl)silylene), and alkyldisilylene, alkylaryldisilylene and aryldisilylene groups (e.g., tetramethyl-1,2-disilylene and tetraphenyl-1,2-disilylene).

$R^{11}$ is preferably an oxygen-containing group, more preferably an alkoxy group, an aryloxy group or an arylalkoxy group, particularly preferably methoxy or phenoxy.

The metallic compound to be reacted with the compound of the formula (a) is represented by the following formula (e):

$$MX_k \qquad\qquad (e)$$

In the formula (e), M is a transition metal atom of Group 3 (including lanthanoid) to Group 11 of the periodic table, preferably a metal atom of Group 3 (including lanthanoid) to Group 10, more preferably a metal atom of Group 3 to Group 5 and Group 8 to Group 10, particularly preferably a metal atom of Group 4 or Group 5. Examples of the metal atoms include scandium, yttrium, lanthanoid, titanium, zirconium, hafnium, vanadium, niobium, tantalum, chromium, molybdenum, tungsten, manganese, rhenium, iron, ruthenium, cobalt, rhodium, nickel and palladium. Of these, preferable are scandium, lanthanoid, titanium, zirconium, hafnium, vanadium, niobium, tantalum, iron, cobalt, rhodium, nickel and palladium. More preferable are titanium, zirconium, hafnium, vanadium, niobium, tantalum, iron, cobalt and rhodium. Particularly preferable are titanium, zirconium and hafnium.

k is a number satisfying a valence of M, specifically an integer of 0 to 6. For example, there can be mentioned k=2 in case of a divalent metal, k=3 in case of a trivalent metal, k=4 in case of a tetravalent metal, k=5 in case of a pentavalent metal, and k=6 in case of a hexavalent metal. More specifically, there can be mentioned k=4 in case of Ti(IV), and k=3 in case of Ti(III).

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group.

The halogen atoms include fluorine, chlorine, bromine and iodine.

Examples of the hydrocarbon groups include the same groups as previously exemplified with respect to $R^1$ to $R^{17}$ in the formula (a). Specifically, there can be mentioned alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl, but not limited thereto. These hydrocarbon groups include halogenated hydrocarbon groups, specifically groups wherein at least one hydrogen is replaced with halogen in the hydrocarbon groups of 1 to 30 carbon atoms. Of these, preferable are hydrocarbon groups of 1 to 20 carbon atoms.

Examples of the heterocyclic compound residual groups include the same groups as previously exemplified with respect to $R^1$ to $R^{17}$ in the formula (a).

Examples of the oxygen-containing groups include the same groups as previously exemplified with respect to $R^1$ to $R^{17}$ in the formula (a). Specifically, there can be mentioned a hydroxyl group; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; an acetoxy group; and a carbonyl group, but not limited thereto.

Examples of the sulfur-containing groups include the same groups as previously exemplified with respect to $R^1$ to $R^{17}$ in the formula (a). Specifically, there can be mentioned sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups, but not limited thereto.

Examples of the nitrogen-containing groups include the same groups as previously exemplified with respect to $R^1$ to $R^{17}$ in the formula (a). Specifically, there can be mentioned an amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino, but not limited thereto.

Examples of the boron-containing groups include $BR_4$ (R is for example hydrogen, an alkyl group, an aryl group which may have a substituent, or a halogen atom).

Examples of the phosphorus-containing groups include trialkylphosphine groups, such as trimethylphosphine, tributylphosphine and tricyclohexylphosphine; triarylphosphine groups, such as triphenylphosphine and tritolylphosphine; phosphite groups (phosphido groups), such as methylphosphite, ethylphosphite and phenylphosphite; a phosphonic acid group; and a phosphoric acid group, but not limited thereto.

Examples of the silicon-containing groups include the same groups as previously exemplified with respect to $R^1$ to $R^{17}$ in the formula (a). Specifically, there can be mentioned hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups, such as trimethylsilyl ether; silicon-substituted alkyl groups, such as trimethylsilylmethyl; and silicon-substituted aryl groups, such as trimethylsilylphenyl.

Examples of the germanium-containing groups include the same groups as previously exemplified with respect to $R^1$ to $R^{17}$ in the formula (a). Specifically, there can be mentioned groups wherein silicon is replaced with germanium in the above-exemplified silicon-containing groups.

Examples of the tin-containing groups include the same groups as previously exemplified with respect to $R^1$ to $R^{17}$ in the formula (a). Specifically, there can be mentioned groups wherein silicon is replaced with tin in the above-exemplified silicon-containing groups.

Examples of the halogen-containing groups include fluorine-containing groups, such as $PF_6$ and $BR_4$; chlorine-containing groups, such as $ClO_4$ and $SbCl_6$; and iodine-containing groups, such as $IO_4$, but not limited thereto.

Examples of the aluminum-containing groups include $AlR_4$ (R is for example hydrogen, an alkyl group, an aryl group which may have a substituent, or a halogen atom), but not limited thereto.

Of the above atoms and groups, preferable are halogen atoms and alkyl groups, and more preferable are chlorine, bromine and methyl.

When k is 2 or greater, plural groups X may be the same or different, and may be bonded to each other to form a ring.

Examples of the metallic compounds MXk of the formula (e) include $TiCl_3$, $TiCl_4$, $TiBr_3$, $TiBr_4$, $Ti(CH_2C_6H_5)_4$, $Ti(NMe_3)_4$, $ZrCl_4$, $ZrBr_4$, $Zr(CH_2C_6H_5)_4$, $Zr(NMe_3)_4$, $HfBr_4$, $HfCl_4$, $VCl_4$, $VCl_5$, $VBr_4$, $VBr_5$, $NbCl_5$, $NbBr_5$, $TaCl_5$, $TaBr_4$, $Ti(acac)_3$, $FeCl_2$, $FeCl_3$, $FeBr_2$, $FeBr_3$, $CoCl_2$, $CoCl_3$, $CoBr_2$, $CoBr_3$, $Rhcl_2$, $Rhcl_3$, $RhBr_2$, $RhBr_3$, $NiCl_2$, $NiBr_2$, $PdCl_2$, $PdBr_2$, and complexes of these compounds and THF (tetrahydrofuran), acetonitrile or diethyl ether.

In the transition metal compound obtained by reacting the compound represented by the formula (a) with the metallic compound represented by the formula (e), the molar ratio of the ligands to the metal atoms is in the range of preferably 1 to 6, more preferably 1 to 4, particuraly preferably 1 or 2, said ligands being derived from the compound of the formula (a) and bonded to the metal atoms. The molar ratio in the reaction product can be confirmed by, for example, elemental analysis, X-ray crystal structure analysis and analyses of mass spectrum, NMR and IR of the isolated transition metal compound.

The second transition metal compound for use in the invention is obtained by bond-forming reaction of a compound represented by the following formula (b) with the metallic compound represented by the aforesaid formula (e):

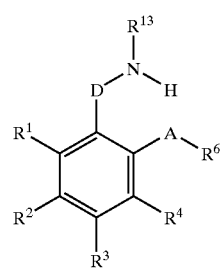

(b)

In the formula (b), A is an oxygen atom, a sulfur atom, a selenium atom or a nitrogen atom having a bonding group —$R^5$.

D is —$C(R^7)(R^8)$—, —$Si(R^9)(R^{10})$—, —$P(O)(R^{11})$—, —$P(R^{12})$—, —SO— or —S—. Of these, —$C(R^7)(R^8)$— and —$Si(R^9)(R^{10})$— are preferable, and —$C(R^7)(R^8)$— is particularly preferable.

$R^1$ to $R^{13}$ may be the same or different, and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring. It is preferable that $R^6$ is an atom or a group other than a hydrogen atom.

$R^1$ to $R^{13}$ may be the same or different and are each preferably a hydrogen atom, a halogen atom, a hydrocarbon group, a heterocyclic compound residual group, an oxygen-containing group, a nitrogen-containing group, an aluminum-containing group, a sulfur-containing group or a silicon-containing group.

More specifically, it is preferable that $R^1$ to $R^{13}$ is a hydrogen atom, a halogen atom, a hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonato ester group, a sulfonamido group, a cyano group, a nitro group, a carboxyl group, a sulfo group, a mercapto group, an aluminum-containing group or a hydroxy group.

$R^1$ to $R^4$ are each preferably a hydrogen atom, a hydrocarbon group, a heterocyclic compound residual group, a hydrocarbon-substituted silyl group or a hydrocarbon-substituted siloxy group, and particularly preferably a hydrogen atom, a hydrocarbon group, a heterocyclic compound residual group or a hydrocarbon-substituted silyl group.

Also, $R^5$ to $R^{17}$ are each preferably a hydrogen atom, a hydrocarbon group, a heterocyclic compound residual group, a hydrocarbon-substituted silyl group, a hydrocarbon-substituted siloxy group or an aluminum-containing group, and particularly preferably a hydrogen atom, a hydrocarbon group, a heterocyclic compound residual group or an aluminum-containing group.

Examples of the groups $R^1$ to $R^{13}$ include the same groups as previously exemplified with respect to $R^1$ to $R^{17}$ in the formula (a).

Examples of the groups D include the same groups as previously exemplified with respect to D in the formula (a).

In the transition metal compound obtained by reacting the compound represented by the formula (b) with the metallic compound represented by the formula (e), the molar ratio of the ligands to the metal atoms is in the range of 1 to 6, preferably 1 to 4, more preferably 1 or 2, said ligands being derived from the compound of the formula (b) and bonded to the metal atoms.

The third transition metal compound for use in the invention is obtained by bond-forming reaction of a compound represented by the following formula (c) with the metallic compound represented by the aforesaid formula (e):

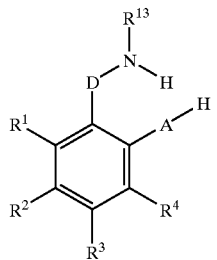

(c)

In the formula (c), A is an oxygen atom, a sulfur atom, a selenium atom or a nitrogen atom having a bonding group $-R^5$.

D is $-C(R^7)(R^8)-$, $-Si(R^9)(R^{10})-$, $-P(O)(R^{11})-$, $-P(R^{12})-$, $-SO-$ or $-S-$. Of these, $-C(R^7)(R^8)-$ and $-Si(R^9)(R^{10})-$ are preferable, and $-C(R^7)(R^8)-$ is particularly preferable.

$R^1$ to $R^{13}$ may be the same or different, and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring.

$R^1$ to $R^{13}$ may be the same or different and are each preferably a hydrogen atom, a halogen atom, a hydrocarbon group, a heterocyclic compound residual group, an oxygen-containing group, a nitrogen-containing group, an aluminum-containing group, a sulfur-containing group or a silicon-containing group.

More specifically, it is preferable that $R^1$ to $R^{13}$ is a hydrogen atom, a halogen atom, a hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonato ester group, a sulfonamido group, a cyano group, a nitro group, a carboxyl group, a sulfo group, a mercapto group, an aluminum-containing group or a hydroxy group.

$R^1$ to $R^4$ are each preferably a hydrogen atom, a hydrocarbon group, a heterocyclic compound residual group, a hydrocarbon-substituted silyl group or a hydrocarbon-substituted siloxy group, and particularly preferably a hydrogen atom, a hydrocarbon group, a heterocyclic compound residual group or a hydrocarbon-substituted silyl group.

Also, $R^5$ to $R^{17}$ are each preferably a hydrogen atom, a hydrocarbon group, a heterocyclic compound residual group, a hydrocarbon-substituted silyl group, a hydrocarbon-substituted siloxy group or an aluminum-containing group, and particularly preferably a hydrogen atom, a hydrocarbon group, a heterocyclic compound residual group or an aluminum-containing.

Examples of the groups indicated by $R^1$ to $R^{13}$ include the same groups as previously exemplified with respect to $R^1$ to $R^{17}$ in the formula (a).

Examples of the groups D include the same groups as previously exemplified with respect to D in the formula (a).

In the transition metal compound obtained by reacting the compound represented by the formula (c) with the metallic compound represented by the formula (e), the molar ratio of the ligands to the metal atoms is in the range of preferably 1 to 6, more preferably 1 to 3, said ligands being derived from the compound of the formula (c) and bonded to the metal atoms.

The fourth transition metal compound for use in the invention is obtained by bond-forming reaction of a compound represented by the following formula (d) with the metallic compound represented by the aforesaid formula (e):

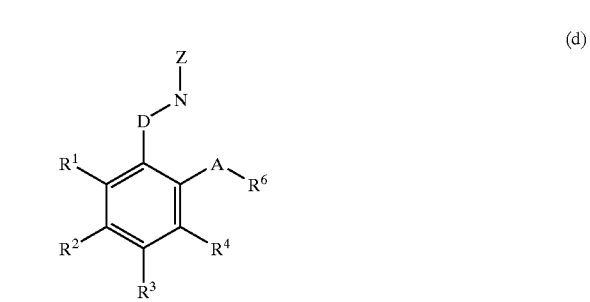

(d)

In the formula (d), A is an oxygen atom, a sulfur atom, a selenium atom or a nitrogen atom having a bonding group —$R^5$.

D is —$C(R^7)(R^8)$—, —$Si(R^9)(R^{10})$—, —$P(O)(R^{11})$—, —$P(R^{12})$—, —SO— or —S—. Of these, —$C(R^7)(R^8)$— and —$Si(R^9)(R^{10})$— are preferable, and —$C(R^7)(R^8)$— is particularly preferable.

Z is a bonding group of N and represents —$R^{13}$ and —$R^{14}$, =$C(R^{15})R^{16}$ or =$NR^{16}$.

$R^1$ to $R^{17}$ may be the same or different, and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring. It is preferable that any one of $R^6$, $R^{13}$ and $R^{14}$ is an atom or a group other than a hydrogen atom.

$R^1$ to $R^{17}$ may be the same or different and are each preferably a hydrogen atom, a halogen atom, a hydrocarbon group, a heterocyclic compound residual group, an oxygen-containing group, a nitrogen-containing group, an aluminum-containing group, a sulfur-containing group or a silicon-containing group.

More specifically, it is preferable that $R^1$ to $R^{17}$ is a hydrogen atom, a halogen atom, a hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an imido group, an amino group, an imino group, a sulfonato ester group, a sulfona-mido group, a cyano group, a nitro group, a carboxyl group, a sulfo group, a mercapto group or a hydroxy group. It is preferable that $R^{13}$ or $R^{14}$ is an atom or a group other than a hydrogen atom.

$R^1$ to $R^4$ are each preferably a hydrogen atom, a hydrocarbon group, a heterocyclic compound residual group, a hydrocarbon-substituted silyl group or a hydrocarbon-substituted siloxy group, and particularly preferably a hydrogen atom, a hydrocarbon group, a heterocyclic compound residual group or a hydrocarbon-substituted silyl group.

Also, $R^5$ to $R^{17}$ are each preferably a hydrogen atom, a hydrocarbon group, a heterocyclic compound residual group, a hydrocarbon-substituted silyl group, a hydrocarbon-substituted siloxy group or an aluminum-containing group, and particularly preferably a hydrogen atom, a hydrocarbon group, a heterocyclic compound residual group or an aluminum-containing.

Examples of the groups indicated by $R^1$ to $R^{17}$ include the same groups as previously exemplified with respect to $R^1$ to $R^{17}$ in the formula (a).

Examples of the groups D include the same groups as previously exemplified with respect to D in the formula (a).

In the transition metal compound obtained by reacting the compound represented by the formula (d) with the metallic compound represented by the formula (e), the molar ratio of the ligands to the metal atoms is in the range of 1 to 6, preferably 1 to 4, more preferably 1 or 2, said ligands being derived from the compound of the formula (d) and bonded to the metal atoms.

There is no specific limitation on the bond-forming reaction of the compound represented by any of the formulas (a) to (d) with the metallic compound represented by the formula (e), and for example, the compound represented by any of the formulas (a) to (d) is per se allowed to react with the metallic compound of the formula (e), e.g., a transition metal halide or a transition metal alkylate, or the compound represented by any of the formulas (a) to (c) is allowed to react with a base to give an anion and the anion is allowed to react with the metallic compound of the formula (e), e.g., a transition metal halide or a transition metal alkylate, as described later.

The fifth transition metal compound for use in the invention is a compound represented by the following formula (I):

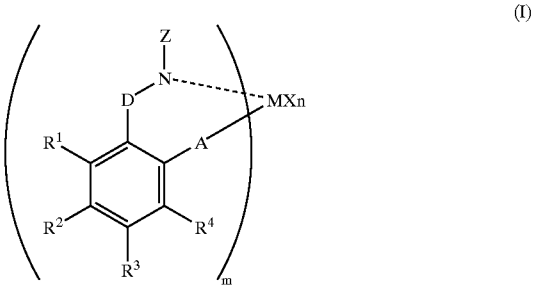

(I)

wherein the dotted line between atoms (N----M) is used to designate a coordinate bond, but the invention also includes a compound having no such a coordinate bond.

In the formula (I), M is a transition metal atom of Group 3 (including lanthanoid) to Group 11 of the periodic table, preferably a metal atom of Group 3 (including lanthanoid) to Group 10, more preferably a metal atom of Group 3 to Group 5 and Group 8 to Group 10, particularly preferably a metal atom of Group 4 or Group 5. Examples of the metal atoms include the same metal atoms as previously described with respect to M in the aforesaid formula (e).

m is an integer of 1 to 6, preferably 1 to 4, more preferably 1 or 2.

A is an oxygen atom, a sulfur atom, a selenium atom or a nitrogen atom having a bonding group —$R^5$.

D is —$C(R^7)(R^8)$—, —$Si(R^9)(R^{10})$—, —$P(O)(R^{11})$—, —$P(R^{12})$—, —SO— or —S—. Of these, —$C(R^7)(R^8)$— and —$Si(R^9)(R^{10})$— are preferable, and —$C(R^7)(R^8)$— is particularly preferable. When D contains a hetero atom, a coordinate bond may be formed between M and D in the formula (I). Presence of a coordinate bond can be confirmed by means of IR, NMR or X-ray crystal structure analysis.

Z is a bonding group of N and represents —$R^{13}$ and —$R^{14}$, =$C(R^{15})R^{16}$ or =$NR^{17}$. Of these, —$R^{13}$ and —$R^{14}$, or =$C(R^{15})R^{16}$ is preferable.

$R^1$ to $R^{17}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them, preferably adjacent groups, may be bonded to each other to form an aliphatic ring, an aromatic ring or a hydrocarbon ring containing a hetero atom such as a nitrogen atom. These rings may further have a substituent. It is preferable that $R^{12}$ or $R^{13}$ is an atom or a group other than a hydrogen atom.

When m is a plural number, one group of $R^1$ to $R^{17}$ contained in one ligand and one group of $R^1$ to $R^{16}$ contained in other ligands may be bonded. When $R^{13}$s, $R^{14}$s, $R^{15}$s, $R^{16}$s, or $R^{17}$s are bonded to each other, the main chain of the bond is preferably constituted of 3 or more atoms. $R^1$s, $R^2$s, $R^3$s, $R^4$s, $R^5$s, $R^7$s, $R^8$s, $R^9$s, $R^{10}$s, $R^{11}$s, $R^{12}$s, $R^{13}$s, $R^{14}$s, $R^{15}$s, $R^{16}$s, or $R^{17}$s may be the same or different, respectively. Examples of the groups indicated by $R^1$ to $R^{17}$ include the same groups as previously exemplified with respect to $R^1$ to $R^{17}$ in the formula (a).

Examples of the groups D include the same groups as previously exemplified with respect to D in the formula (a).

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group. Examples of the groups X include the same groups as previously exemplified with respect to X in the formula (e).

n is a number satisfying a valence of M, specifically an integer of 0 to 5, preferably 1 to 4, more preferably 1 to 3. When n is 2 or greater, plural groups X may be the same or different, and X may be bonded to each other to form a ring.

The transition metal compound represented by the formula (I) wherein m is 2 and one group of $R^1$ to $R^{17}$ contained in one ligand and one group of $R^1$ to $R^{17}$ contained in the other ligand are bonded is, for example, a compound represented by the following formula (I-a):

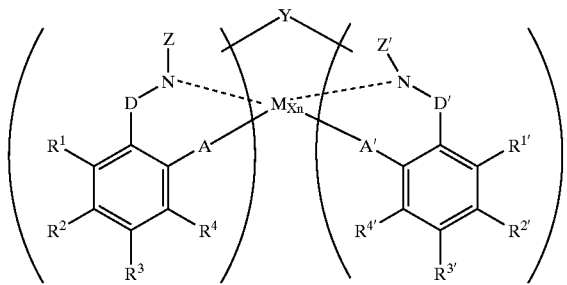

(I-a)

In the formula (I-a), A, D, Z, $R^1$ to $R^{17}$, M and X are the same as A, D, Z, $R^1$ to $R^{17}$, M and X in the aforesaid formula (I), and A' may be the same as or different from A and is an oxygen atom, a sulfur atom, a selenium atom or a nitrogen atom having a bonding group —$R^{5'}$. D' may be the same as or different from D and is —C($R^{7'}$)($R^{8'}$)—, —Si($R^{9'}$)($R^{10'}$)—, —P(O)($R^{11'}$)—, —P($R^{12'}$)—, —SO— or —S—. Of these, —C($R^{7'}$)($R^{8'}$)— is preferable. Z' may be the same as or different from Z, is a bonding group of N and represents —$R^{13'}$ and —$R^{14'}$, =C($R^{15'}$)$R^{16'}$ or =N$R^{17'}$.

$R^{1'}$ to $R^{17'}$ have the same meanings as those of $R^1$ to $R^{17}$ in the formula (I), respectively, and they preferably are each the following group.

That is, $R^{1'}$ to $R^{17'}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group. Examples of these atoms and groups include the same atoms and groups as previously descried with respect to $R^1$ to $R^{17}$ in the formula (a). However, it is preferable that $R^{13'}$ or $R^{14'}$ is an atom or a group other than a hydrogen atom. Two or more groups of $R^{1'}$ to $R^{17'}$, preferably adjacent groups, may be bonded to each other to form an aliphatic ring, an aromatic ring or a hydrocarbon ring containing a hetero atom such as a nitrogen atom.

Y is a bonding group or a single bond for bonding at least one group selected from $R^1$ to $R^{17}$ to at least one group selected from $R^{1'}$ to $R^{17'}$. Although the bonding group is not specifically limited, it preferably has a structure wherein the main chain is constituted of 3 or more atoms, preferably 4 to 20 atoms, particularly preferably 4 to 10 atoms. The bonding group may have a substituent.

The bonding group Y can be a group containing at least one element selected from oxygen, sulfur, carbon, nitrogen, phosphorus, silicon, selenium, tin and boron. Examples of such groups include groups containing halogen atoms such as —O—, —S—and —Se—; nitrogen- or phosphorus-containing groups, such as —NH—, —N(CH$_3$)$_2$—, —PH— and —P(CH$_3$)$_2$—; hydrocarbon groups of 1 to 20 carbon atoms, such as —CH$_2$—, —CH$_2$—CH$_2$— and —C(CH$_3$)$_2$—; residual groups of cyclic unsaturated hydrocarbons of 6 to 20 carbon atoms, such as benzene, naphthalene and anthracene; residual groups of heterocyclic compounds having 3 to 20 carbon atoms and containing hetero atoms, such as pyridine, quinoline, thiophene and furan; silicon-containing groups, such as —SiH$_2$— and —Si(CH$_3$)$_2$—; tin-containing groups, such as —SnH$_2$— and —Sn(CH$_3$)$_2$—; and boron-containing groups, such as —BH—, —B(CH$_3$)— and —BF—. Y can also be a single bond.

Examples of the transition metal compounds represented by the formula (I) are given below, but not limited thereto.

In the following examples, M is a transition metal atom of Group 3 to Group 11 of the periodic table, and particular examples of such metals include scandium, yttrium, lanthanoid, titanium, zirconium, hafnium, vanadium, niobium, tantalum, chromium, molybdenum, tungsten, manganese, rhenium, iron, ruthenium, cobalt, rhodium, nickel and palladium. Of these, preferable are scandium, lanthanoid, titanium, zirconium, hafnium, vanadium, niobium, tantalum, iron, cobalt, rhodium, nickel and palladium. More preferable are titanium, zirconium, hafnium, vanadium, niobium, tantalum, iron, cobalt and rhodium. Particularly preferable are titanium, zirconium and hafnium.

X is halogen such as Cl or Br, or an alkyl group such as methyl, but not limited thereto. When plural X are present, they may be the same or different.

n is decided by a valence of the metal M. For example, when two monoanions are bonded to the metal, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), and n=2 in case of Hf(IV).

In the following examples, Me denotes methyl, Et denotes ethyl, iPr denotes i-propyl, tBu denotes tert-butyl, and Ph denotes phenyl.

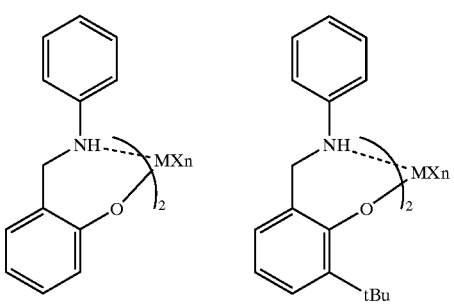

-continued
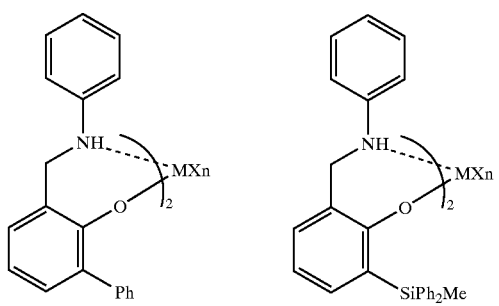
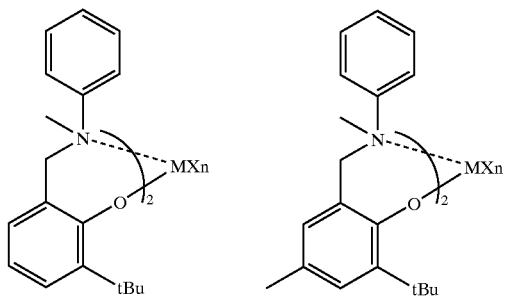
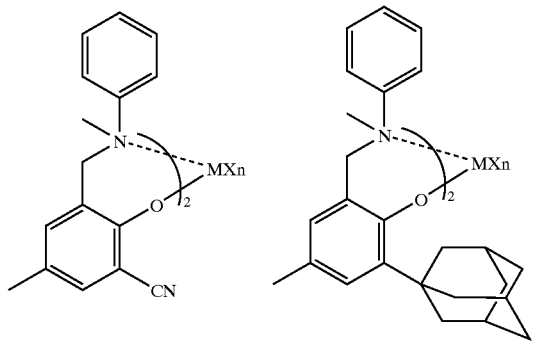
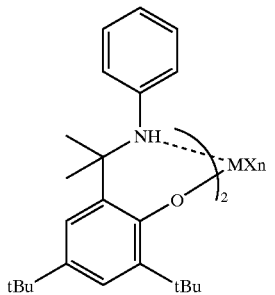
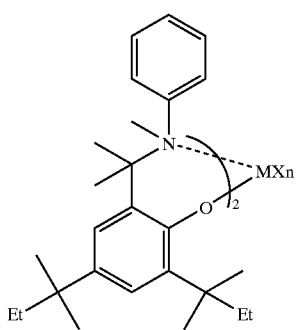
-continued
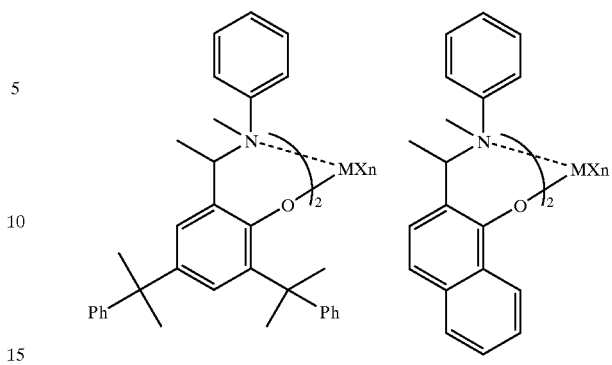
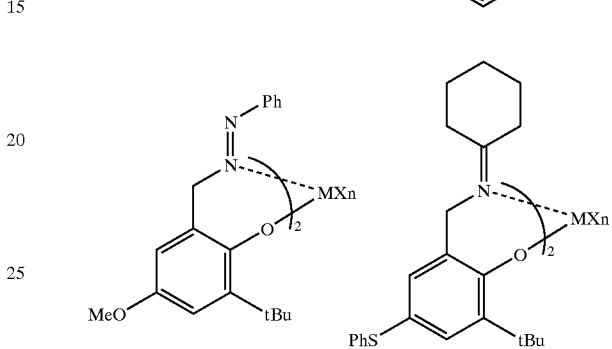
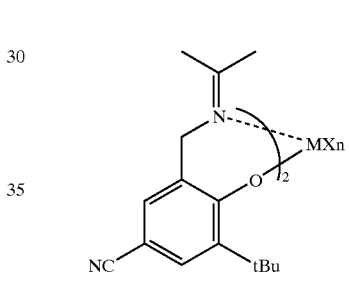
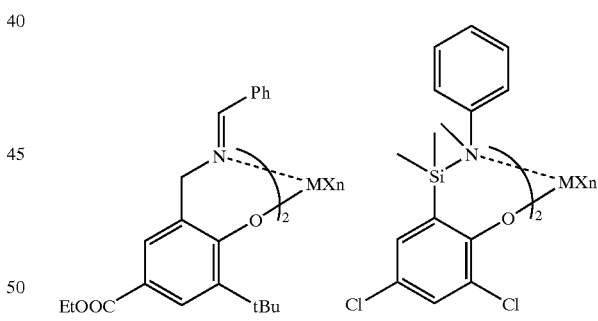
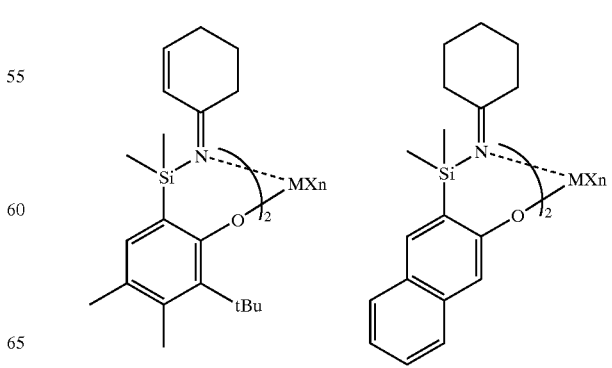

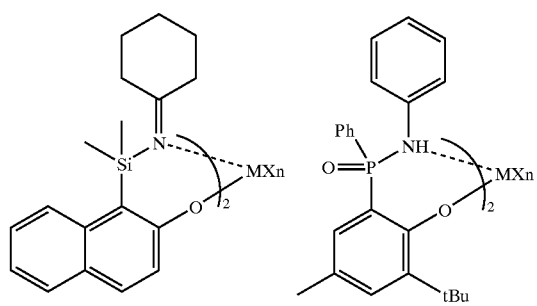
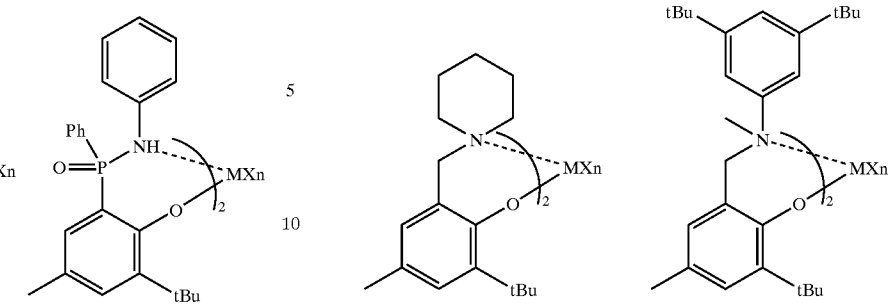
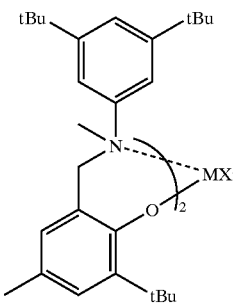
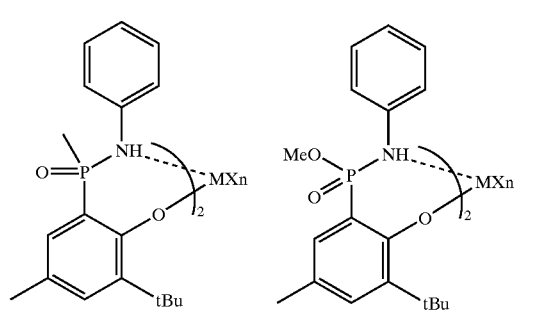
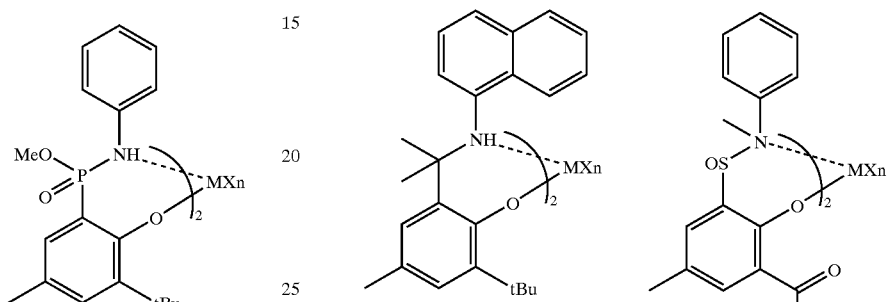
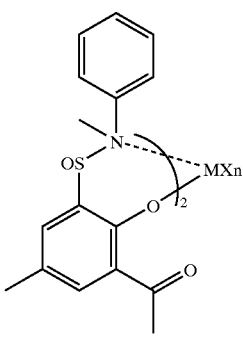
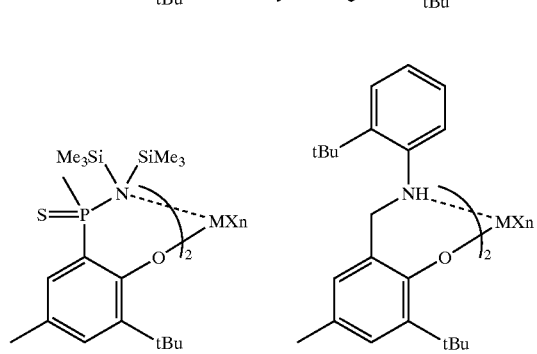
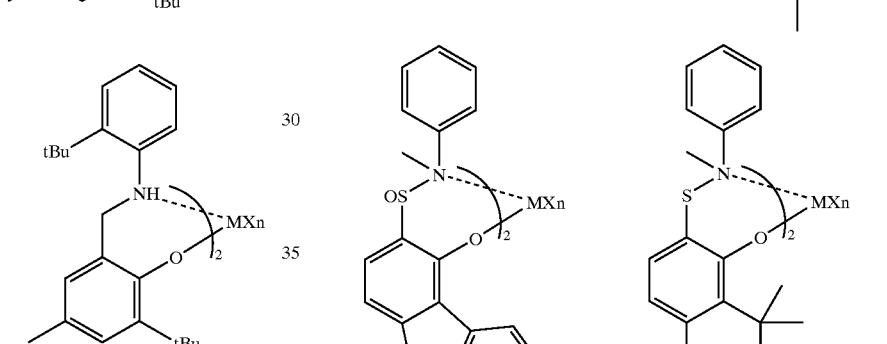
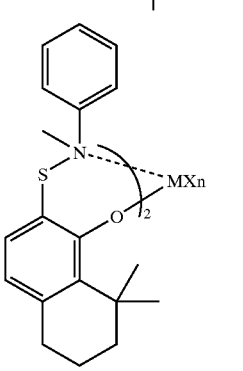
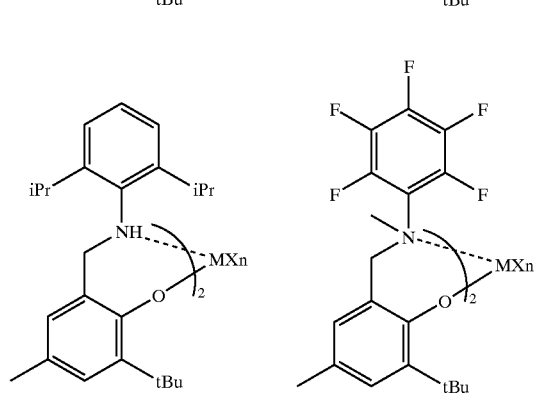
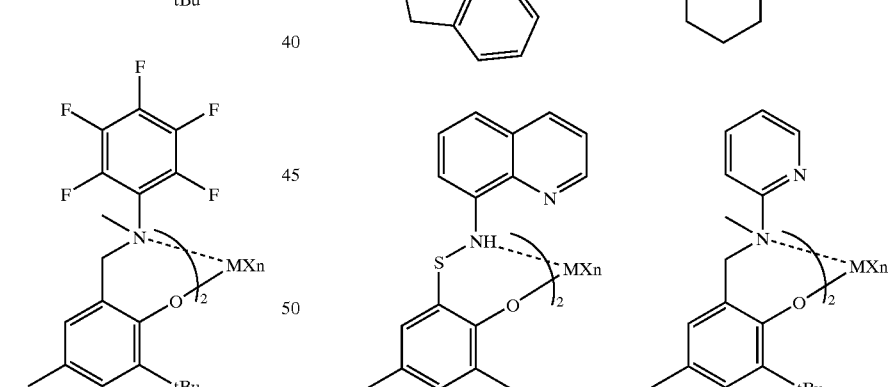
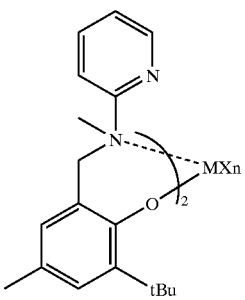
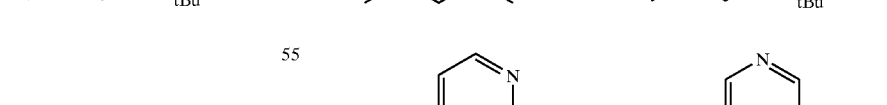
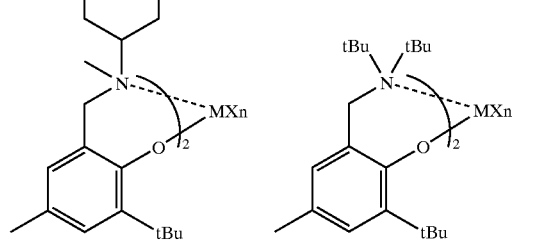
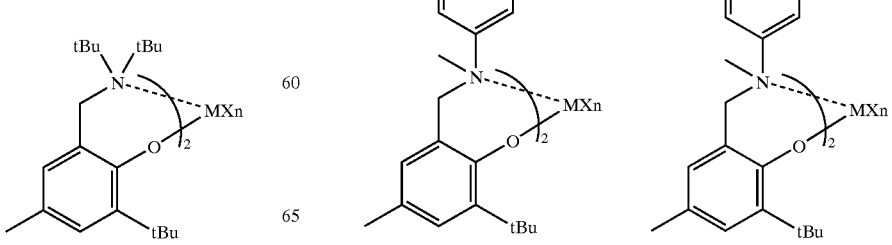
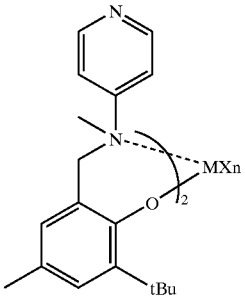

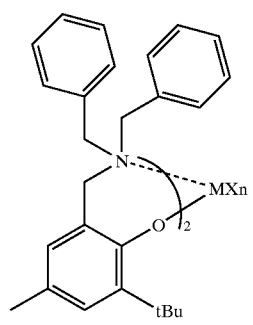
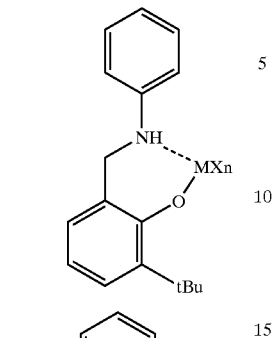
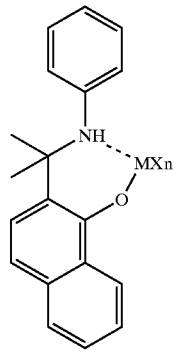
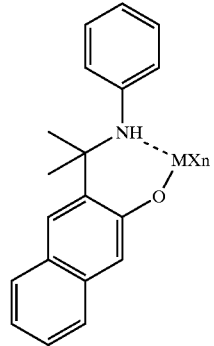
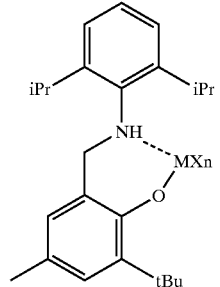
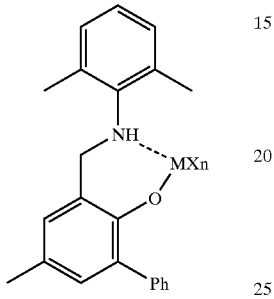
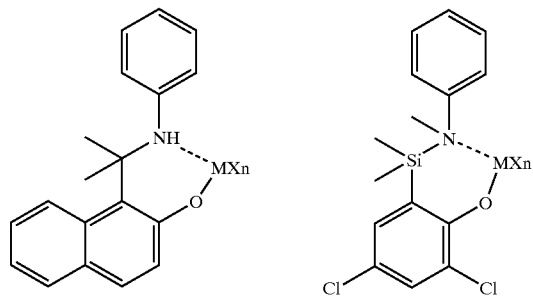
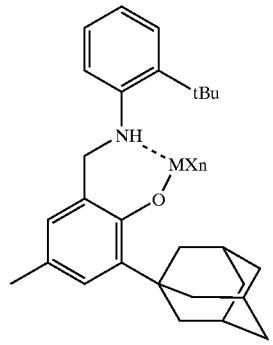
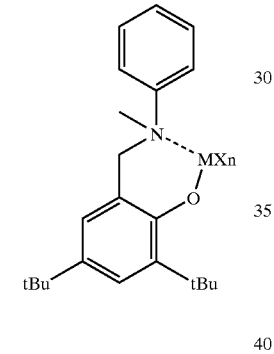
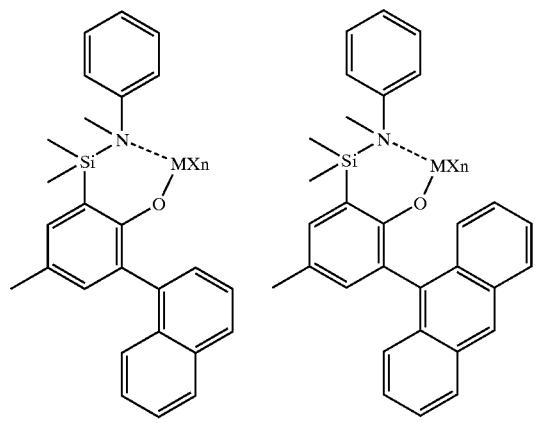
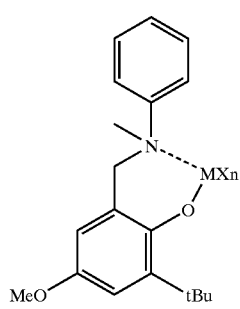
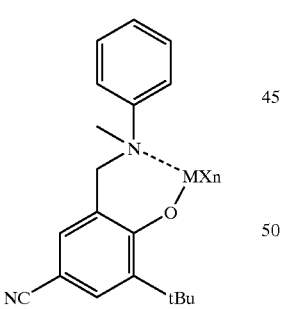
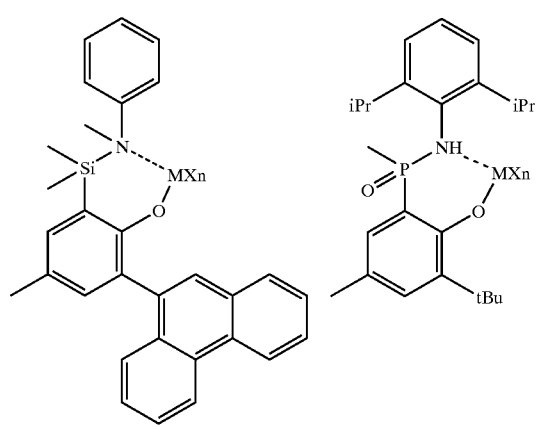
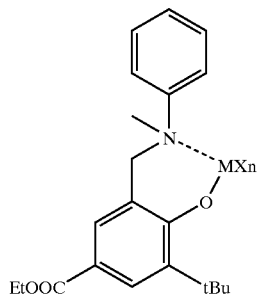
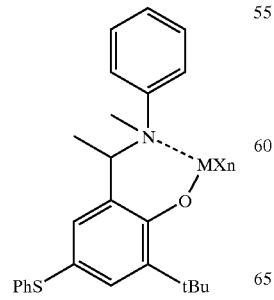

-continued
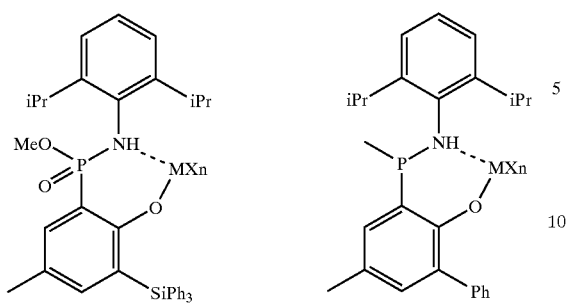
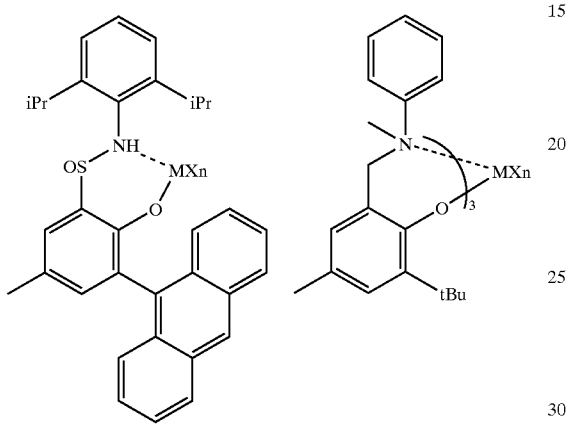
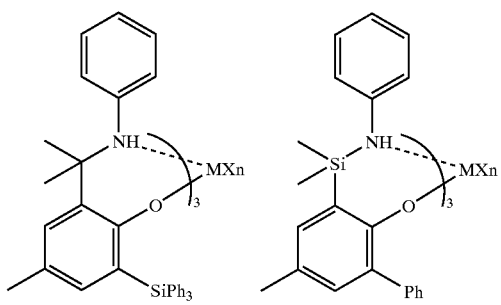
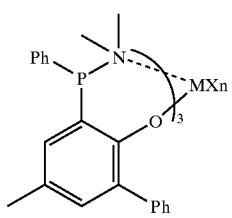
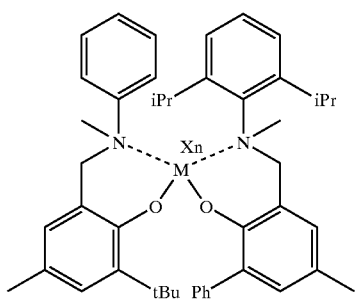
-continued
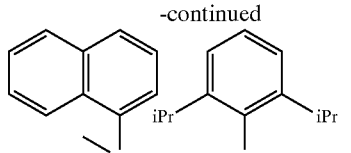
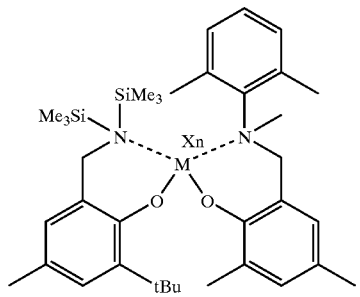
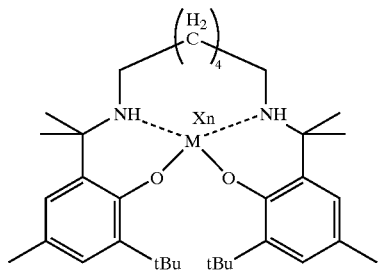
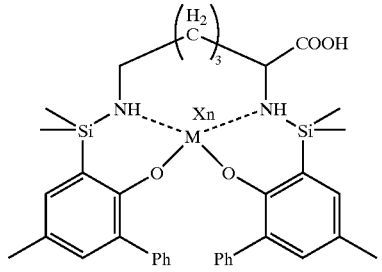
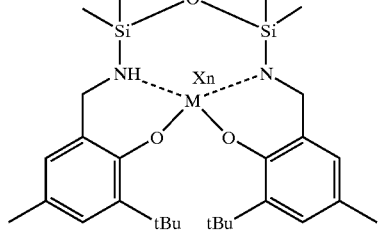
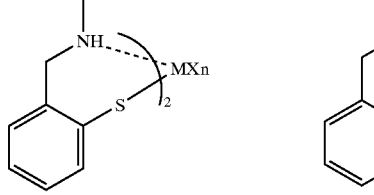

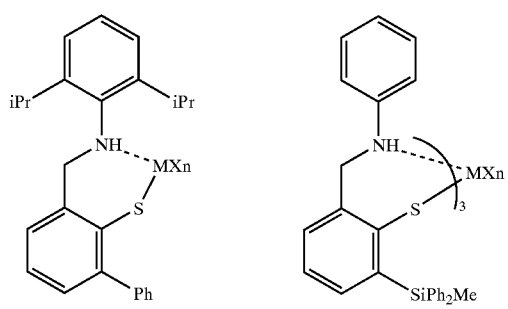
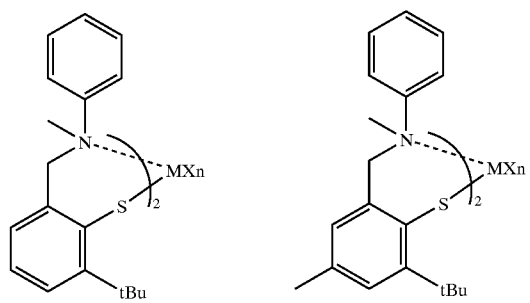
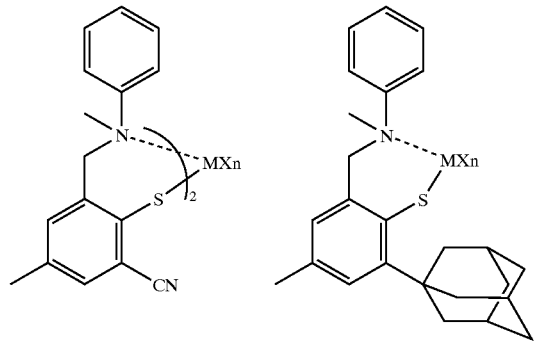
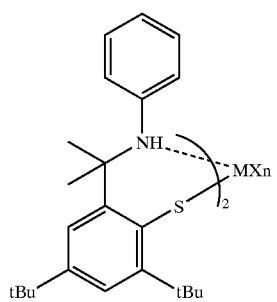
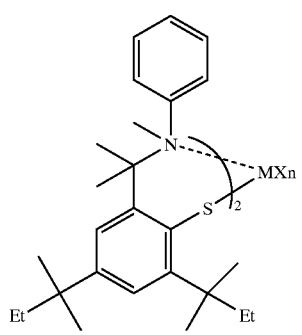
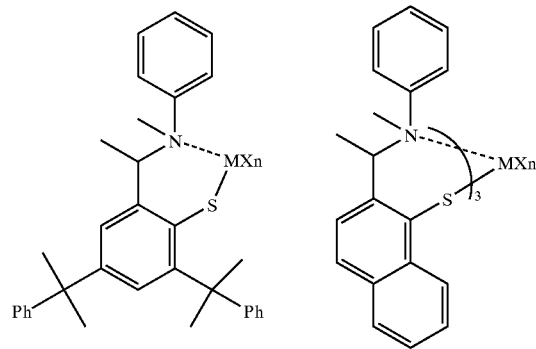
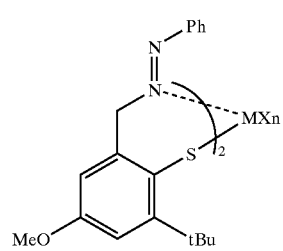
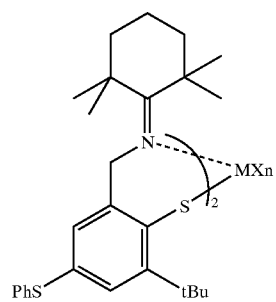
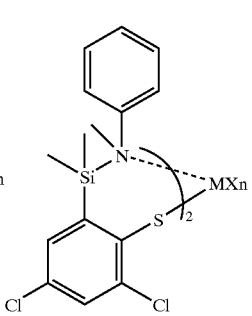
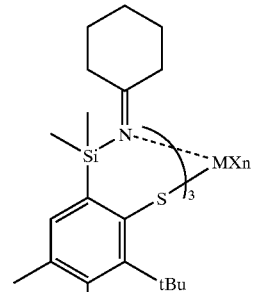

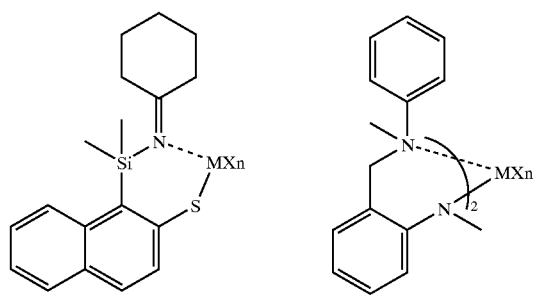
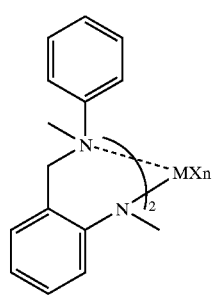
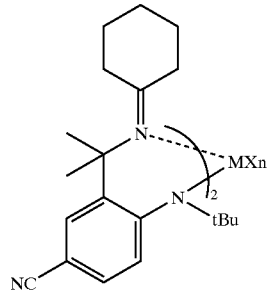
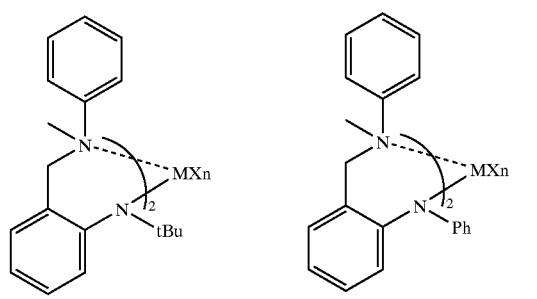
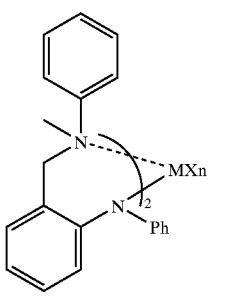
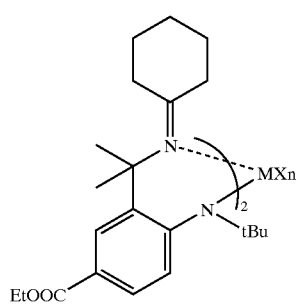
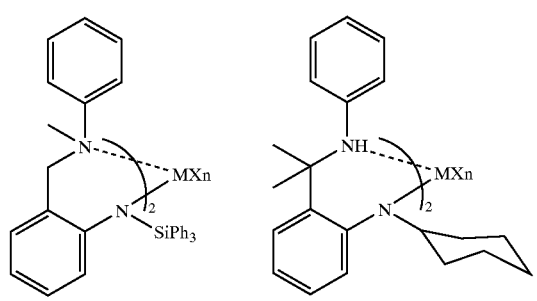
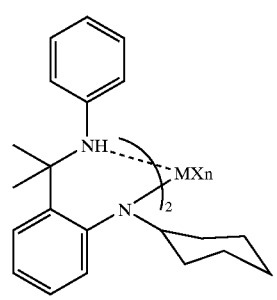
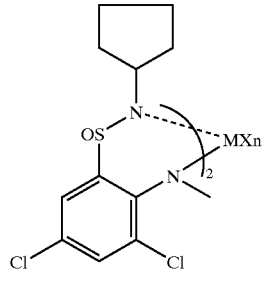
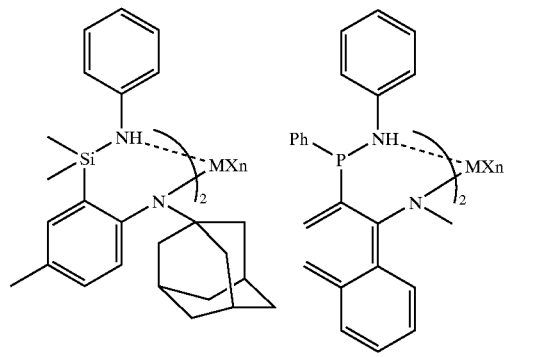
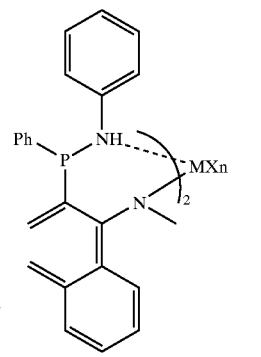
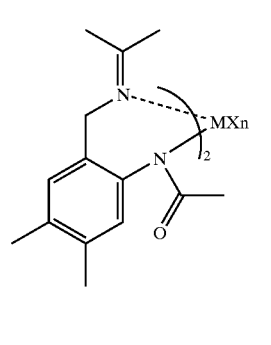
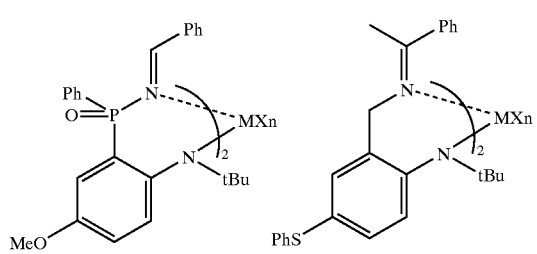
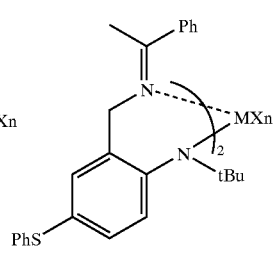
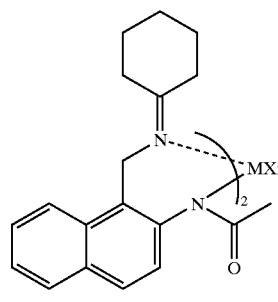

-continued
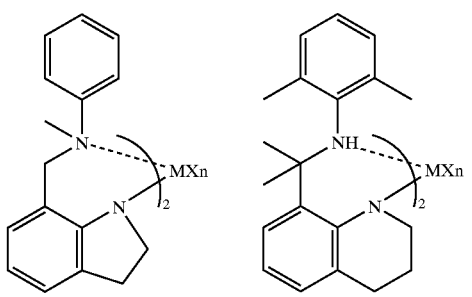
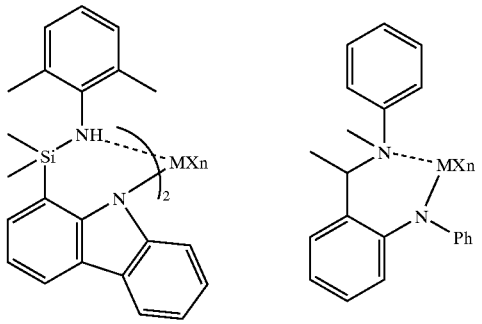
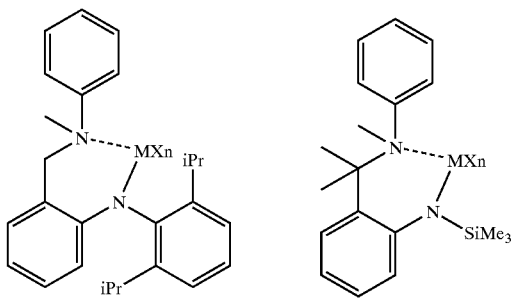
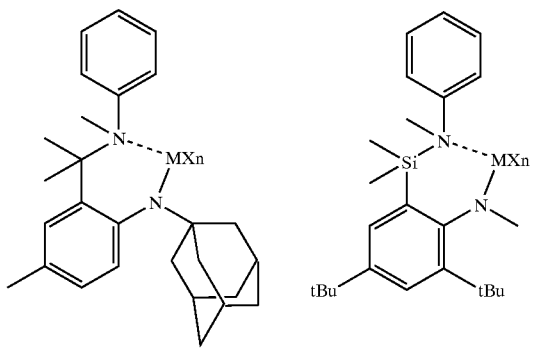
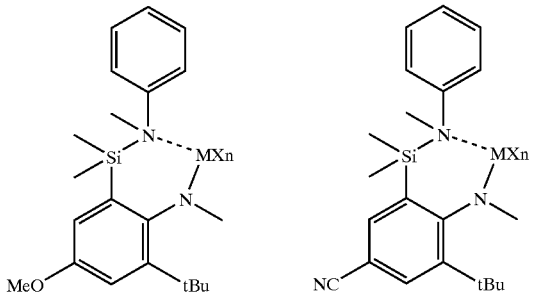
-continued
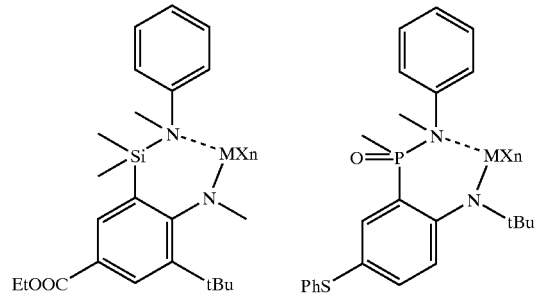
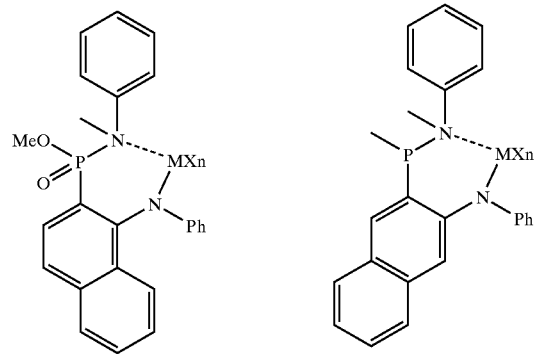
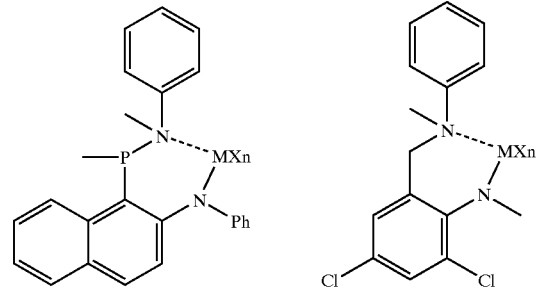
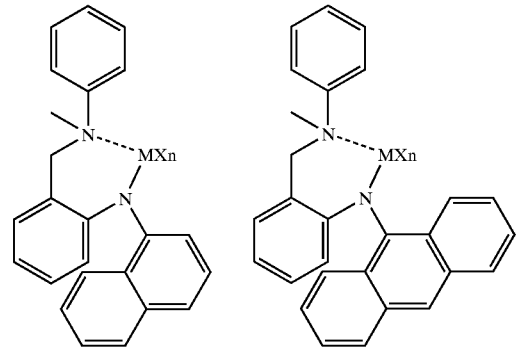
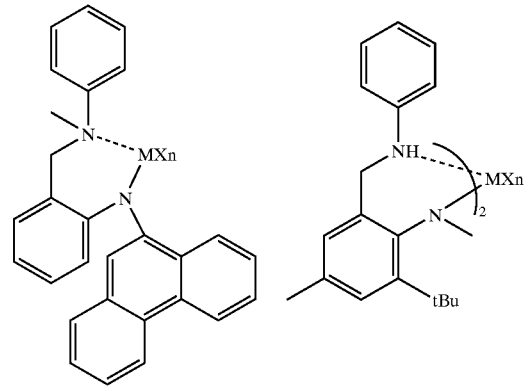

-continued
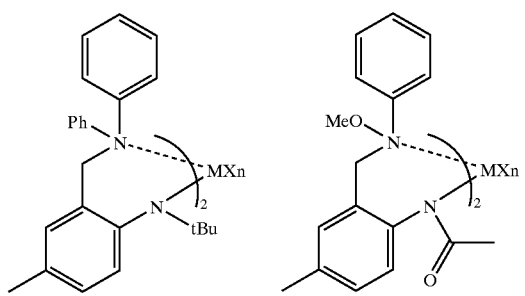
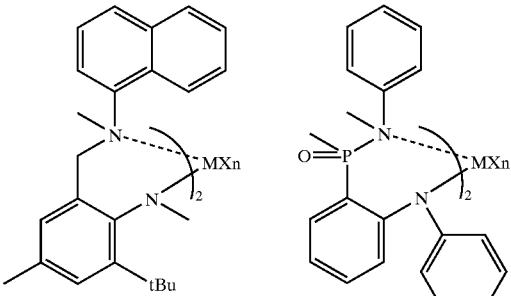
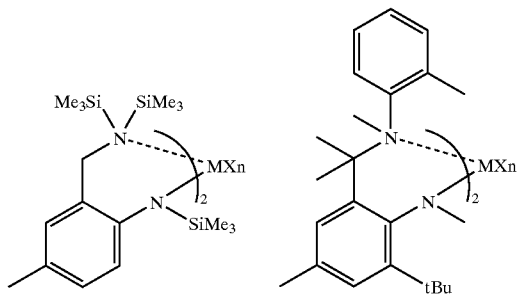
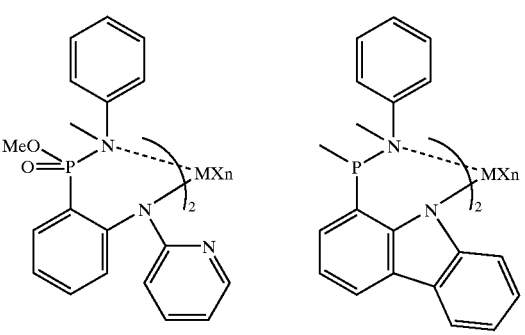
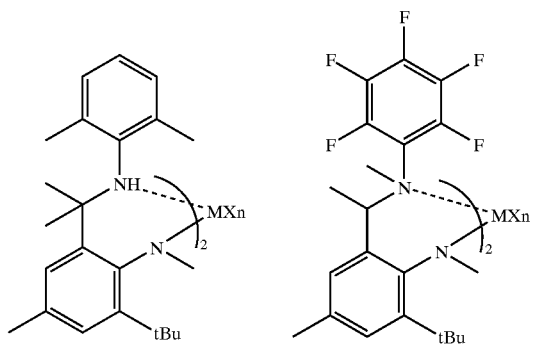
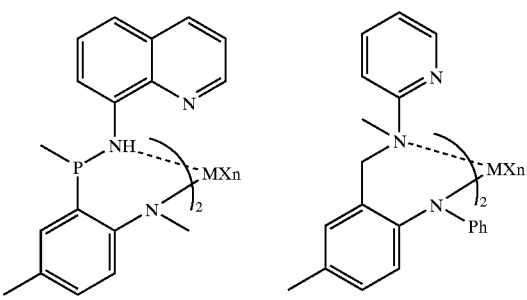
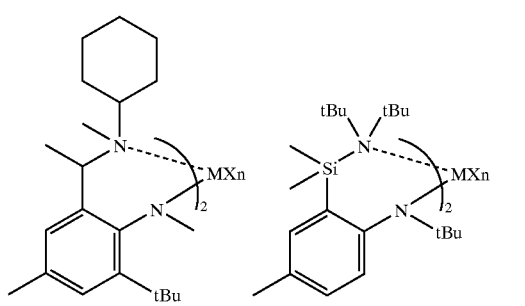
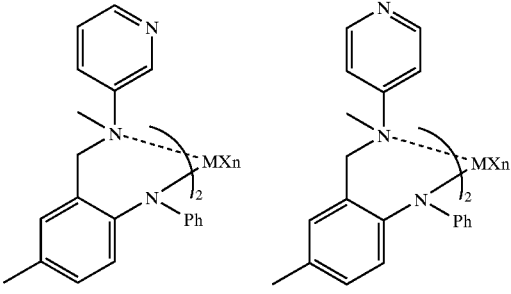
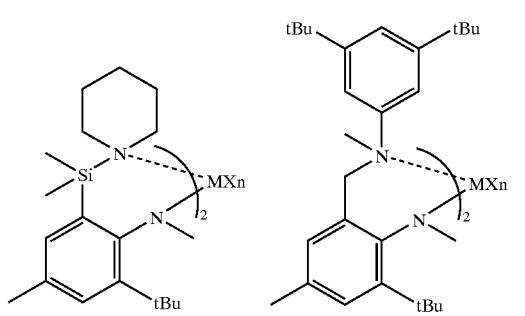
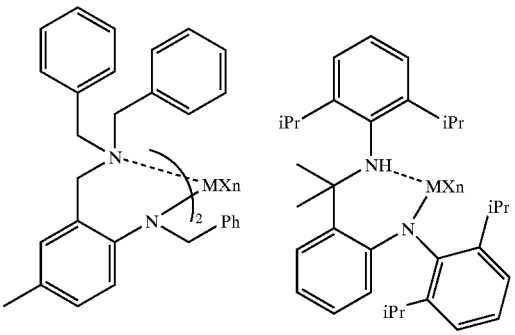

-continued
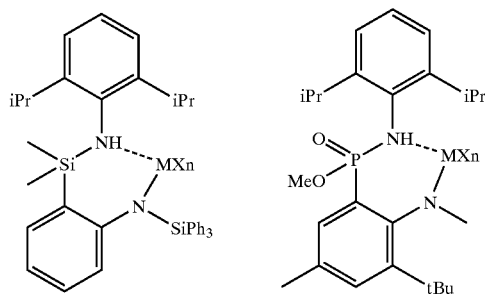 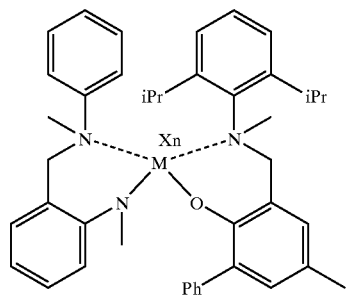
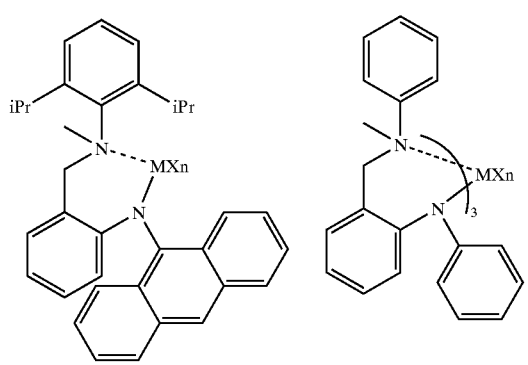 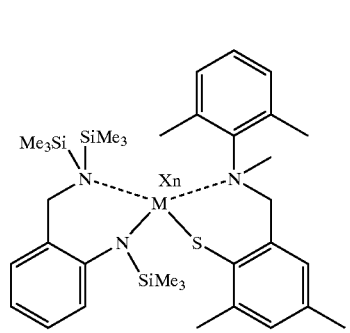
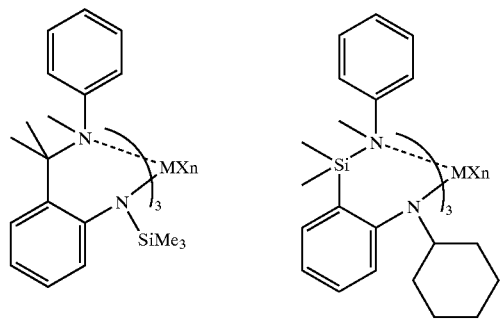 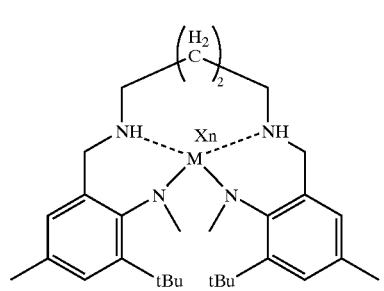
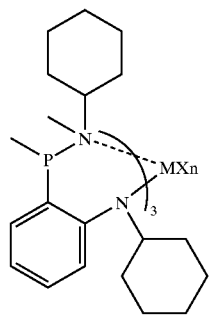 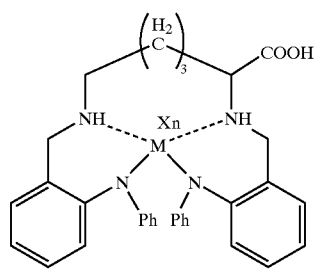
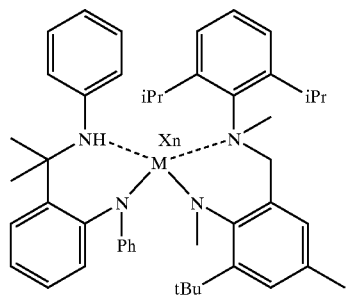 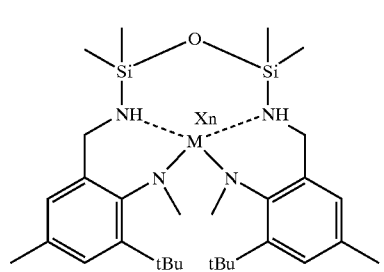

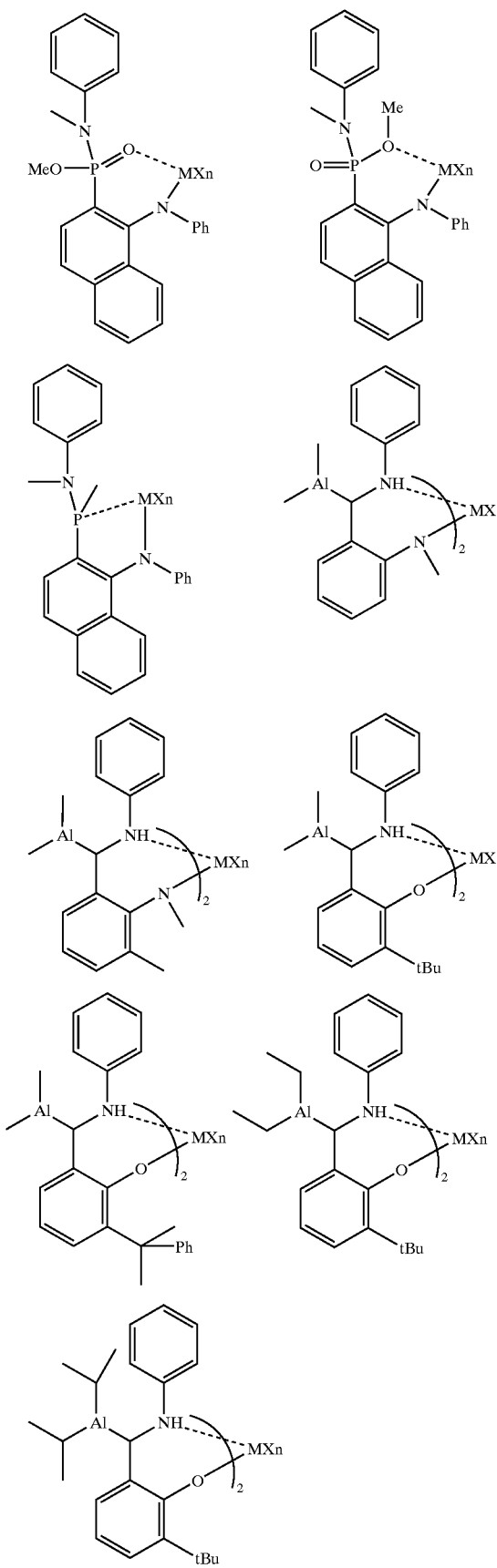
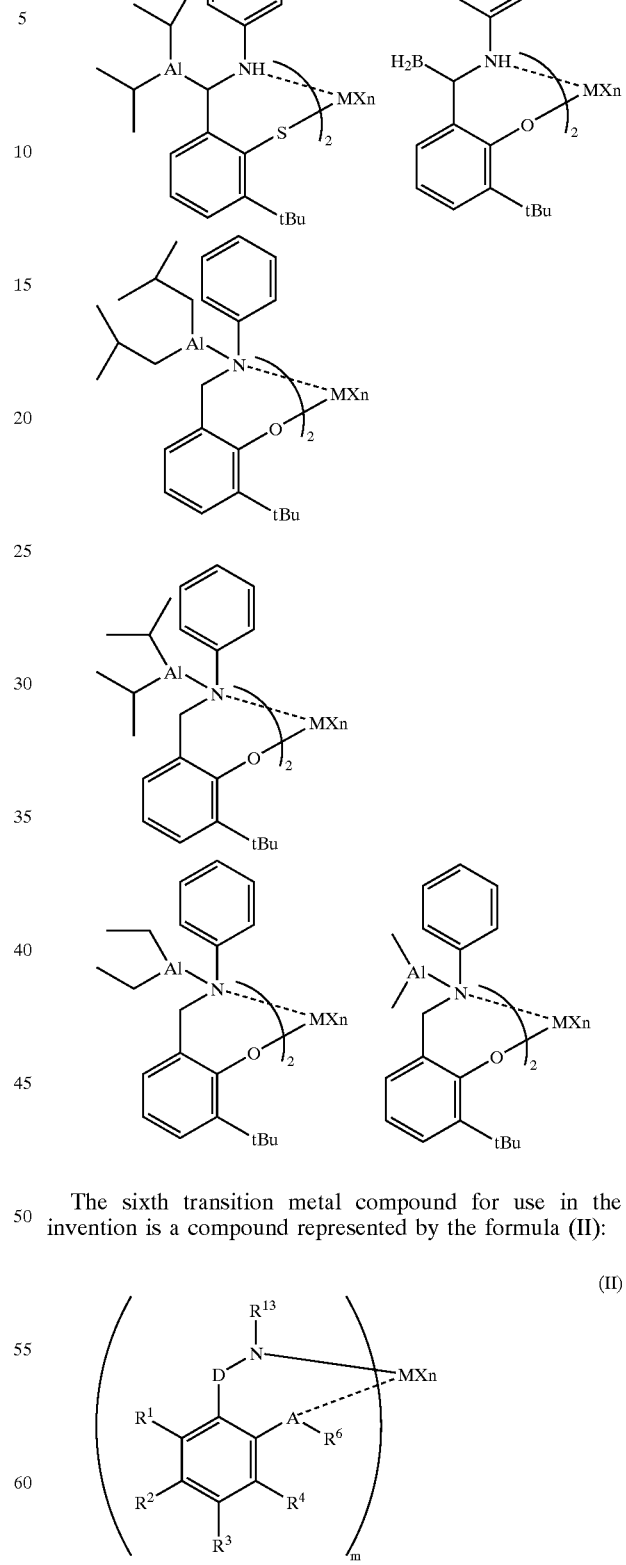
The sixth transition metal compound for use in the invention is a compound represented by the formula (II):
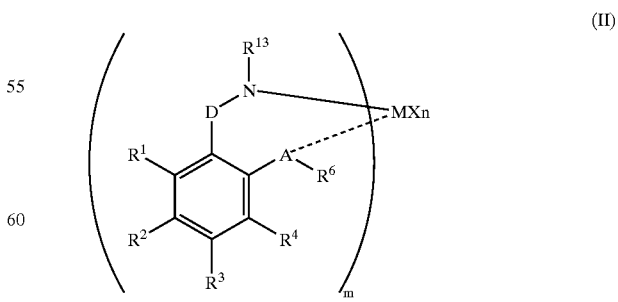
wherein the dotted line between atoms (A----M) is used to designate a coordinate bond, but the invention also includes a compound having no such a coordinate bond.

In the formula (II), M is a transition metal atom of Group 3 (including lanthanoid) to Group 11 of the periodic table, preferably a metal atom of Group 3 (including lanthanoid) to Group 10, more preferably a metal atom of Group 3 to Group 5 and Group 8 to Group 10, particularly preferably a metal atom of Group 4 or Group 5. Examples of the metal atoms include the same metal atoms as previously described with respect to M in the aforesaid formula (e).

m is an integer of 1 to 6, preferably 1 to 4, more preferably 1 or 2.

A is an oxygen atom, a sulfur atom, a selenium atom or a nitrogen atom having a bonding group —$R^5$.

D is —$C(R^7)(R^8)$—, —$Si(R^9)(R^{10})$—, —$P(O)(R^{11})$—, —$P(R^{12})$—, —SO— or —S—. Of these, —$C(R^7)(R^8)$— and —$Si(R^9)(R^{10})$— are preferable, and —$C(R^7)(R^8)$— is particularly preferable.

$R^1$ to $R^{13}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them, preferably adjacent groups, may be bonded to each other to form an aliphatic ring, an aromatic ring or a hydrocarbon ring containing a hetero atom such as a nitrogen atom. These rings may further have a substituent. It is preferable that $R^6$ is an atom or a group other than a hydrogen atom.

When m is a plural number, one group of $R^1$ to $R^{13}$ contained in one ligand and one group of $R^1$ to $R^{13}$ contained in other ligands may be bonded. $R^1$s, $R^2$s, $R^3$s, $R^4$s, $R^5$s, $R^6$s, $R^7$s, $R^8$s, $R^9$s, $R^{10}$s, $R^{11}$s, $R^{12}$s, or $R^{13}$s may be the same or different, respectively. Examples of the groups indicated by $R^1$ to $R^{13}$ include the same groups as previously exemplified with respect to $R^1$ to $R^{17}$ in the formula (a).

Examples of the groups D include the same groups as previously exemplified with respect to D in the formula (a).

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group. Examples of the groups X include the same groups as previously exemplified with respect to X in the formula (e).

n is a number satisfying a valence of M, specifically an integer of 0 to 5, preferably 1 to 4, more preferably 1 to 3. When n is 2 or greater, plural groups X may be the same or different, and may be bonded to each other to form a ring.

Examples of the transition metal compounds represented by the formula (II) are given below, but not limited thereto.

In the following examples, M is a transition metal atom of Group 3 to Group 11 of the periodic table, and particular examples of such metals include scandium, yttrium, lanthanoid, titanium, zirconium, hafnium, vanadium, niobium, tantalum, chromium, molybdenum, tungsten, manganese, rhenium, iron, ruthenium, cobalt, rhodium, nickel and palladium. Of these, preferable are scandium, lanthanoid, titanium, zirconium, hafnium, vanadium, niobium, tantalum, iron, cobalt, rhodium, nickel and palladium. More preferable are titanium, zirconium, hafnium, vanadium, niobium, tantalum, iron, cobalt and rhodium. Particularly preferable are titanium, zirconium and hafnium.

X is halogen such as Cl or Br, or an alkyl group such as methyl, but not limited thereto. When plural X are present, they may be the same or different.

n is decided by a valence of the metal M. For example, when two monoanions are bonded to the metal, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), and n=2 in case of Hf(IV).

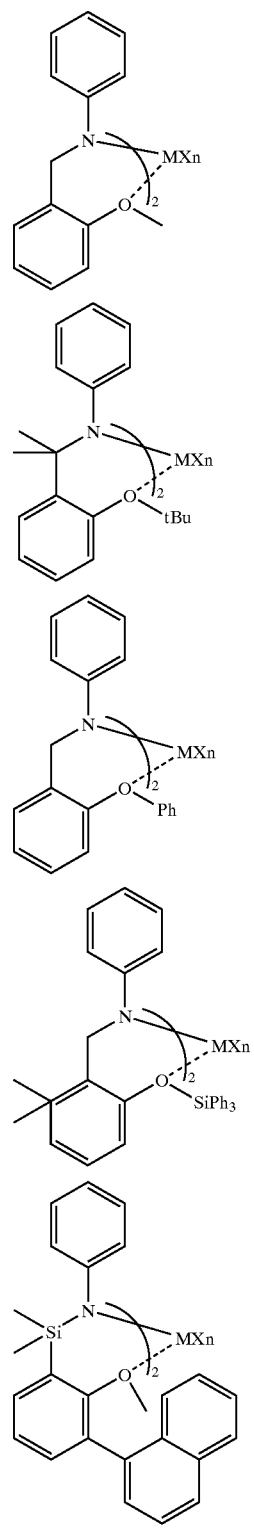

-continued
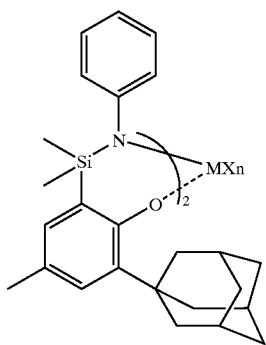
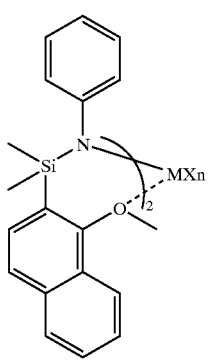
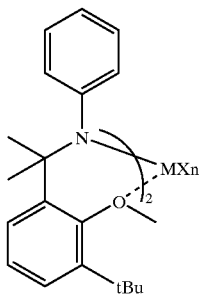
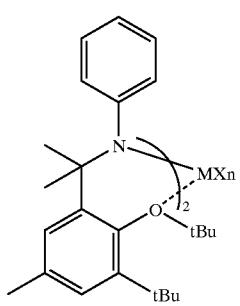
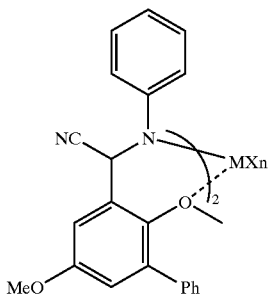
-continued
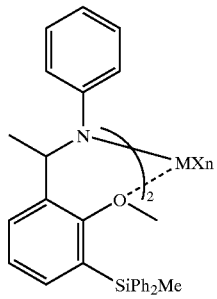
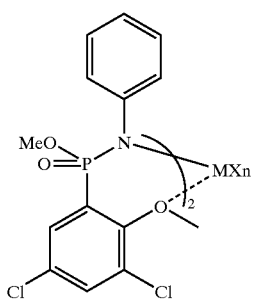
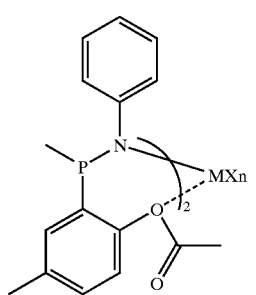
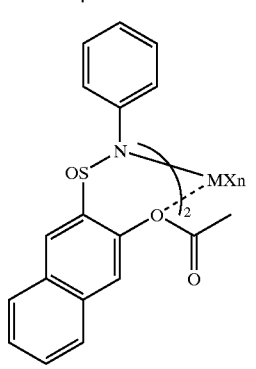
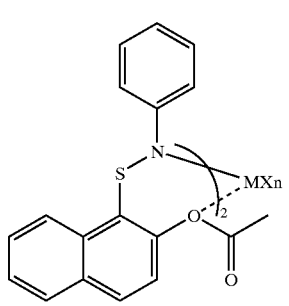

-continued
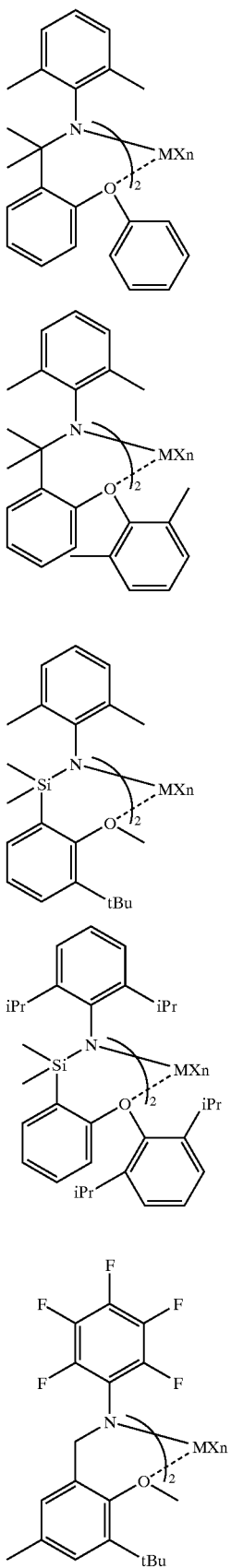
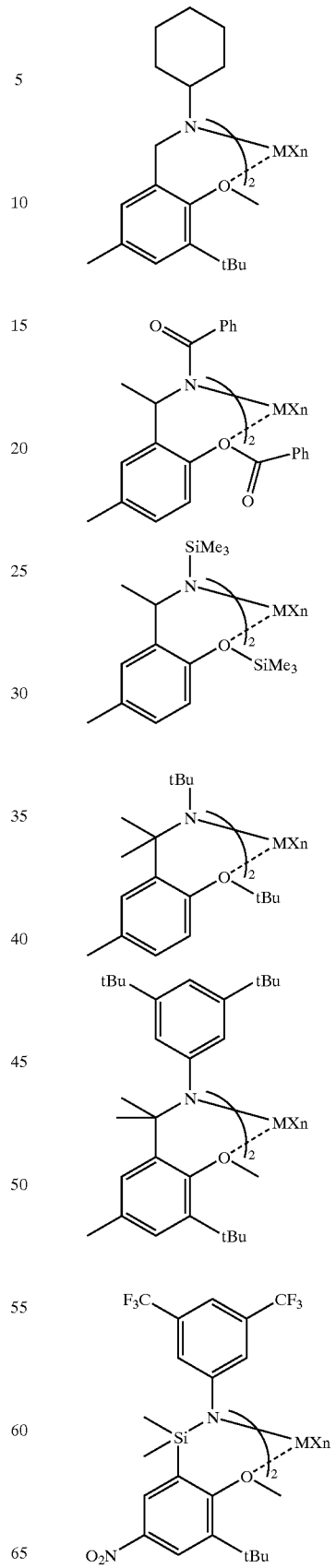

-continued
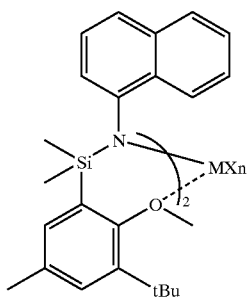
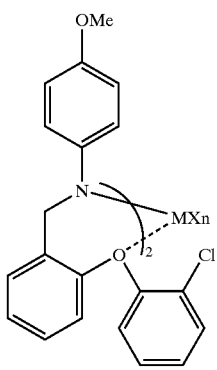
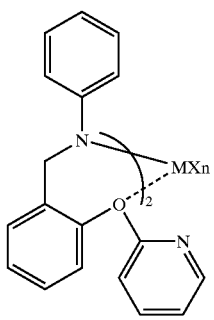
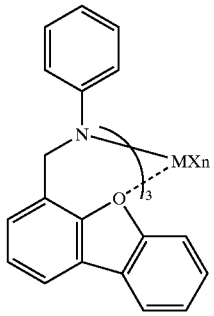
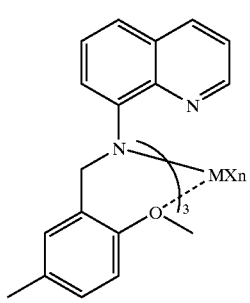
-continued
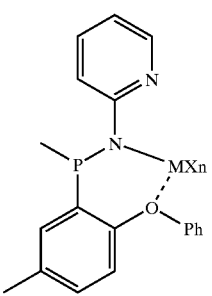
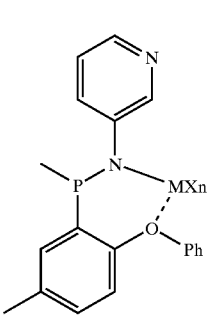
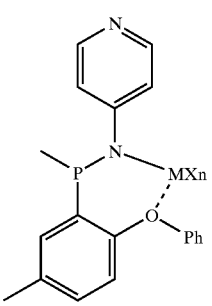
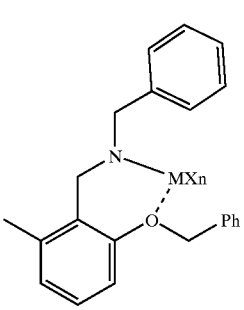
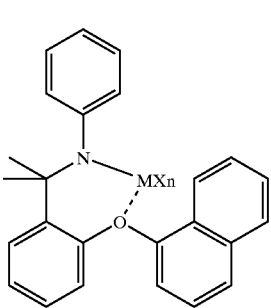

-continued
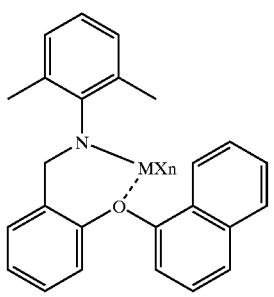
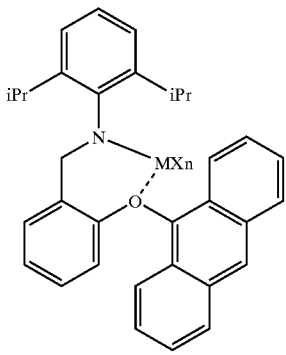
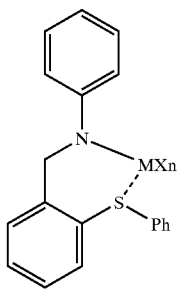
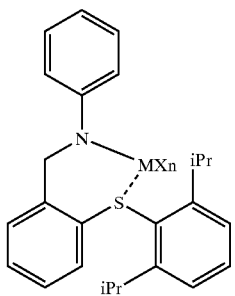
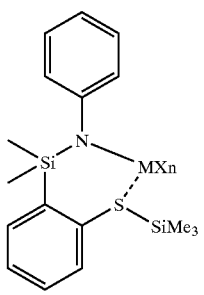
-continued
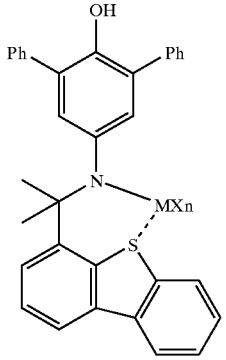
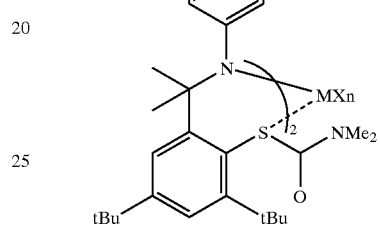
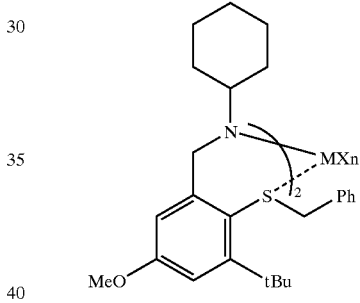
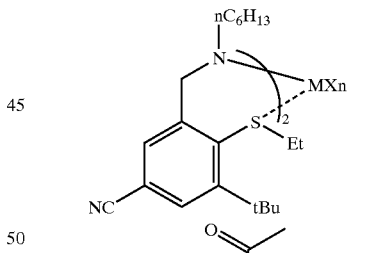
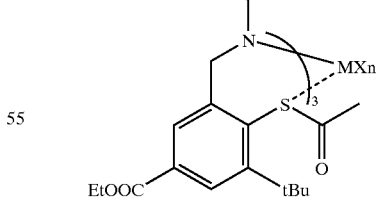
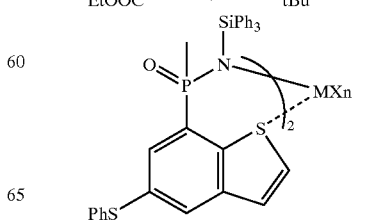

-continued
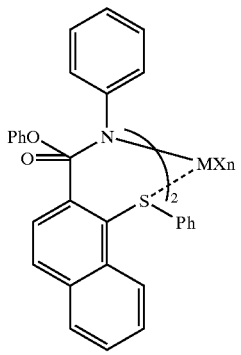
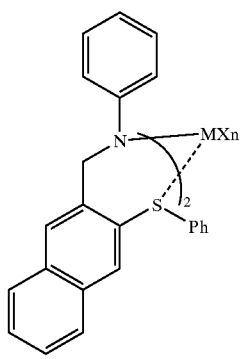
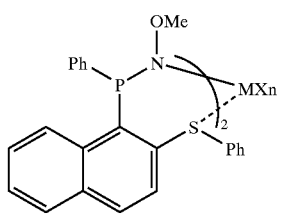
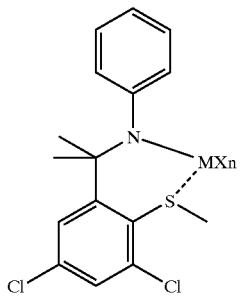
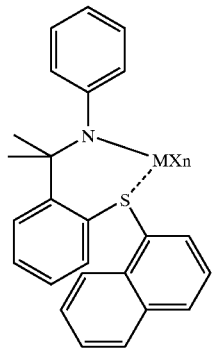
-continued
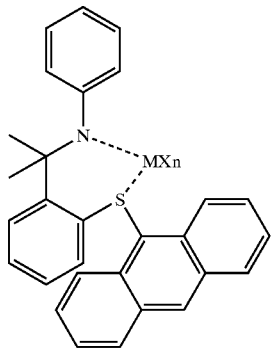
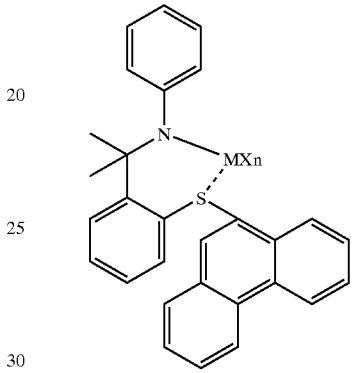
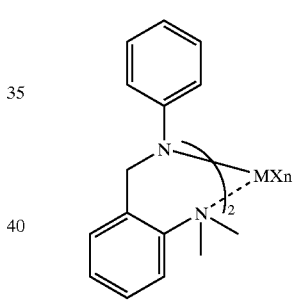
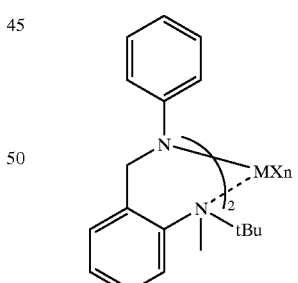
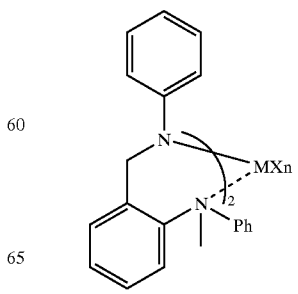

-continued
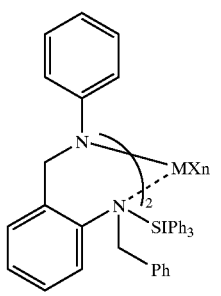
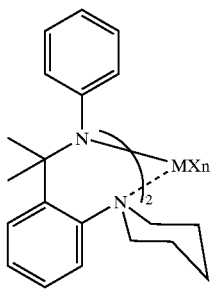
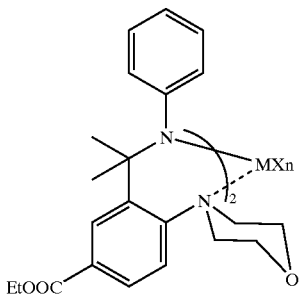
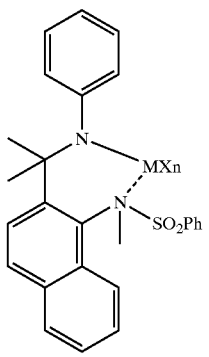
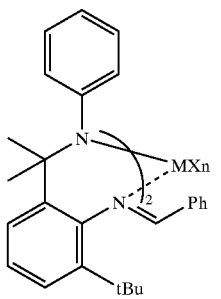
-continued
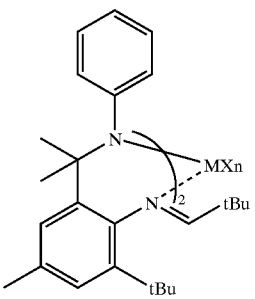
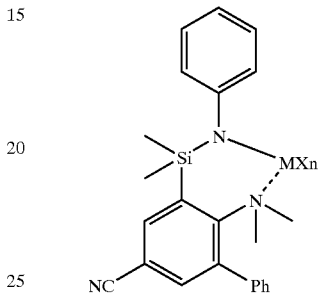
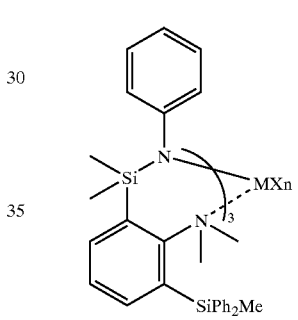
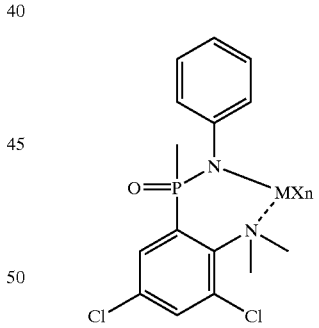
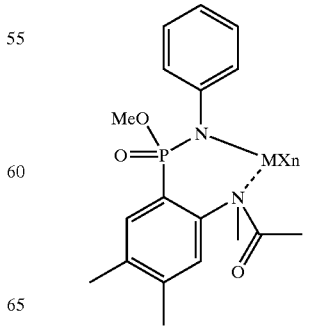

-continued

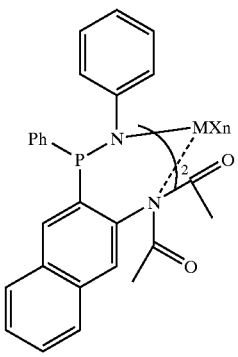

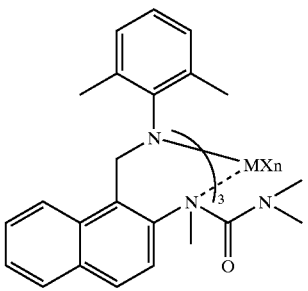

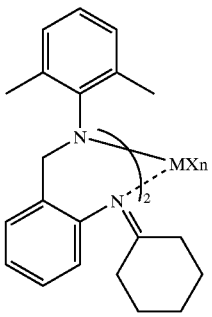

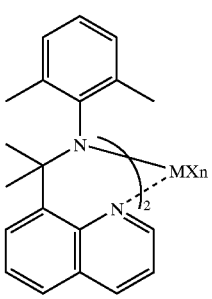

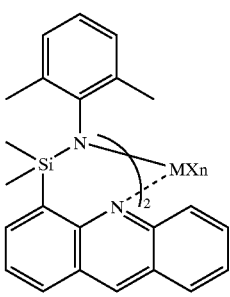

-continued

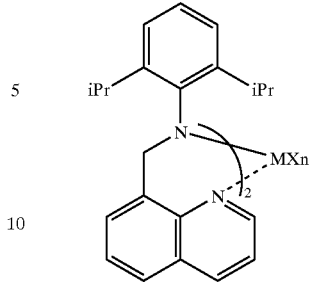

The seventh transition metal compound for use in the invention is a compound represented by the formula (III):

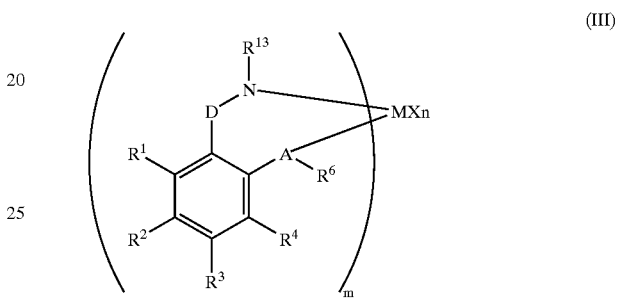

(III)

In the formula (III), M is a transition metal atom of Group 3 (including lanthanoid) to Group 11 of the periodic table, preferably a metal atom of Group 3 (including lanthanoid) to Group 10, more preferably a metal atom of Group 3 to Group 5 and Group 8 to Group 10, particularly preferably a metal atom of Group 4 or Group 5. Examples of the metal atoms include the same metal atoms as previously described with respect to M in the aforesaid formula (e).

m is an integer of 1 to 3, preferably 1 or 2.

A is an oxygen atom, a sulfur atom, a selenium atom or a nitrogen atom having a bonding group —$R^5$.

D is —$C(R^7)(R^8)$—, —$Si(R^9)(R^{10})$—, —$P(O)(R^{11})$—, —$P(R^{12})$—, —SO— or —S—. Of these, —$C(R^7)(R^8)$— and —$Si(R^9)(R^{10})$— are preferable, and, —$C(R^7)(R^8)$— is particularly preferable.

$R^1$ to $R^{13}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them, preferably adjacent groups, may be bonded to each other to form an aliphatic ring, an aromatic ring or a hydrocarbon ring containing a hetero atom such as a nitrogen atom. These rings may further have a substituent.

When m is a plural number, one group of $R^1$ to $R^{13}$ contained in one ligand and one group of $R^1$ to $R^{13}$ contained in other ligands may be bonded. $R^1$s, $R^2$s, $R^3$s, $R^4$s, $R^5$s, $R^7$s, $R^8$s, $R^9$s, $R^{10}$s, $R^{11}$s, $R^{12}$s, or $R^{13}$s may be the same or different, respectively. Examples of the groups $R^1$ to $R^{13}$ include the same groups as previously exemplified with respect to $R^1$ to $R^{17}$ in the formula (a).

Examples of the groups D include the same groups as previously exemplified with respect to D in the formula (a).

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group. Examples of the groups X include the same groups as previously exemplified with respect to X in the formula (e).

n is a number satisfying a valence of M, specifically an integer of 0 to 5, preferably 1 to 4, more preferably 1 to 3. When n is 2 or greater, plural groups X may be the same or different, and may be bonded to each other to form a ring.

Examples of the transition metal compounds represented by the formula (III) are given below, but not limited thereto.

In the following examples, M is a transition metal atom of Group 3 to Group 11 of the periodic table, and particular examples of such metals include scandium, yttrium, lanthanoid, titanium, zirconium, hafnium, vanadium, niobium, tantalum, chromium, molybdenum, tungsten, manganese, rhenium, iron, ruthenium, cobalt, rhodium, nickel and palladium. Of these, preferable are scandium, lanthanoid, titanium, zirconium, hafnium, vanadium, niobium, tantalum, iron, cobalt, rhodium, nickel and palladium. More preferable are titanium, zirconium, hafnium, vanadium, niobium, tantalum, iron, cobalt and rhodium. Particularly preferable are titanium, zirconium and hafnium.

X is halogen such as Cl or Br, or an alkyl group such as methyl, but not limited thereto. When plural X are present, they may be the same or different.

n is decided by a valence of the metal M. For example, when one dianion is bonded to the metal, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), n=2 in case of Hf(IV), n=0 in case of Co(II), n=0 in case of Fe(II), n=0 in case of Rh(II), n=0 in case of Ni(II), and n=0 in case of Pd(II).

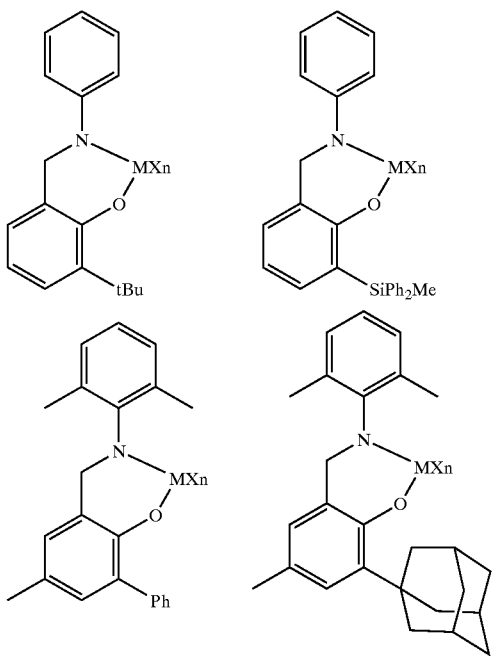

-continued

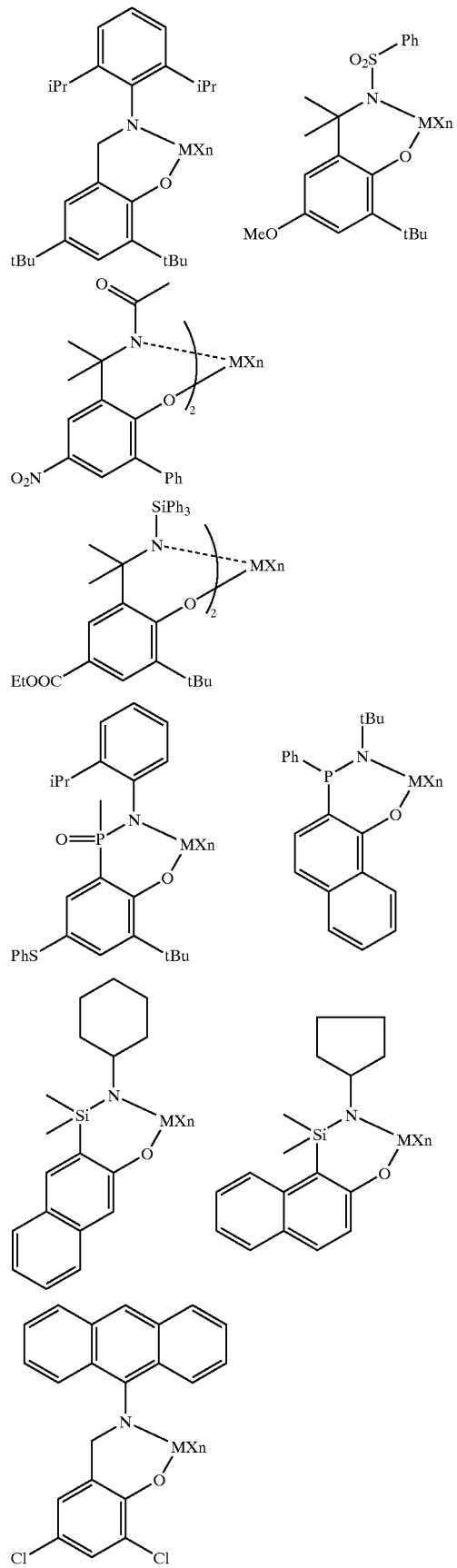

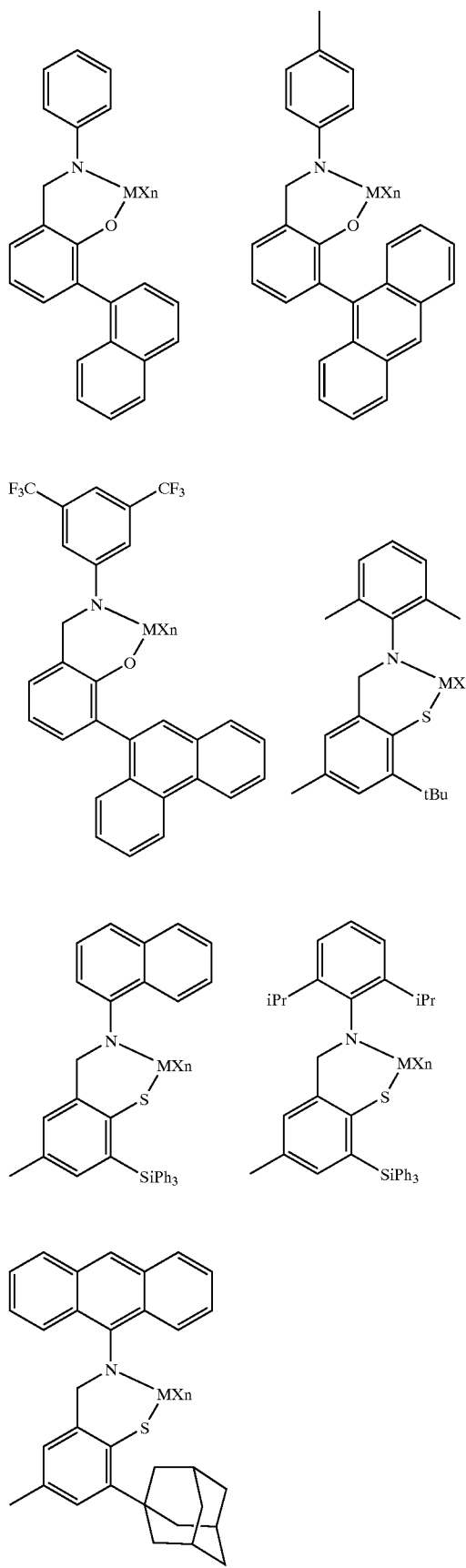
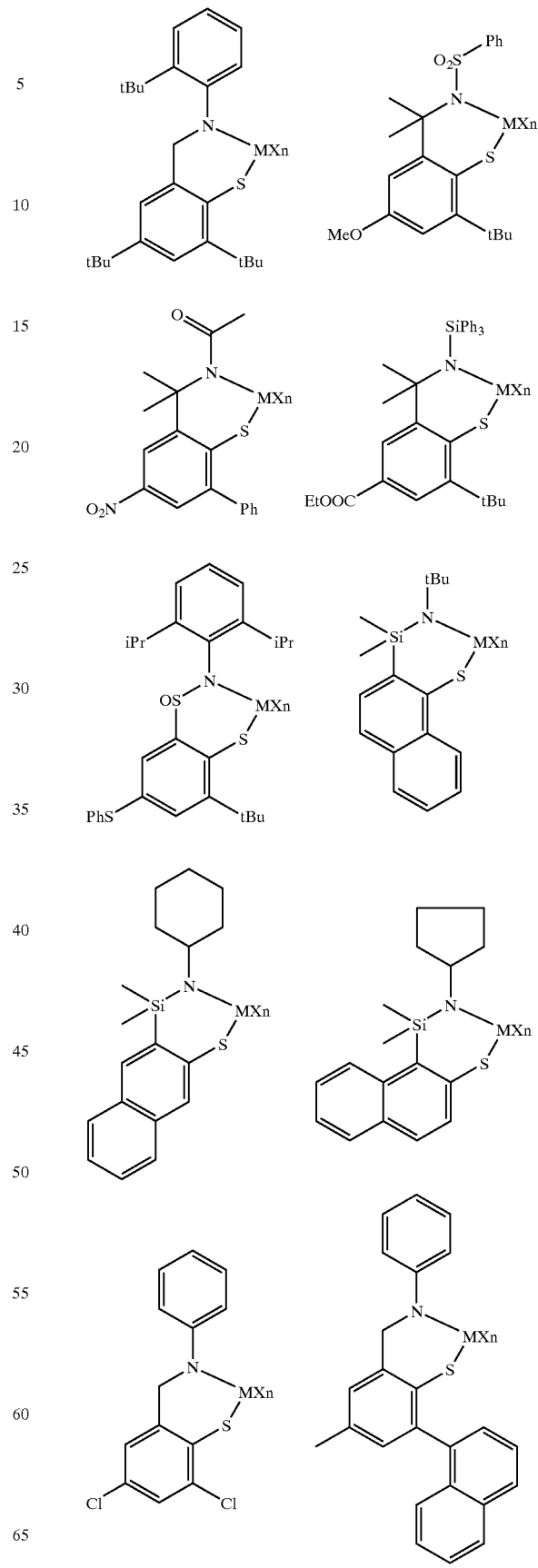

-continued
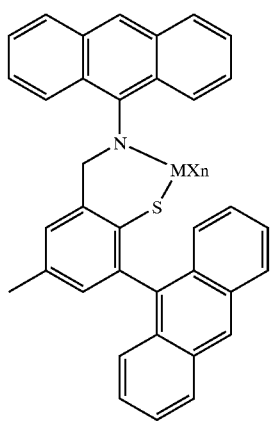
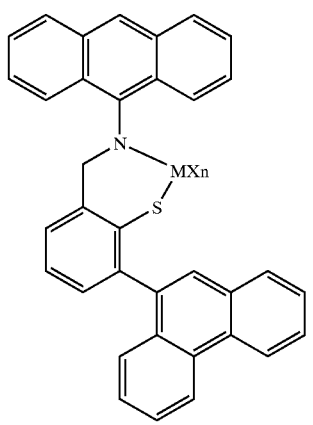
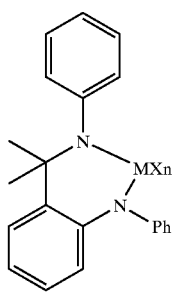
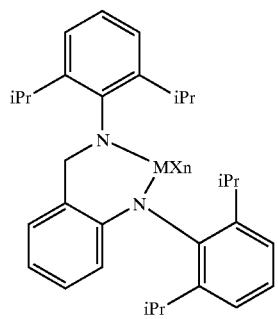
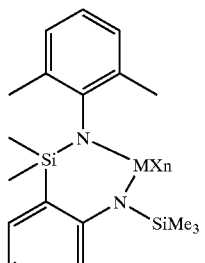
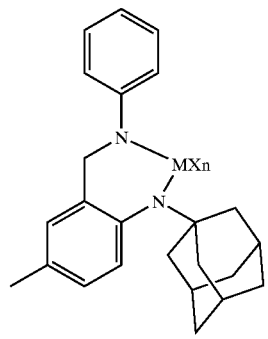
-continued
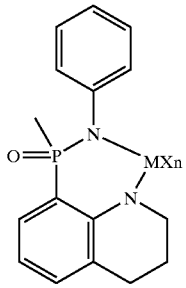
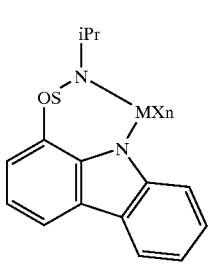
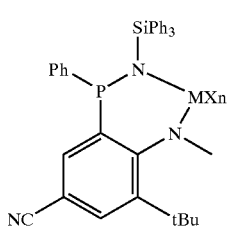
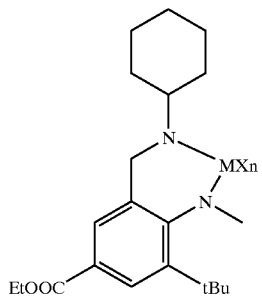
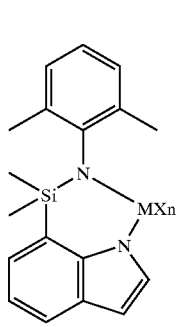
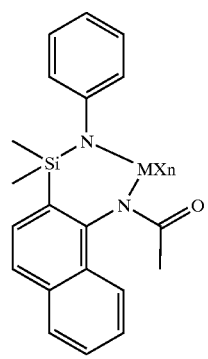
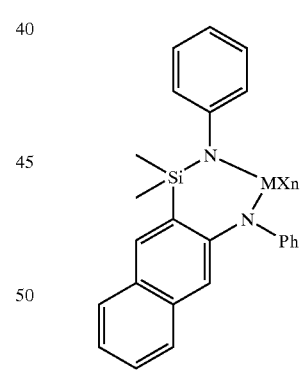
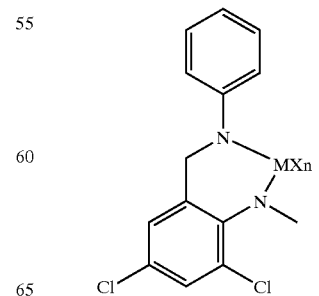
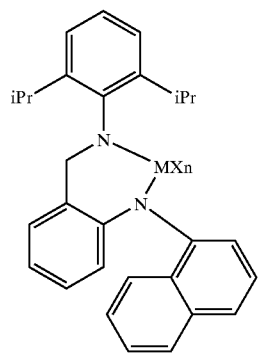

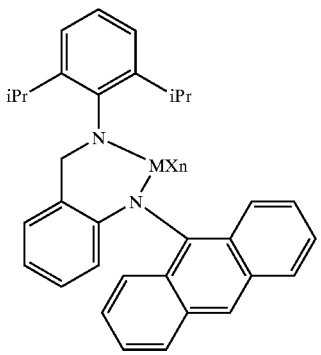

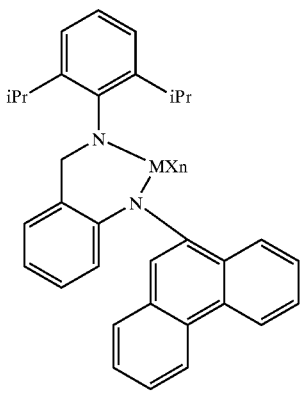

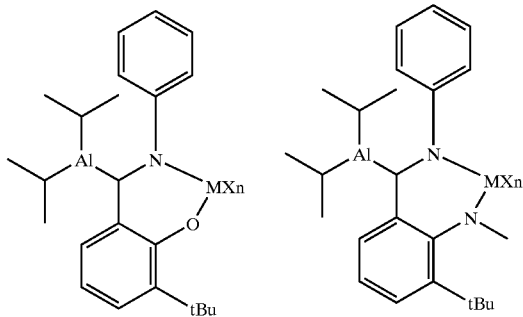

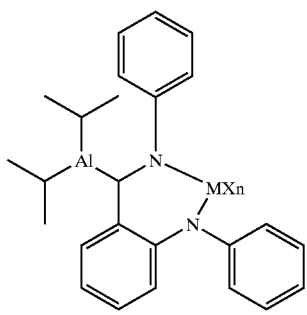

The eighth transition metal compound for use in the invention is a compound represented by the formula (IV):

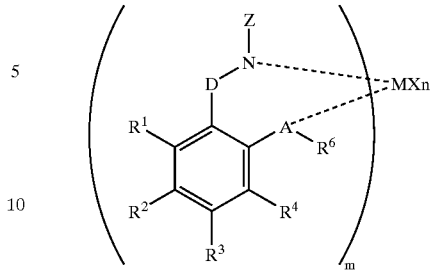

(IV)

wherein the two dotted lines between atoms (A----M and N----M) are used to designate coordinate bonds, but the invention also includes a compound in which one of the bonds is not a coordinate bond.

In the formula (IV), M is a transition metal atom of Group 3 (including lanthanoid) to Group 11 of the periodic table, preferably a metal atom of Group 3 (including lanthanoid) to Group 10, more preferably a metal atom of Group 3 to Group 5 and Group 8 to Group 10, particularly preferably a metal atom of Group 8 to Group 10. Examples of the metal atoms include the same metal atoms as previously described with respect to M in the aforesaid formula (e).

m is an integer of 1 to 6, preferably 1 to 4, more preferably 1 or 2.

A is an oxygen atom, a sulfur atom, a selenium atom or a nitrogen atom having a bonding group —$R^5$.

D is —$C(R^7)(R^8)$—, —$Si(R^9)(R^{10})$—, —$P(O)(R^{11})$—, —$P(R^{12})$—, —SO— or —S—. Of these, —$C(R^7)(R^8)$— and —$Si(R^9)(R^{10})$— are preferable, and —$C(R^7)(R^8)$— is particularly preferable. When D contains a hetero atom, a coordinate bond may be formed between M and D in the formula (IV).

Z is a bonding group of N and represents —$R^{13}$ and —$R^{14}$, =$C(R^{15})R^{16}$ or =$NR^{17}$. Of these, —$R^{13}$ and —$R^{14}$, or =$C(R^{15})R^{16}$ is preferable.

$R^1$ to $R^{17}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them, preferably adjacent groups, may be bonded to each other to form an aliphatic ring, an aromatic ring or a hydrocarbon ring containing a hetero atom such as a nitrogen atom. These rings may further have a substituent. It is preferable that any one of $R^6$, $R^{13}$ and $R^{14}$ is an atom or a group other than a hydrogen atom.

When m is a plural number, one group of $R^1$ to $R^{17}$ contained in one ligand and one group of $R^1$ to $R^{17}$ contained in other ligands may be bonded. When $R^{14}$s, $R^{15}$s, $R^{16}$s, or $R^{17}$s are bonded, the main chain hereof is preferably constituted of 3 or more atoms. $R^1$s, $R^2$s, $R^3$s, $R^4$s, $R^5$s, $R^6$s, $R^7$s, $R^8$s, $R^9$s, $R^{10}$s, $R^{11}$s, $R^{12}$s, $R^{13}$s, $R^{14}$s, $R^{15}$s, $R^{16}$s, or $R^{17}$s may be the same or different, respectively. Examples of the groups indicated by $R^1$ to $R^{17}$ include the same groups as previously exemplified with respect to $R^1$ to $R^{17}$ in the formula (a).

Examples of the groups D include the same groups as previously exemplified with respect to D in the formula (a).

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group. Examples of the groups X include the same groups as previously exemplified with respect to X in the formula (e).

n is a number satisfying a valence of M, specifically an integer of 0 to 5, preferably 1 to 4, more preferably 1 to 3. When n is 2 or greater, plural groups X may be the same or different, and may be bonded to each other to form a ring.

Examples of the transition metal compounds represented by the formula (IV) are given below, but not limited thereto.

In the following examples, M is a transition metal atom of Group 3 to Group 11 of the periodic table, and particular examples of such metals include scandium, yttrium, lanthanoid, titanium, zirconium, hafnium, vanadium, niobium, tantalum, chromium, molybdenum, tungsten, manganese, rhenium, iron, ruthenium, cobalt, rhodium, nickel and palladium. Of these, preferable are scandium, lanthanoid, titanium, zirconium, hafnium, vanadium, niobium, tantalum, iron, ruthenium, cobalt, rhodium, nickel and palladium. More preferable are titanium, zirconium, hafnium, vanadium, niobium, tantalum, iron, ruthenium, cobalt, rhodium, nickel and palladium. Particularly preferable are iron, ruthenium, cobalt, rhodium, nickel and palladium.

X is halogen such as Cl or Br, or an alkyl group such as methyl, but not limited thereto. When plural X are present, they may be the same or different.

n is decided by a valence of the metal M. For example, when a bidentate ligand is coordinated to the metal, there can be mentioned n=2 in case of a divalent metal, n=3 in case of a trivalent metal, n=4 in case of a tetravalent metal, and n=5 in case of a pentavalent metal. More specifically, there can be mentioned n=4 in case of Ti(IV), n=4 in case of Zr(IV), n=4 in case of Hf(IV), n=2 in case of Co(II), n=2 in case of Fe(II), n=2 in case of Rh(II), n=2 in case of Ni(II), and n=2 in case of Pd(II).

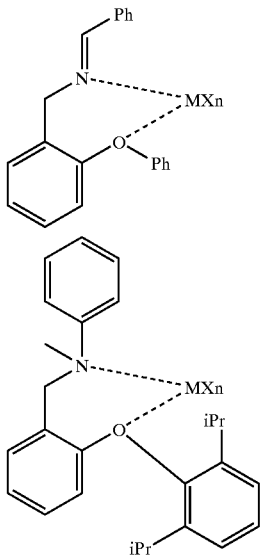

-continued

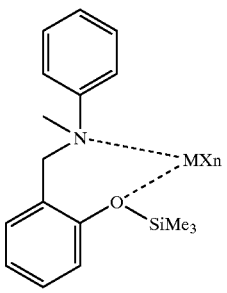

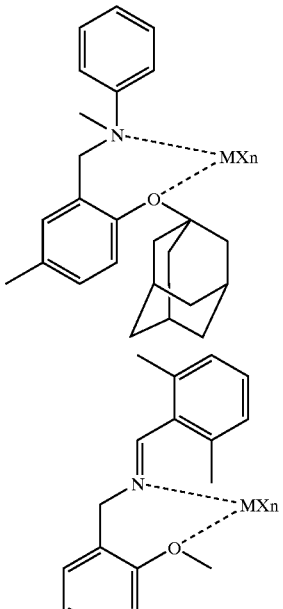

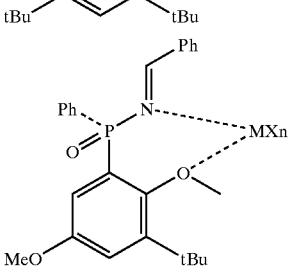

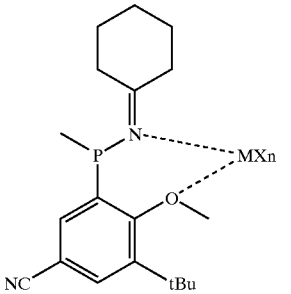

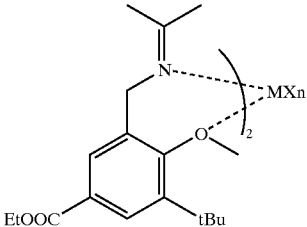

-continued
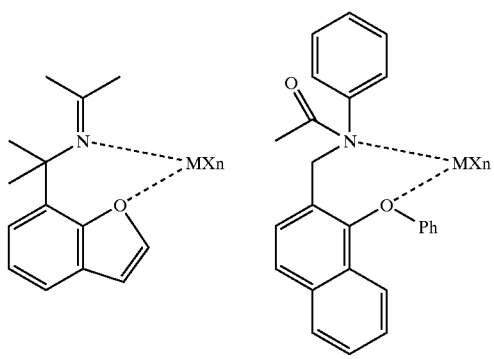
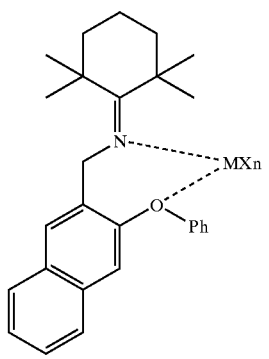
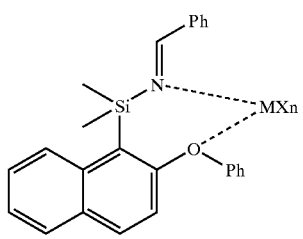
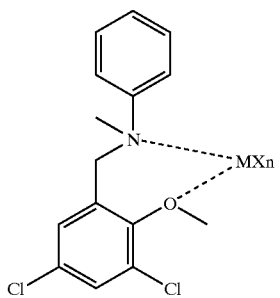
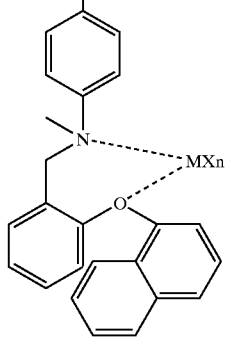
-continued
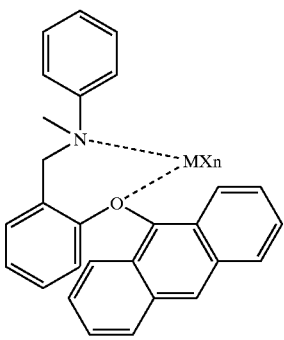
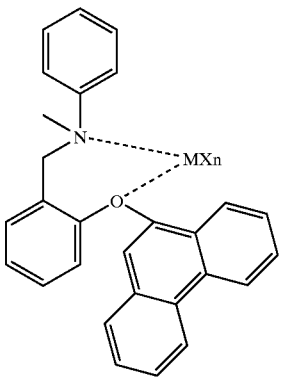
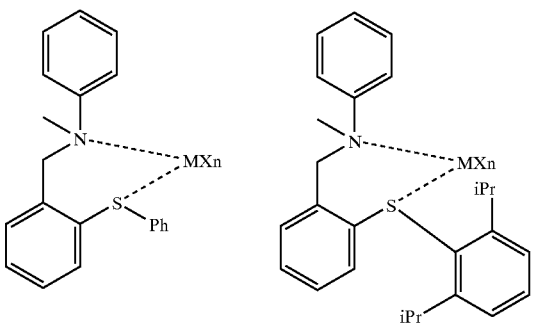
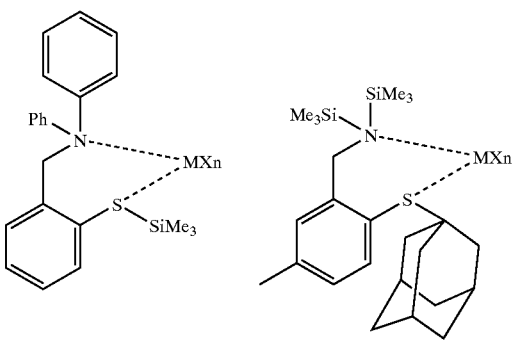
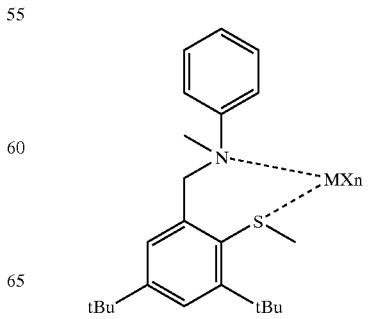

-continued
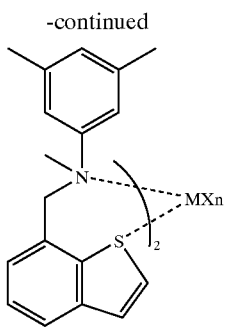
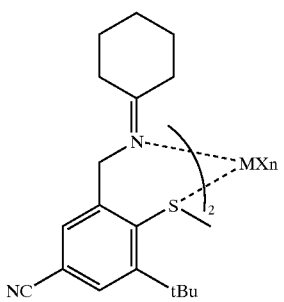
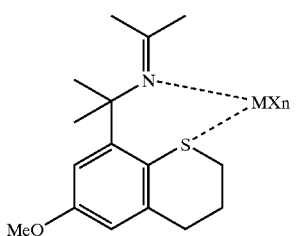
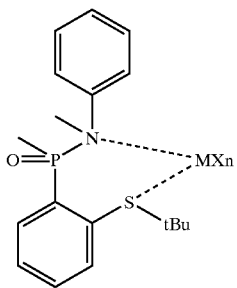
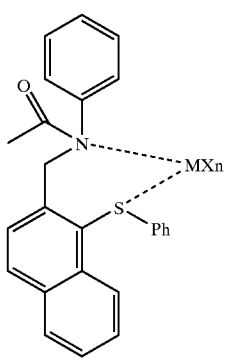
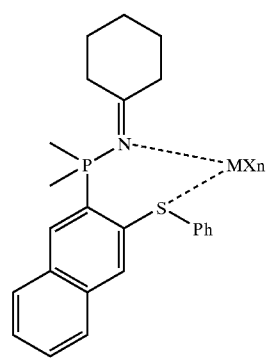
-continued
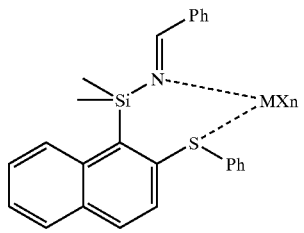
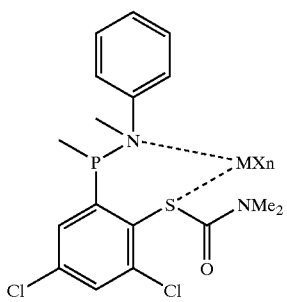
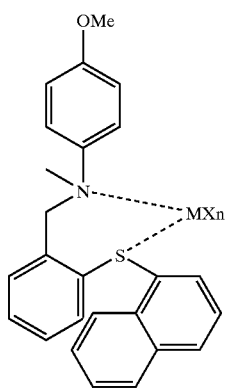
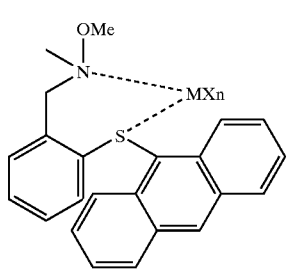
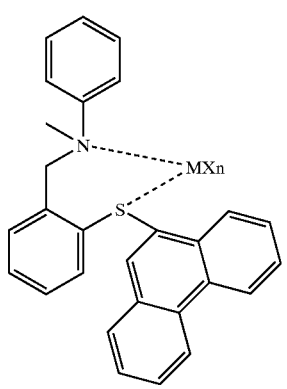

-continued
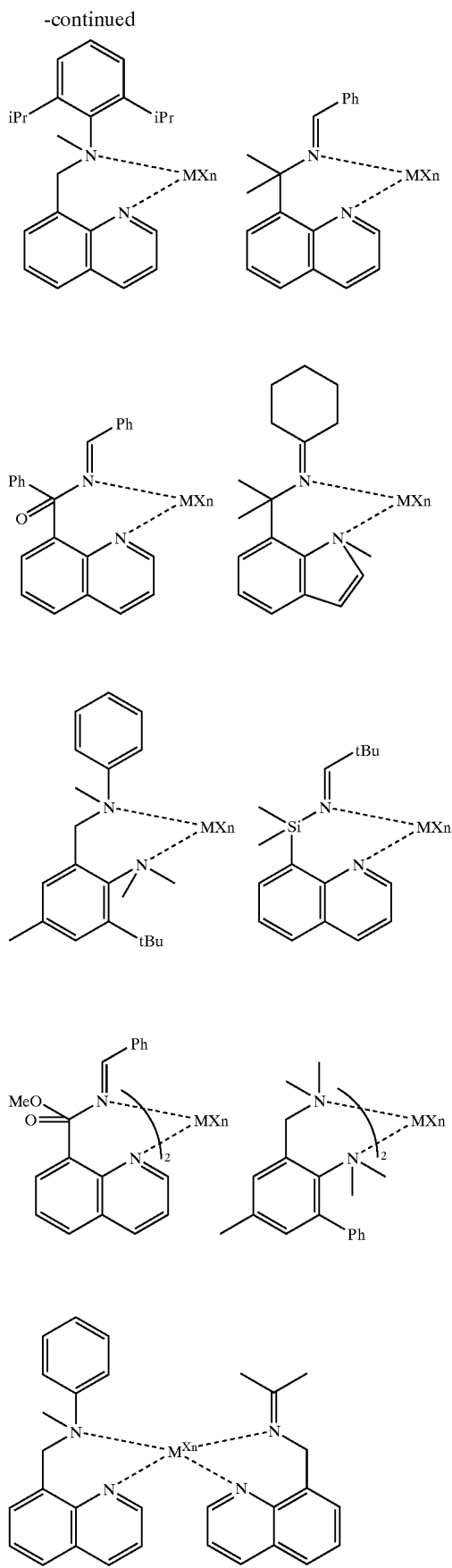
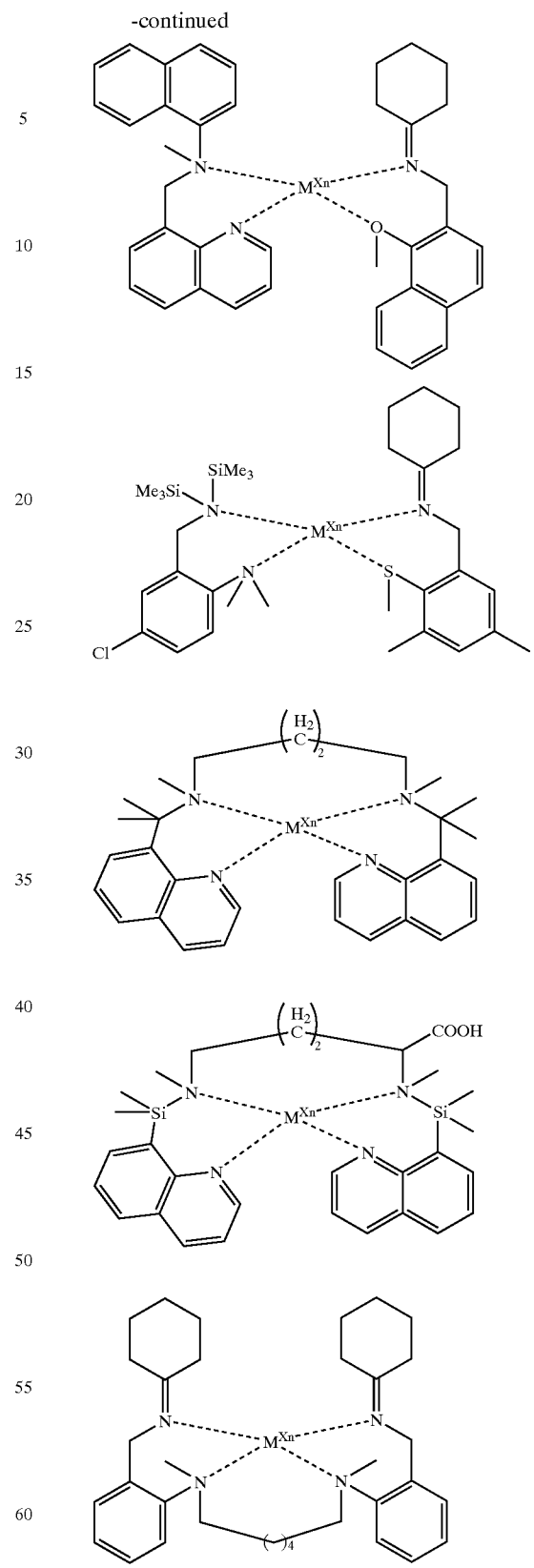
The ninth transition metal compound for use in the invention is a compound represented by the formula (V):

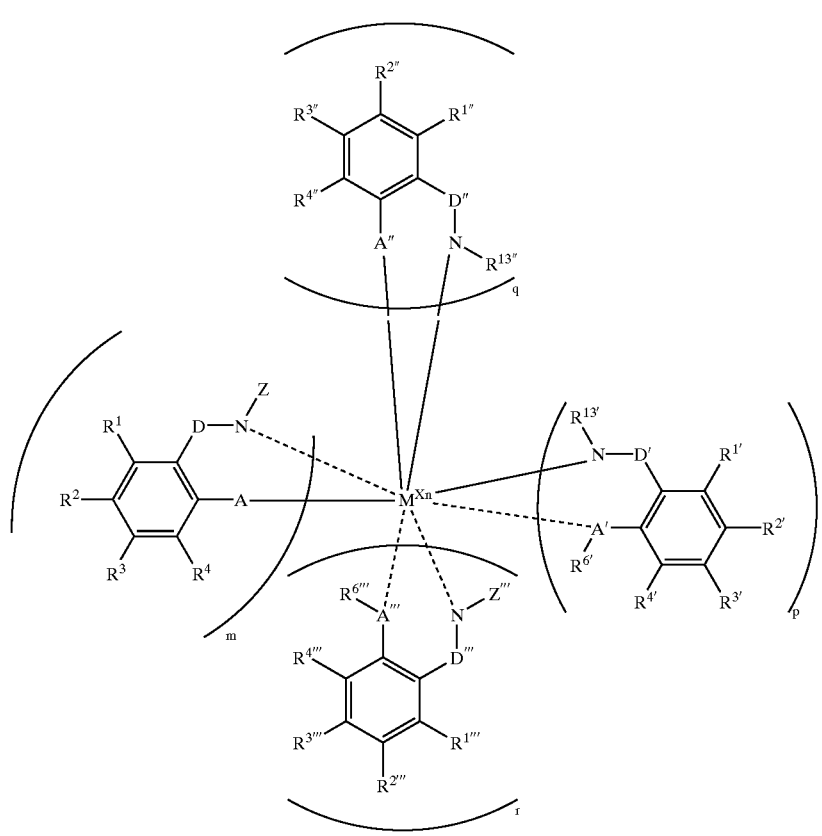

(V)

wherein the dotted lines between atoms are each used to designate a coordinate bond, but the invention also includes a compound in which the bond N---M adjacent to A-M and the bond A'---M are not coordinate bond, and a compound in which either the bond A'''---M or the bond N---M adjacent thereto is not a coordinate bond.

In the formula (V), M is a transition metal atom of Group 3 (including lanthanoid) to Group 11 of the periodic table, preferably a metal atom of Group 3 (including lanthanoid) to Group 10, more preferably a metal atom of Group 3 to Group 5 and Group 8 to Group 10. Examples of the metal atoms include the same metal atoms as previously described with respect to M in the aforesaid formula (e).

m is an integer of 0 to 6, p is an integer of 0 to 6, q is an integer of 0 to 3, r is an integer of 0 to 6, three or more of them are not 0 at the same time, and they are numbers satisfying the conditions of m+p+q+r≦6 and m+p+2q≦6.

A, A', A" and A''' may be the same or different and are each an oxygen atom, a sulfur atom, a selenium atom or a nitrogen atom having a bonding group —$R^5$ (or —$R^{5'}$, —$R^{5''}$ and —$R^{5'''}$ correspondingly to A', A" and A''', respectively, and the same shall apply hereinafter).

D, D', D" and D''' may be the same or different and are each —C($R^7$)($R^8$)—, —Si($R^9$)($R^{10}$)—, —P(O)($R^{11}$)—, —P($R^{12}$)— —SO— or —S—. Of these, —C($R^7$)($R^8$)— and —Si($R^9$)($R^{10}$)— are preferable, and —C($R^7$)($R^8$)— is particularly preferable. When D and D''' contain a hetero atom, a coordinate bond may be formed between M and D and between M and D''' in the formula (V).

Z and Z''' may be the same or different and are each a bonding group of N, and represent —$R^{13}$ and —$R^{14}$, =C($R^{15}$)$R^{16}$ or =N$R^{17}$.

$R^1$ to $R^{17}$, $R^{1'}$ to $R^{13'}$, $R^{1''}$ to $R^{13''}$, or $R^{1'''}$ to $R^{17'''}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them, preferably adjacent groups, may be bonded to each other to form an aliphatic ring, an aromatic ring or a hydrocarbon ring containing a hetero atom such as a nitrogen atom. These rings may further have a substituent. It is preferable that either $R^{13}$ or $R^{14}$, $R^{6'}$, and any one of $R^{6''}$, $R^{13'''}$ and $R^{14'''}$ are each an atom or a group other than a hydrogen atom.

In case of m+p+q+r≧2, one group of $R^1$ to $R^{17}$, $R^{1'}$ to $R^{13'}$, $R^{1''}$ to $R^{13''}$, or $R^{1'''}$ to $R^{17'''}$ contained in one ligand and one group of $R^1$ to $R^{17}$, $R^{1'}$ to $R^{13'}$, $R^{1''}$ to $R^{13''}$, or $R^{1'''}$ to $R^{17'''}$ contained in other ligands may be bonded. When $R^{13}$s and $R^{13'''}$s, $R^{14}$s and $R^{14'''}$s, $R^{15}$s and $R^{15'''}$s, $R^{16}$s and $R^{16'''}$s, or $R^{17}$s and $R^{17'''}$s are bonded, the main chain of the bond is preferably constituted of 3 or more atoms. Further, $R^1$, $R^{1'}$, $R^{1''}$ and $R^{1'''}$, $R^2$, $R^{2'}$, $R^{2''}$ and $R^{2'''}$, $R^3$, $R^{3'}$, $R^{3''}$ and $R^{3'''}$, $R^4$, $R^{4'}$, $R^{4''}$ and $R^{4'''}$, $R^5$, $R^{5'}$, $R^{5''}$ and $R^{5'''}$, $R^6$, $R^{6'}$, $R^{6''}$ and $R^{6'''}$, $R^7$, $R^{7'}$, $R^{7''}$ and $R^{7'''}$, $R^8$, $R^{8'}$, $R^{8''}$ and $R^{8'''}$, $R^9$, $R^{9'}$, $R^{9''}$ and $R^{9'''}$, $R^{10}$, $R^{10'}$, $R^{10''}$ and $R^{10'''}$, $R^{11}$, $R^{11'}$, $R^{11''}$ and $R^{11'''}$, $R^{12}$, $R^{12'}$, $R^{12''}$ and $R^{12'''}$, $R^{13}$, $R^{13'}$, $R^{13''}$ and $R^{13'''}$, $R^{14}$ and $R^{14'''}$, $R^{15}$ and $R^{15'''}$, $R^{16}$ and $R^{16'''}$, or $R^{17}$ and $R^{17'''}$ may be the same or different, respectively. Examples of the groups indicated by $R^1$ to $R^{17}$, $R^{1'}$ to $R^{13'}$, $R^{1''}$ to $R^{13''}$, and $R^{1'''}$ to $R^{17'''}$ include the same groups as previously exemplified with respect to $R^1$ to $R^{17}$ in the formula (a).

Examples of the groups D, D', D" and D''' include the same groups as previously exemplified with respect to D in the formula (a).

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group. Examples of the groups X include the same groups as previously exemplified with respect to X in the formula (e).

n is a number satisfying a valence of M, specifically an integer of 0 to 5, preferably 1 to 4, more preferably 1 to 3. When n is 2 or greater, plural groups X may be the same or different, and may be bonded to each other to form a ring.

Examples of the transition metal compounds represented by the formula (V) are given below, but not limited thereto.

In the following examples, M is a transition metal atom of Group 3 to Group 11 of the periodic table, and particular examples of such metals include scandium, yttrium, lanthanoid, titanium, zirconium, hafnium, vanadium, niobium, tantalum, chromium, molybdenum, tungsten, manganese, rhenium, iron, ruthenium, cobalt, rhodium, nickel and palladium. Of these, preferable are scandium, lanthanoid, titanium, zirconium, hafnium, vanadium, niobium, tantalum, iron, ruthenium, cobalt, rhodium, nickel and palladium.

X is halogen such as Cl or Br, or an alkyl group such as methyl, but not limited thereto. When plural X are present, they may be the same or different.

n is decided by a valence of the metal M.

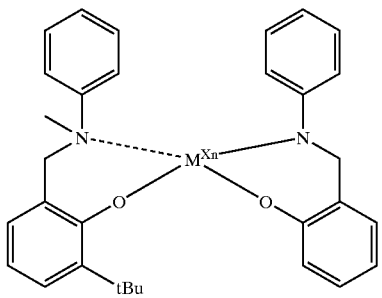

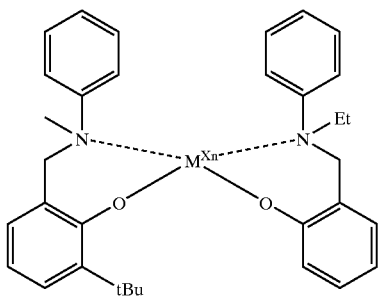

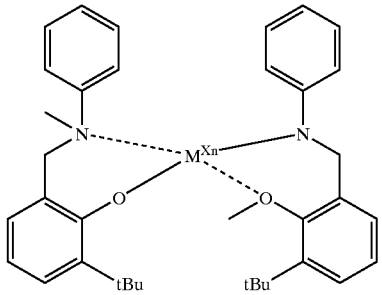

Further specific examples of the transition metal compounds represented by the formulas (I) to (V) are given below, but not limited thereto.

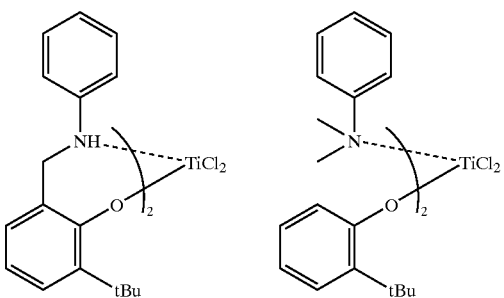

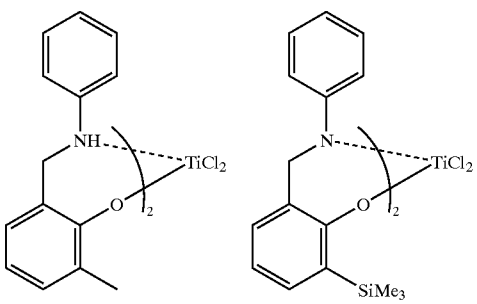

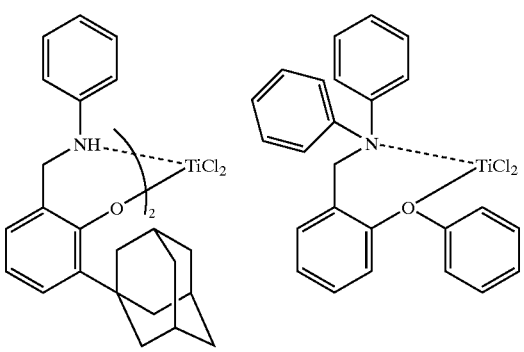

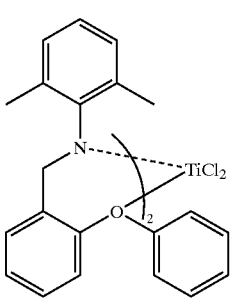

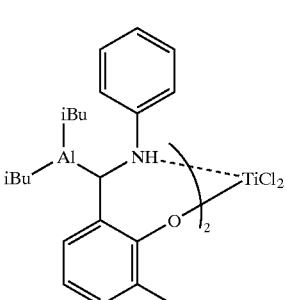

-continued
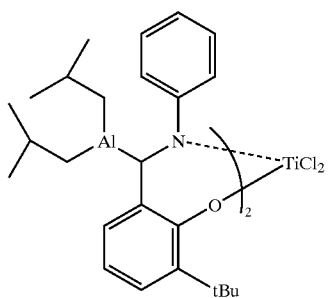
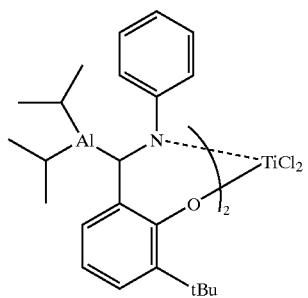
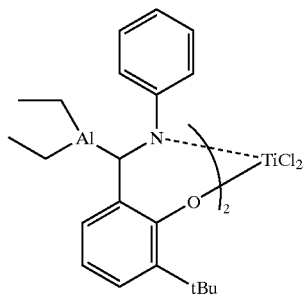
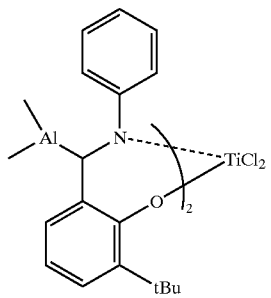
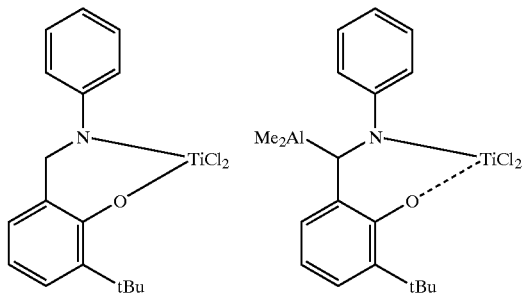
-continued
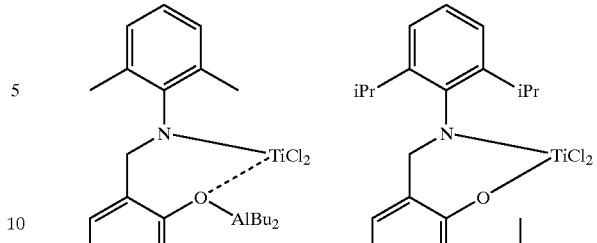
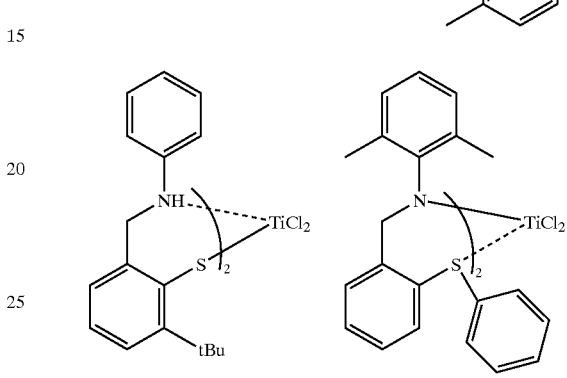
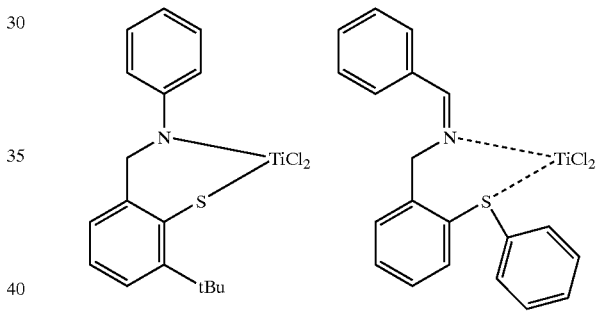
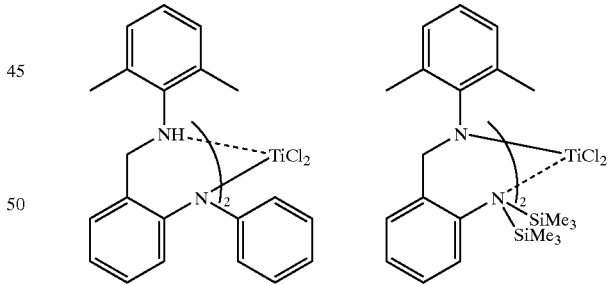
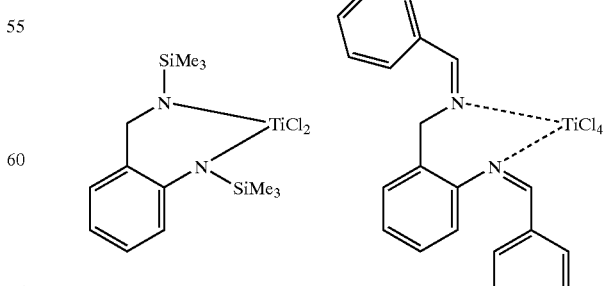

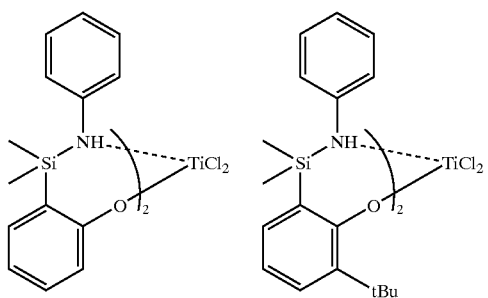
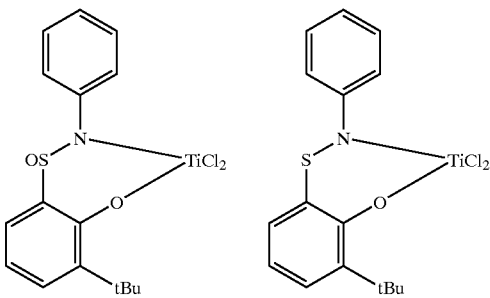
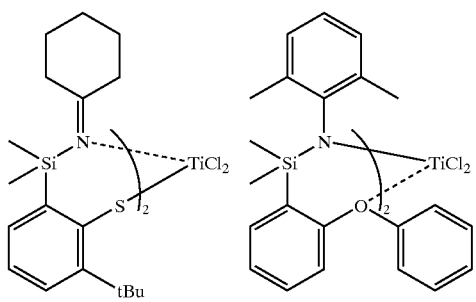
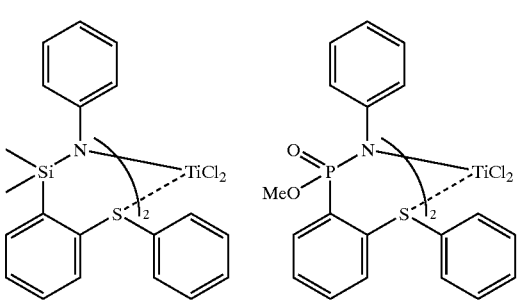
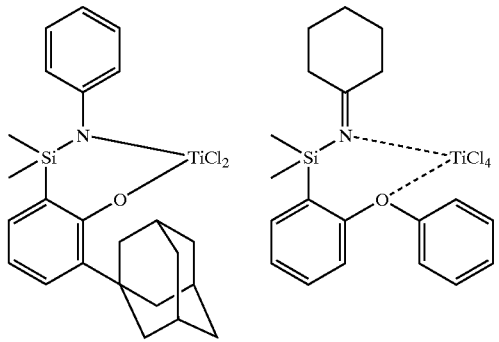
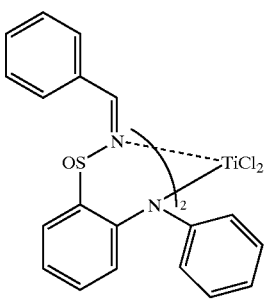
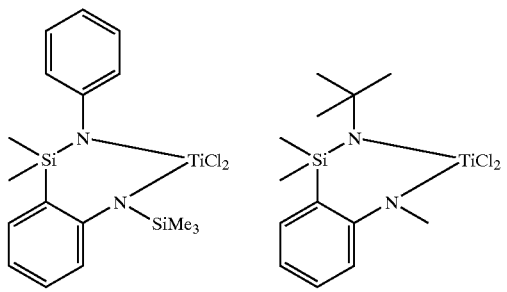
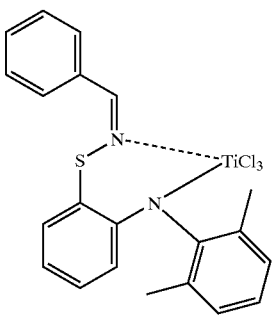
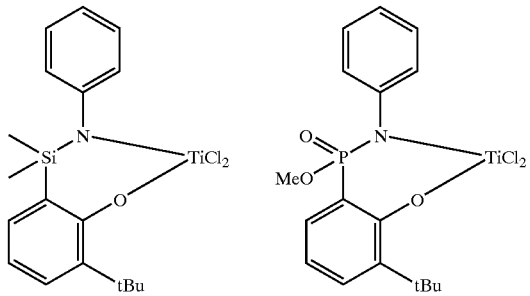
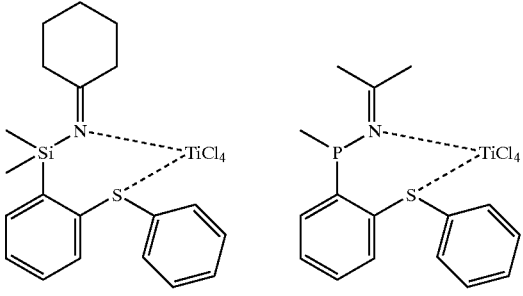

-continued

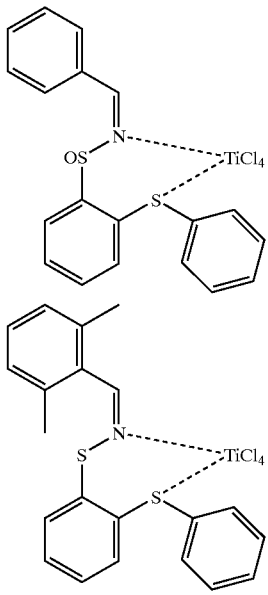

The transition metal compounds (A) mentioned above are used singly or in combination of two or more kinds.

The above exemplified compounds wherein the Ti is replaced with Zr or Hf can also be used in the invention.

In the olefin polymerization catalysts of the invention, other transition metal compounds, for example, known transition metal compounds comprising a ligand which contains a hetero atom such as nitrogen, oxygen, sulfur, boron or phosphorus can be used in combination with the transition metal compound (A). Other transition metal compounds employable in combination with the transition metal compound (A) are described below.

Other Transition Metal Compounds

Some examples of other transition metal compounds employable in combination with the transition metal compound (A) are given below, but not limited thereto.

(a-1) Transition metal imide compound represented by the following formula:

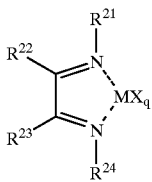

In the above formula, M is a transition metal atom of Group 8 to Group 10 of the periodic table, preferably nickel, palladium or platinum.

$R^{21}$ to $R^{24}$ may be the same or different and are each a hydrocarbon group of 1 to 50 carbon atoms, a halogenated hydrocarbon group of 1 to 50 carbon atoms, a hydrocarbon-substituted silyl group, or a hydrocarbon group substituted with a substituent containing at least one element selected from nitrogen, oxygen, phosphorus, sulfur and silicon.

Two or more groups of $R^{21}$ to $R^{24}$, preferably adjacent groups, may be boned to each other to form a ring.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. q is an integer of 0 to 4. When q is 2 or greater, plural groups X may be the same or different.

(a-2) Transition metal amide compound represented by the following formula:

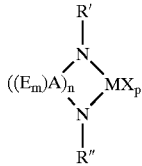

In the above formula, M is a transition metal atom of Group 3 to Group 6 of the periodic table, preferably titanium, zirconium or hafnium.

R' and R" may be the same or different and are each a hydrogen atom, a hydrocarbon group of 1 to 50 carbon atoms, a halogenated hydrocarbon group of 1 to 50 carbon atoms, a hydrocarbon-substituted silyl group, or a substituent having at least one element selected from nitrogen, oxygen, phosphorus, sulfur and silicon.

A is an atom of Group 13 to Group 16 of the periodic table, specifically boron, carbon, nitrogen, oxygen, silicon, phosphorus, sulfur, germanium, selenium, tin or the like, preferably carbon or silicon.

m is an integer of 0 to 2, and n is an integer of 1 to 5. When n is 2 or greater, plural A may be the same or different.

E is a substituent having at least one element selected from carbon, hydrogen, oxygen, halogen, nitrogen, sulfur, phosphorus, boron and silicon. When m is 2, two of E may be the same or different, or may be bonded to each other to form a ring.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. p is an integer of 0 to 4. When p is 2 or greater, plural groups X may be the same or different. X is preferably a halogen atom, a hydrocarbon grope of 1 to 20 carbon atoms or a sulfonato group.

(a-3) Transition metal diphenoxy compound represented by the following formula:

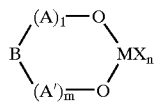

In the above formula, M is a transition metal atom of Group 3 to Group 11 of the periodic table; 1 and m are each an integer of 0 or 1; and A and A' are each a hydrocarbon group of 1 to 50 carbon atoms, a halogenated hydrocarbon group of 1 to 50 carbon atoms, or a hydrocarbon group or a halogenated hydrocarbon group of 1 to 50 carbon atoms which has a substituent containing oxygen, sulfur or silicon, and A and A' may be the same or different.

B is a hydrocarbon group of 1 to 50 carbon atoms, a halogenated hydrocarbon group of 1 to 50 carbon atoms, a group represented by $R^1R^2Z$ ($R^1$ and $R^2$ are each a hydrocarbon group of 1 to 20 carbon atoms or a hydrocarbon group of 1 to 20 carbon atoms containing at least one hetero atom, and Z is carbon, nitrogen, sulfur, phosphorus or silicon), oxygen or sulfur.

n is a number satisfying a valence of M.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When n is 2 or greater, plural groups X may be the same or different or may be bonded to each other to form a ring.

(a-4) Transition metal compound represented by the following formula and comprising a ligand having cyclopentadienyl skeleton containing at least one hetero atom:

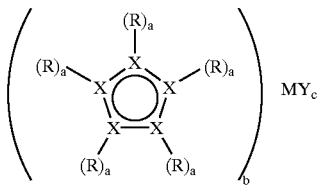

In the above formula, M is a transition metal atom of Group 3 to Group 11 of the periodic table.

Each X is an atom of Group 13, Group 14 or Group 15 of the periodic table, and at least one X is an element other than carbon.

Each R may be the same or different and is a hydrogen atom, a halogen atom, a hydrocarbon group, a halogenated hydrocarbon group, a hydrocarbon-substituted silyl group, or a hydrocarbon group substituted with a substituent containing at least one element selected from nitrogen, oxygen, phosphorus, sulfur and silicon. Two or more of R may be bonded to each other to form a ring.

Each a is 0 or 1, and b is an integer of 1 to 4. When b is 2 or greater, the groups [((R)a)$_5$-X$_5$] may be the same or different, and Rs may be bridged to each other.

c is a number satisfying a valence of M.

Y is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When c is 2 or greater, plural groups Y may be the same or different, and may be bonded to each other to form a ring.

(a-5) Transition metal compound represented by the formula PB(Pz)$_3$MXn.

In the above formula, M is a transition metal atom of Group 3 to Group 11 of the periodic table; R is a hydrogen atom, a hydrocarbon group of 1 to 20 carbon atoms or a halogenated hydrocarbon group of 1 to 20 carbon atoms; and Pz is a pyrazolyl group or a substituted pyrazolyl group.

n is a number satisfying a valence of M.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When n is 2 or greater, plural groups indicated by X may be the same or different or may be bonded to each other to form a ring.

(a-6) Transition metal compound represented by the following formula:

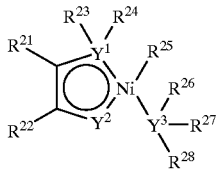

In the above formula, Y$^1$ and Y$^3$ may be the same or different and are each an element of Group 15 of the periodic table, and Y$^2$ is an element of Group 16 of the periodic table.

$R^{21}$ to $R^{28}$ may be the same or different and are each a hydrogen atom, a halogen atom, a hydrocarbon group of 1 to 20 carbon atoms, a halogenated hydrocarbon group of 1 to 20 carbon atoms, an oxygen-containing group, a sulfur-containing group or a silicon-containing group, and two or more of them may be bonded to each other to form a ring.

(a-7) Compound comprising a compound represented by the following formula and a transition metal atom of Group VIII:

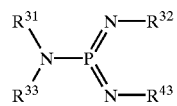

In the above formula, $R^{31}$ to $R^{34}$ may be the same or different and are each a hydrogen atom, a halogen atom, a hydrocarbon group of 1 to 20 carbon atoms or a halogenated hydrocarbon group of 1 to 20 carbon atoms, and two or more of them may be bonded to each other to form a ring.

(a-8) Transition metal compound represented by the following formula:

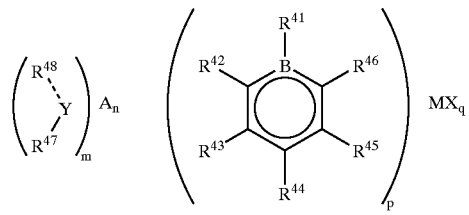

In the above formula, M is a transition metal atom of Group 3 to Group 11 of the periodic table.

m is an integer of 0 to 3, n is an integer of 0 or 1, p is an integer of 1 to 3, and q is a number satisfying a valence of M.

$R^{41}$ to $R^{48}$ may be the same or different and are each a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group, and two or more of them may be bonded to each other to form a ring.

X is a hydrogen atom, a halogen atom, a hydrocarbon group of 1 to 20 carbon atoms, a halogenated hydrocarbon group of 1 to 20 carbon atoms, an oxygen-containing group, a sulfur-containing group, a silicon-containing group or a nitrogen-containing group. When q is 2 or greater, plural groups X may be the same or different or may be bonded to each other to form a ring.

Y is a group to bridge a boratabenzene ring and is carbon, silicon or germanium.

A is an element of Group 14, Group 15 or Group 16 of the periodic table.

(a-9) Transition metal compound other than the aforesaid compound (a-4) and containing a ligand having cyclopentadienyl skeleton.

(a-10) Compound containing magnesium, titanium and halogen as essential ingredients.

Next, each compound as the component (B), which may optionally be employed in the invention, is described.

(B-1) Organometallic Compound

Examples of the organometallic compounds (B-1) optionally employed in the invention include organometallic compounds containing metals of Group 1, Group 2, Group 12 and Group 13 of the periodic table, such as those described below.

(B-1a) Organoaluminum compound represented by the following formula:

$$R^a{}_m Al(OR^b)_n H_p X_q$$

wherein $R^a$ and $A^b$ may be the same or different and are each a hydrocarbon group of 1 to 15 carbon atoms, preferably 1 to 4 carbon atoms; X is a halogen atom; and m, n, p and q are numbers satisfying the conditions of $0<m \leq 3$, $0 \leq n<3$, $0 \leq p<3$, $0 \leq q<3$ and $m+n+p+q=3$.

(B-1b) Alkyl complex compound comprising a metal of Group 1 and aluminum and represented by the following formula:

$$M^2 AlR^a{}_4$$

wherein $M^2$ is Li, Na or K; and $R^a$ is a hydrocarbon group of 1 to 15 carbon atoms, preferably 1 to 4 carbon atoms.

(B-1c) Dialkyl compound of a metal of Group 2 or Group 12 and represented by the following formula:

$$R^a R^b M^3$$

wherein $R^a$ and $A^b$ may be the same or different and are each a hydrocarbon group of 1 to 15 carbon atoms, preferably 1 to 4 carbon atoms; and $M^3$ is Mg, Zn or Cd.

Examples of the organoaluminum compounds (B-1a) include:

an organoaluminum compound represented by the following formula:

$$R^a{}_m Al(OR^b)_{3-m}$$

wherein $R^a$ and $R^b$ may be the same or different and are each a hydrocarbon group of 1 to 15 carbon atoms, preferably 1 to 4 carbon atoms; and m is preferably a number satisfying the condition of $1.5 \leq m \leq 3$;

an organoaluminum compound represented by the following formula:

$$R^a{}_m AlX_{3-m}$$

wherein $R^a$ is a hydrocarbon group of 1 to 15 carbon atoms, preferably 1 to 4 carbon atoms; X is a halogen atom; and m is preferably a number satisfying the condition of $0<m<3$;

an organoaluminum compound represented by the following formula:

$$R^a{}_m AlH_{3-m}$$

wherein $R^a$ is a hydrocarbon group of 1 to 15 carbon atoms, preferably 1 to 4 carbon atoms; and m is preferably a number satisfying the condition of $2 \leq m<3$; and an organoaluminum compound represented by the following formula:

$$R^a{}_m Al(OR^b)_n X_q$$

wherein $R^a$ and $A^b$ may be the same or different and are each a hydrocarbon group of 1 to 15 carbon atoms, preferably 1 to 4 carbon atoms; X is a halogen atom; and m, n and q are numbers satisfying the conditions of $0<m \leq 3$, $0 \leq n<3$, $0 \leq q<3$ and $m+n+q=3$.

Particular examples of the organoaluminum compounds (B-1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methypentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diethylaluminum hydride and diisobutylaluminum hydride;

trialkenylaluminums, e.g., those represented by the formula $(i\text{-}C_4H_9)_x Al_y (C_5H_{10})_z$ (wherein x, y and z are each a positive number, and $z \geq 2x$), such as isoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition, e.g., those represented by $R^a{}_{2.5} Al(OR^b)_{0.5}$;

dialkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylalumium(2,6-di-t-butyl-4-methylphenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, such as ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Also employable are compounds analogous to the organoaluminum compound (B-1a). For example, there can be mentioned organoaluminum compounds wherein two or more aluminum compounds are combined through a nitrogen atom, such as $(C_2H_5)_2 AlN(C_2H_5)Al(C_2H_5)_2$.

Examples of the organoaluminum compounds (B-1b) include $LiAl(C_2H_5)_4$ and $LiAl(C_7H_{15})_4$.

Other compounds also employable as the organometallic compounds (B-1) include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium.

Compounds capable of producing the above-mentioned organoaluminum compounds in the polymerization system, e.g., a combination of halogenated aluminum and alkyllithium and a combination of halogenated aluminum and alkylmagnesium, are also employable.

Of the organometallic compounds (B-1) mentioned above, the organoaluminum compounds are preferable.

The organometallic compounds (B-1) may be used singly or in combination of two or more kinds.

(B-2) Organoaluminum Oxy-compound

The organoaluminum oxy-compound (B-2) optionally used in the invention may be conventional aluminoxane and also a benzene-insoluble organoaluminum oxy-compound as exemplified in Japanese Patent Laid-Open Publication No. 78687/1990.

The conventional aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent for aluminoxane.

Examples of the organoaluminum compounds used for preparing the aluminoxane include the same organoaluminum compounds as previously described for the organoaluminum compound (B-1a).

Of these, preferable are trialkylaluminums and tricycloalkylaluminums. Particularly preferable is trimethylaluminum.

The organoaluminum compounds may be used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halides of these aromatic, aliphatic and alicyclic hydrocarbons, particularly chlorides and bromides thereof. Also employable are ethers such as ethyl ether and tetrahydrofuran. Of the solvents, particularly preferable are aromatic hydrocarbons and aliphatic hydrocarbons.

The benzene-insoluble organoaluminum oxy-compound for use in the invention is preferably an organoaluminum oxy-compound containing an Al component which is soluble in benzene at 60° C. in an amount of usually not more than 10%, preferably not more than 5%, particularly preferably not more than 2%, in terms of Al atom. That is, the benzene-insoluble organoaluminum oxy-compound is preferably insoluble or sparingly soluble in benzene.

The organoaluminum oxy-compound employable in the invention is, for example, an organoaluminum oxy-compound containing boron and represented by the following formula (i):

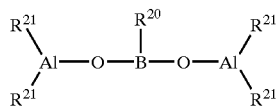

(i)

wherein $R^{20}$ is a hydrocarbon group of 1 to 10 carbon atoms; and each $R^{21}$ may be the same or different and is a hydrogen atom, a halogen atom or a hydrocarbon group of 1 to 10 carbon atoms.

The organoaluminum compound containing boron and represented by the formula (i) can be prepared by reacting an alkylboronic acid represented by the formula (ii):

$$R^{20}—B—(OH)_2 \qquad (ii)$$

wherein $R^{20}$ is the same group as described above, with an organoaluminum compound at a temperature of −80° C. to room temperature for 1 minute to 24 hours in an inert solvent under an inert gas atmosphere.

Examples of the alkylboronic acids represented by the formula (ii) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid and 3,5-bis(trifluoromethyl)phenylboronic acid. Of these, preferable are methylboronic acid, n-butylboronic acid, isobutylboronic acid, 3,5-difluorophenylboronic acid and pentafluorophenylboronic acid.

These alkylboronic acids may be used singly or in combination of two or more kinds.

Examples of the organoaluminum compounds to be reacted with the alkylboronic acid include the same organoaluminum compounds as previously described for the organoaluminum compound (B-1a).

Of these, preferable are trialkylaluminums and tricycloalkylaluminums. Particularly preferable are trimethylaluminum, triethylaluminum and triisobutylaluminum. These organoaluminum compounds may be used singly or in combination of two or more kinds.

The organoaluminum oxy-compounds (B-2) mentioned above may be used singly or in combination of two or more kinds.

(B-3) Compound which Reacts with the Transition Metal Compound (A) to Form Ion Pair The compound (B-3) which reacts with a transition metal compound (A) to form an ion pair (referred to as "ionizing ionic compound" hereinafter), that may optionally be used in the invention, is a compound which reacts with the aforesaid transition metal compound (A) to form an ion pair. That is, any compound which forms an ion pair by the contact with the transition metal compound (A) is included in the compound (B-3).

Examples of such compounds includes Lewis acids, ionic compounds, borane compounds and carborane compounds described, for example, in Japanese Patent Laid-Open Publications No. 501950/1989, No. 502036/1989, No. 179005/1991, No. 179006/1991, No. 207703/1991 and No. 207704/1991, and U.S. Pat. No. 5,321,106. Heteropoly compounds and isopoly compounds may also be employed.

The Lewis acids are, for example, compounds represented by $BR_3$ (R is fluorine or a phenyl group which may have a substituent such as fluorine, methyl or trifluoromethyl). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compounds are, for example, compounds represented by the following formula (VI):

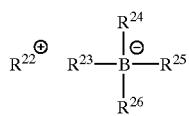

(VI)

In the above formula, $R^{22}$ is $H^+$, carbonium cation, oxonium cation, ammonium cation, phosphonium cation, cycloheptyltrienyl cation, ferrocenium cation having a transition metal, or the like.

$R^{23}$ to $R^{26}$ may be the same or different and are each an organic group, preferably an aryl group or a substituted aryl group.

Examples of the carbonium cations include tri-substituted carbonium cations, such as triphenylcarbonium cation, tri(methylphenyl)carbonium cation and tri(dimethylphenyl)carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri(dimethylphenyl)phosphonium cation.

$R^{22}$ is preferably carbonium cation or ammonium cation, particularly preferably triphenylcarbonium cation, N,N-dimethylanilinium cation or N,N-diethylanilinium cation.

Also employable as the ionic compounds are a trialkyl-substituted ammonium salt, a N,N-dialkylanilinium salt, a dialkylammonium salt and a triarylphosphonium salt.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)anmoniumtetra(p-trifluoromethylphenyl)boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra (phenyl) boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compounds are triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex and a boron compound represented by the formula (VII):

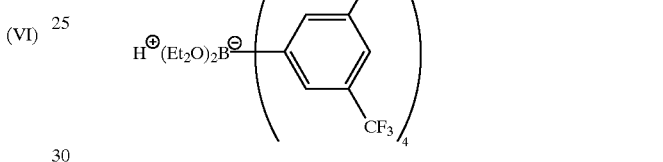

(VII)

wherein Et is an ethyl group, or the formula (VIII):

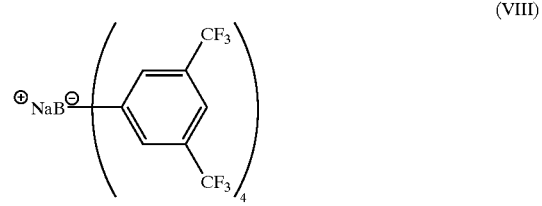

(VIII)

Examples of the borane compounds include:
decaborane(14);
salts of anions, such as bis[tri(n-butyl)ammonium] nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium] decachlorodecaborate and bis[tri(n-butyl) ammoniumldodecachlorododecaborate; and
salts of metallic borane anions, such as tri(n-butyl) ammoniumbis(dodecahydridododecaborate)cobaltate(III) and bis[tri(n-butyl)ammonium]bis (dodecahydridododecaborate)nickelate(III).

Examples of the carborane compounds include:
salts of anions, such as 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-1-carbadecaborate, tri(n-butyl) ammonium-1-carbaundecaborate, tri(n-butyl)ammonium-1-carbadodecaborate, tri(n-butyl)ammonium-1-trimethylsilyl-1-carbadecaborate, tri(n-butyl)

ammoniumbromo-1-carbadodecaborate, tri(n-butyl) ammonium-6-carbadecaborate(14), tri(n-butyl) ammonium-6-carbadecaborate(12), tri(n-butyl) ammonium-7-carbaundecaborate(13), tri(n-butyl) ammonium-7,8-dicarbaundecaborate(12), tri(n-butyl) ammonium-2,9-dicarbaundecaborate(12), tri (n-butyl) ammoniumdodecahydrido-8-methyl-7,9-dicarbaundecaborate, tri(n-butyl) ammoniumundecahydrido-8-ethyl-7,9-dicarbaundecaborate, tri(n-butyl) ammoniumundecahydrido-8-butyl-7,9-dicarbaundecaborate, tri(n-butyl) ammoniumundecahydrido-8-allyl-7,9-dicarbaundecaborate, tri(n-butyl) ammoniumundecahydrido-9-trimethylsilyl-7,8-dicarbaundecaborate and tri(n-butyl) ammoniumundecahydrido-4,6-dibromo-7-carbaundecaborate; and salts of metallic carborane anions, such as tri(n-butyl) ammoniumbis(nonahydrido-1,3-dicarbanonaborate) cobaltate(III), tri(n-butyl)ammoniumbis(undecahydrido-7,8-dicarbaundecaborate)ferrate(III), tri(n-butyl) ammoniumbis(undecahydrido-7,8-dicarbaundecaborate) cobaltate(III), tri(n-butyl)ammoniumbis(undecahydrido-7,8-dicarbaundecaborate)nickelate(III), tri(n-butyl) ammoniumbis(undecahydrido-7,8-dicarbaundecaborate) cuprate(III), tri(n-butyl)ammoniumbis(undecahydrido-7,8-dicarbaundecaborate)aurate(III), tri(n-butyl) ammoniumbis(nonahydrido-7,8-dimethyl-7,8-dicarbaundecaborate)ferrate(III), tri(n-butyl) ammoniumbis(nonahydrido-7,8-dimethyl-7,8-dicarbaundecaborate)chromate(III), tri(n-butyl) ammoniumbis(tribromooctahydrido-7,8-dicarbaundecaborate)cobaltate(III), tris[tri(n-butyl) ammonium]bis(undecahydrido-7-carbaundecaborate) chromate(III), bis(tri(n-butyl)ammonium]bis (undecahydrido-7-carbaundecaborate)manganate(IV), bis [tri(n-butyl)ammonium]bis(undecahydrido-7-carbaundecaborate)cobaltate(III) and bis[tri(n-butyl) ammonium]bis(undecahydrido-7-carbaundecaborate) nickelate(IV).

The heteropoly compound comprises an atom of silicon, phosphorus, titanium, germanium, arsenic or tin and one or more atoms selected from vanadium, niobium, molybdenum and tungsten. Examples of such compounds include phosphovanadic acid, germanovanadic acid, arsenovanadic acid, phosphoniobic acid, germanoniobic acid, silicomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotaungstovanadic acid, phosphomolybdotungstovanadic acid, germanomolybdotungstovanadic acid, phosphomolybdotungstic acid, phosphomolybdoniobic acid, salts of these acids, for example, salts of these acids with metal of Group Ia or IIa of the periodic table, specifically lithium, sodium, potassium, rubidium, cesium, beryllium, magnesium, calcium, strontium and barium, organic salts of the above acids such as triphenylethyl salt, and isopoly compounds, but not limited thereto.

These heteropoly compounds and isopoly compounds may be used singly or in combination of two or more kinds, respectively.

The ionizing ionic compounds (B-3) mentioned above may be used singly or in combination of two or more kinds.

By the use of the olefin polymerization catalyst comprising the transition metal compound (A) according to the invention, olefin polymers having a high molecular weight can be obtained with a high polymerization activity. For example, in combination with a cocatalyst component, e.g., the organoaluminum oxy-compound (B-2) such as methylaluminoxane, the catalyst exhibits an extremely high polymerization activity for the olefin compounds. When the ionizing ionic compound (B-3) such as triphenylcarboniumtetrakis(pentafluorophenyl)borate is used as a cocatalyst component, olefin polymers having an extremely high molecular weight can be obtained with an excellent activity.

In the olefin polymerization catalysts of the invention, the below-described carrier (C) can optionally be used, in addition to the above-mentioned transition metal compound (A) and optionally at least one compound (B) selected from the organometallic compound (B-1), the organoaluminum oxy-compound (B-2) and the ionizing ionic compound (B-3).

(C) Carrier

The carrier (C) optioanlly used in the invention is an inorganic or organic compound in the form of granular or particulate solid. Preferable inorganic compounds include porous oxides, inorganic chlorides, clay, clay minerals and ion-exchange layered compounds.

Examples of the porous oxides include $SiO_2$, $Al_2O_3$, MgO, ZrO, $TiO_2$, $B_2O_3$, CaO, ZnO, BaO, $ThO_2$, and composite compounds or mixtures containing these oxides, such as natural or synheric zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are those each containing $SiO_2$ and/or $Al_2O_3$ as the main component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the porous oxides differ in their properties depending upon the type and the preparation process thereof, the carrier preferably used in the invention has a particle diameter of 10 to 300 μm, preferably 20 to 200 μm, a specific surface area of 50 to 1,000 $m^2$/g, preferably 100 to 700 $m^2$/g, and a pore volume of 0.3 to 3.0 $cm^3$/g. The carrier may be calcined at 100 to 1,000° C., preferably 150 to 700° C., prior to use, if necessary.

Examples of the inorganic chlorides employable in the invention include $MgCl_2$, $MgBr_2$, $MnCl_2$ and $MnBr_2$. In the invention, the inorganic chloride may be used as it is, or may be used after pulverized by, for example, a ball mill or an oscillating mill. The inorganic chloride may also be used as fine particles obtained by dissolving the inorganic chloride in a solvent such as alcohol and then precipitating with a precipitant.

The clay employable as a carrier in the invention is generally constituted mainly of clay minerals. The ion-exchange layered compounds employable as a carrier in the invention are compounds having a crystal structure wherein planes formed by ionic bonding or the like are laminated in parallel to one another with a weak bond strength, and the ions contained therein are exchangeable. Most of clay minerals are ion-exchange layered compounds. The clay, the clay minerals and the ion-exchange layered compounds employable in the invention are not limited to natural ones but include synthetic ones.

Examples of such clay, clay minerals and ion-exchange layered compounds include clay, clay minerals and ion crystalline compounds having layered crystal structures such as hexagonal closest packing type, antimony type, $CdCl_2$ type and $CdI_2$ type.

Particular examples of the clay and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Particular examples of the ion-exchange layered compounds include crystalline acidic salts of polyvalent metals, such as $\alpha$-Zr(HAsO$_4$)$_2$.H$_2$O, $\alpha$-Zr(HPO$_4$)$_2$, $\alpha$-Zr(KPO$_4$)$_2$.3H$_2$O, $\alpha$-Ti(HPO$_4$)$_2$, $\alpha$-Ti(HAsO$_4$)$_2$.H$_2$O, $\alpha$-Sn(HPO$_4$)$_2$.H$_2$O, $\gamma$-Zr(HPO$_4$)$_2$, $\gamma$-Ti(HPO$_4$)$_2$ and $\gamma$-Ti(NH$_4$PO$_4$)$_2$.H$_2$O.

The clay, the clay minerals and the ion-exchange layered compounds are preferably those having a pore volume, as measured on pores having a radius of not less than 20 Å by a mercury penetration method, of not less than 0.1 cc/g, and are particularly preferably those having a pore volume of 0.3 to 5 cc/g. The pore volume is measured on the pores having a radius of 20 to 3×10$^4$ Å by a mercury penetration method using a mercury porosimeter. If the carrier used has a pore volume, as measured on pores having a radius of not less than 20 Å, of less than 0.1 cc/g, high polymerization activity tends to be hardly obtained.

It is also preferable that the clay and the clay minerals to be used in the invention are subjected to chemical treatments. Any of treatments, for example, to remove impurities attached to the surface and to influence the crystal structure of the clay are employable. Examples of such chemical treatments include acid treatment, alkali treatment, salt treatment and organic substance treatment. The acid treatment can contribute to not only removing impurities from the surface but also eluting cations such as Al, Fe and Mg present in the crystal structure to increase the surface area. The alkali treatment can destroy crystal structure of clay to bring about change in the structure of the clay. The salt treatment and the organic substance treatment can produce, for example, ionic composites, molecular composites, or organic derivatives to change the surface area or the distance between layers.

The ion-exchange layered compound for use in the invention may be a layered compound in which the exchangeable ions between layers have been exchanged with other large and bulky ions utilizing ion exchange properties to enlarge the distance between the layers. The bulky ion plays a pillar-like roll to support the layer structure and is generally called a "pillar". Introduction of other substances between layers of a layered compound is called "intercalation". Examples of the guest compounds to be intercalated include cationic inorganic compounds, such as TiCl$_4$ and ZrCl$_4$; metallic alkoxides, such as Ti(OR)$_4$, Zr(OR)$_4$, PO(OR)$_3$ and B(OR)$_3$ (R is a hydrocarbon group or the like); and metallic hydroxide ions, such as [Al$_{13}$O$_4$(OH)$_{24}$]$^{7+}$, [Zr$_4$(OH)$_{14}$]$^{2+}$ and [Fe$_3$O(OCOCH$_3$)$_6$]$^+$.

These compounds may be used singly or in combination of two or more kinds.

The intercalation of these compounds may be carried out in the presence of polymers obtained by hydrolysis of metallic alkoxides such as Si(OR)$_4$, Al(OR)$_3$ and Ge(OR)$_4$ (R is a hydrocarbon group or the like) or in the presence of colloidal inorganic compounds such as SiO$_2$. Examples of the pillars include oxides produced by intercalation of the above-mentioned metallic hydroxide ions between layers, followed by dehydration under heating.

The clay, clay minerals and ion-exchange layered compounds mentioned above may be used as they are, or may be used after subjected to a treatment of ball milling, sieving or the like. Moreover, they may be used after subjected to water adsorption or dehydration under heating. The clay, clay minerals and ion-exchange layered compounds may be used singly or in combination of two or more kinds, respectively.

Of the above-mentioned materials, preferable are clay and clay minerals, and particularly preferable are montmorillonite, vermiculite, hectorite, tenorite and synthetic mica.

The organic compound is, for example, a granular or particulate solid compound having a particle diameter of 10 to 300 $\mu$m. Examples of such compounds include (co)polymers produced using an $\alpha$-olefin of 2 to 14 carbon atoms such as ethylene, propylene, 1-butene or 4-methyl-1-pentene as a main ingredient, (co)polymers produced using vinylcyclohexane or styrene as a main ingredient, and modified products thereof.

The olefin polymerization catalysts of the invention may further comprise the below-described specific organic compound (D), if necessary, in addition to the transition metal compound (A), at least one compound (B) selected from the organometallic compound (B-1), the organoaluminum oxycompound (B-2) and the ionizing ionic compound (B-3) and the carrier (C), said (B) and (C) being optionally used.

(D) Organic Compound Component

In the present invention, the organic compound component (D) is optionally used to improve polymerizability and properties of the resulting polymers. Examples of the organic compounds include alcohols, phenolic compounds, carboxylic acids, phosphorus compounds and sulfonates, but not limited thereto.

As the alcohols and the phenolic compounds, those represented by R$^{31}$—OH (R$^{31}$ is a hydrocarbon group of 1 to 50 carbon atoms or a halogenated hydrocarbon group of 1 to 50 carbon atoms) are generally used in the invention. The alcohols are preferably those of the above formula wherein R$^{31}$ is a halogenated hydrocarbon group. The phenolic compounds are preferably those wherein the $\alpha$,$\alpha$'-positions of the hydroxyl group are substituted with hydrocarbon groups of 1 to 20 carbon atoms.

As the carboxylic acids, those represented by R$^{32}$—COOH (R$^{32}$ is a hydrocarbon group of 1 to 50 carbon atoms or a halogenated hydrocarbon group of 1 to 50 carbon atoms, preferably a halogenated hydrocarbon group of 1 to 50 carbon atoms) are generally used in the invention.

As the phosphorus compounds, phosphoric acids having P—O—H bond, phosphates having P—OR bond and phosphine oxide compounds having P=O bond are preferably used in the invention.

The sulfonates used in the invention are those represented by the following formula (IX):

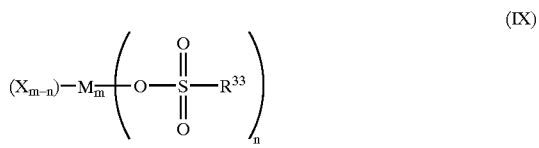

(IX)

wherein M is an atom of Group 1 to Group 14 of the periodic table; R$^{33}$ is hydrogen, a hydrocarbon group of 1 to 20 carbon atoms or a halogenated hydrocarbon group of 1 to 20 carbon atoms; X is a hydrogen atom, a halogen atom, a hydrocarbon group of 1 to 20 carbon atoms or a halogenated hydrocarbon group of 1 to 20 carbon atoms; m is an integer of 1 to 7; and $1 \leq n \leq 7$.

In FIG. 1, steps of a process for preparing an olefin polymerization catalyst of the invention are shown.

Next, the olefin polymerization process is described.

The olefin polymerization process according to the invention comprises (co)polymerizing an olefin in the presence of the catalyst described above.

In the polymerization, any method of feeding the component (A), as well as any method of using each components, and any method and order of feeding each component may be employed, and non-limiting examples thereof may be mentioned as follows.

(1) The component (A) and at least one component (B) selected from the organometallic compound (B-1), the organoaluminum oxy-compound (B-2) and the ionizing ionic compound (B-3) (simply referred to as "component (B)" hereinafter) are fed to the polymerization reactor in an arbitrary order.

(2) A catalyst obtained by previously contacting the component (A) with the component (B) is fed to the polymerization reactor.

(3) A catalyst component obtained by previously contacting the component (A) with the component (B), and the component (B) are fed to the polymerization reactor in an arbitrary order. In this case, the components (B) may be the same or different.

(4) A catalyst component wherein the component (A) is supported on the carrier (C), and the component (B) are fed to the polymerization reactor in an arbitrary order.

(5) A catalyst wherein the component (A) and the component (B) are supported on the carrier (C) is fed to the polymerization reactor.

(6) A catalyst component wherein the component (A) and the component (B) are supported on the carrier (C), and the component (B) are fed to the polymerization reactor in an arbitrary order. In this case, the components (B) may be the same or different.

(7) A catalyst component wherein the component (B) is supported on the carrier (C), and the component (A) are fed to the polymerization reactor in an arbitrary order.

(8) A catalyst component wherein the component (B) is supported on the carrier (C), the component (A) and the component (B) are fed to the polymerization reactor in an arbitrary order. In this case, the components (B) may be the same or different.

(9) A component wherein the component (A) is supported on the carrier (C), and a component wherein the component (B) is supported on the carrier (C) are fed to the polymerization reactor in an arbitrary order.

(10) A component wherein the component (A) is supported on the carrier (C), a component wherein the component (B) is supported on the carrier (C), and the component (B) are fed to the polymerization reactor in an arbitrary order. In this case, the components (B) may be the same or different.

(11) The component (A), the component (B) and the organic compound component (D) are fed to the polymerization reactor in an arbitrary order.

(12) A component obtained by previously contacting the component (B) with the component (D), and the component (A) are fed to the polymerization reactor in an arbitrary order.

(13) A component wherein the component (B) and the component (D) are supported on the carrier (C), and the component (A) are fed to the polymerization reactor in an arbitrary order.

(14) A catalyst component obtained by previously contacting the component (A) with the component (B), and the component (D) are fed to the polymerization reactor in an arbitrary order.

(15) A catalyst component obtained by previously contacting the component (A) with the component (B), the component (B) and the component (D) are fed to the polymerization reactor in an arbitrary order.

(16) A catalyst component obtained by previously contacting the component (A) with the component (B), and a component obtained by previously contacting the component (B) with the component (D) are fed to the polymerization reactor in an arbitrary order.

(17) A component wherein the component (A) is supported on the carrier (C), the component (B) and the component (D) are fed to the polymerization reactor in an arbitrary order.

(18) A component wherein the component (A) is supported on the carrier (C), and a component obtained by previously contacting the component (B) with the component (D) are fed to the polymerization reactor in an arbitrary order.

(19) A catalyst component obtained by previously contacting the component (A), the component (B) and the component (D) with one another are fed to the polymerization reactor in an arbitrary order.

(20) A catalyst component obtained by previously contacting the component (A), the component (B) and the component (D) with one another, and the component (B) are fed to the polymerization reactor in an arbitrary order. In this case, the components (B) maybe the same or different.

(21) A catalyst wherein the component (A), the component (B) and the component (D) are supported on the carrier (C) is fed to the polymerization reactor.

(22) A catalyst component wherein the component (A), the component (B) and the component (D) are supported on the carrier (C), and the component (B) are fed to the polymerization reactor in an arbitrary order. In this case, the components (B) may be the same or different.

An olefin may be prepolymerized onto the solid catalyst component wherein the component (A) and optionally the component (B) are supported on the carrier (C).

In the olefin polymerization process according to the invention, an olefin is polymerized or copolymerized in the presence of any of the above-described olefin polymerization catalysts to obtain an olefin polymer.

In the present invention, the polymerization can be carried out as any of liquid phase polymerization, such as solution polymerization or suspension polymerization, and gas phase polymerization.

Examples of inert hydrocarbon media for use in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent.

In the polymerization of an olefin using the olefin polymerization catalyst, the component (A) may be used in an amount of usually $10^{-12}$ to $10^{-2}$ mol, preferably $10^{-10}$ to $10^{-3}$ mol, based on 1 liter of the reaction volume. In the invention, an olefin can be polymerized with a high polymerization activity, even if the component (A) is used in a relatively low concentration.

The component (B-1) may be used in such an amount that the molar ratio of the component (B-1) to the transition metal atom (M) in the component (A) ((B-1)/(M)) becomes usually 0.01 to 100,000, preferably 0.05 to 50,000.

The component (B-2) may be used in such an amount that the molar ratio of the aluminum atom in the component (B-2) to the transition metal atom (M) in the component (A) ((B-2)/(M)) becomes usually 10 to 500,000, preferably 20 to 100,000.

The component (B-3) may be used in such an amount that the molar ratio of the component (B-3) to the transition metal atom (M) in the component (A) ((B-3)/(M)) becomes usually 1 to 10, preferably 1 to 5.

The component (D) may be used relative to the component (B) in such amounts that for the component (B-1) the molar ratio (D)/(B-1) becomes usually 0.01 to 10, preferably 0.1 to 5; for the component (B-2) the molar ratio of the component (D) to the aluminum atom in the component (B-2) ((D)/(B-2)) becomes usually 0.001 to 2, preferably 0.005 to 1; and for the component (B-3) the molar ratio (D)/(B-3) becomes usually 0.01 to 10, preferably 0.1 to 5.

In the olefin polymerization using the olefin polymerization catalyst, the polymerization temperature may be in the range of usually −50 to 200° C., preferably 0 to 170° C. The polymerization pressure may be in the range of usually atmospheric pressure to 100 kg/cm$^2$, preferably atmospheric pressure to 50 kg/cm$^2$. The polymerization reaction can be carried out by any of batchwise, semi-continuous and continuous processes. The polymerization can also be conducted in two or more separate stages under different reaction conditions.

The molecular weight of the resulting olefin polymer can be regulated by allowing hydrogen to exist in the polymerization system or by changing the polymerization temperature. The molecular weight can also be regulated by changing the type of the component (B).

Examples of the olefins which can be polymerized by the use of the olefin polymerization catalyst include:

α-olefins of 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene;

cycloolefins of 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene;

polar monomers, e.g., α,β-unsaturated carboxylic acids, such as acrylic acid, methacrylic acid, fumaric acid, maleic anhydride, itaconic acid, itaconic anhydride and bicyclo[2.2.1]-5-heptene-2,3-dicarboxylic acid; metallic salts of these acids, such as sodium salts, potassium salts, lithium salts, zinc salts, magnesium salts and calcium salts; α,β-unsaturated carboxylic esters, such as methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate; vinyl esters, such as vinyl acetate, vinyl propionate, vinyl caproate, vinyl caprate, vinyl laurate, vinyl stearate and vinyl trifluoroacetate; and unsaturated glycidyl esters, such as glycidyl acrylate, glycidyl methacrylate and monoglycidyl itaconate; and hologenated olefins, such as vinyl chloride, vinyl fluoride and allyl fluoride.

Vinylcyclohexane, dienes and polyenes are also employable.

The dienes and the polyenes cyclic or chain compounds having 4 to 30 carbon atoms, preferably 4 to 20 carbon atoms, and having two or more double bonds. Examples of such compounds include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene and 5,9-dimethyl-1,4,8-decatriene.

Aromatic vinyl compounds are also employable. Examples of such compounds include styrene, mono- or polyalkylstyrenes, such as o-methylstyrene, m-methylstyrene, p-methylstyrene, o,p-dimethylstyrene, m-methylstyrene, p-methylstyrene, o,p-dimethylstyrene, o-ethylstyrene, m-ethylstyrene and p-ethylstyrene; functional group-containing styrene derivatives, such as methoxystyrene, ethoxystyrene, vinylbenzoic acid, methyl vinylbenzoate, vinylbenzyl acetate, hydroxystyrene, o-chlorostyrene, p-chlorostyrene and divnylbenzene; and other compounds, such as 3-phenylpropylene, 4-phenylpropylene and α-methylstyrene.

The olefin polymerization catalysts of the invention exhibit high polymerization activities, and by the use of the catalysts, polymers having narrow molecular weight distribution can be obtained. When two or more kinds of olefins are copolymerized, olefin copolymers having narrow composition distribution can be obtained.

The olefin polymerization catalysts of the invention can also be used for copolymerization of an α-olefin and a conjugated diene.

Examples of the α-olefins used herein include the same straight-chain or branched α-olefins of 2 to 20 carbon atoms as previously described. Of those, preferable are ethylene, propylene, 1-butene, 1-pentene, 1-hexene, 4-methyl-1-pentene and 1-octene. Particularly preferable are ethylene and propylene. These α-olefins can be used singly or in combination or two or more kinds.

Examples of the conjugated dienes include aliphatic conjugated dienes of 4 to 30 carbon atoms, preferably 4 to 20 carbon atoms, such as 1,3-butadiene, isoprene, chloroprene, 1,3-cyclohexadiene, 1,3-pentadiene, 4-methyl-1,3-pentadiene, 1,3-hexadiene and 1,3-octadiene. These conjugated dienes can be used singly or in combination of two or more kinds.

In the invention, an α-olefin and a polar monomer, for example those described above, can also be copolymerized.

Further, in the present invention, an α-olefin and a non-conjugated diene or polyene can also be copolymerized. Examples of the non-conjugated dienes and polyenes include 1,4-pentadiene, 1,5-hexadiene, 1,4-hexadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene and 5,9-dimethyl-1,4,8-decatriene.

Next, a process for preparing the transition metal compound is described.

Process for Preparing Transition Metal Compound

The transition metal compound for use in the invention can be prepared without any specific limitation, for example, by the following process.

The ligand precursors used are, for example, the compounds of the formulas (a) to (d), and they can be obtained by reacting acylbenzene compounds wherein an oxygen atom, a sulfur atom or a nitrogen atom has been introduced into the o-position with aniline compounds or amine compounds, followed by reduction reaction of the imine moiety or addition reaction such as N-alkylation reaction. For example, when A in the aforesaid formulas is an oxygen atom, the ligand precursor can be synthesized by the following process.

(1) A salicyladlehyde compound or an o-formylaniline compound and a primary amine or an aniline compound having no substituent at the N can be dissolved in a solvent or directly mixed together, and then reacted at room temperature to reflux temperature for about 1 to 48 hours to produce the corresponding imine compound. Examples of the solvents employable herein include alcohols such as methanol and ethanol, and hydrocarbon solvents such as toluene. In the reaction, an acid catalyst such as formic acid, acetic acid or toluenesulfonic acid may be used. During the reaction, the removal of water from the reaction system by Dean and Stark method may be effective to proceed the reaction. Dehydrating agents such as molecular sieves, magnesium sulfate and sodium sulfate may also be used.

The resulting imine compound can be hydrogenated in the presence of a catalyst such as platinum, or using a hydrogenating agent such as lithium aluminum hydride or diisopropylaluminum, to produce the aforesaid compound (b) or (c) wherein D is —C($R^7$)($R^8$)—. Alternatively, the imine moiety can be subjected to addition reaction such as alkylation using for example an alkyl lithium or a Grignard reagent to produce the aforesaid compound (a) or (d) wherein D is —C($R^7$)($R^8$)—.

(2) Synthesis of Si-containing amine compound: For example, a halogenated silane compound which is obtained by ortho-silylation reaction of a phenolic compound or an aniline compound and which contains a phenyl group having an oxygen-, sulfur- or nitrogen-containing substituent at the o-position to Si, can be reacted with an amine compound or an aniline compound in a similar manner described above, followed by hydrogenation of the imine moiety in a similar manner described above, to produce the aforesaid compound (b) or (c) wherein D is —Si($R^9$)($R^{10}$)—. Alternatively, the imine moiety can be subjected to addition reaction such as alkylation, to produce the aforesaid compound (a) or (d) wherein D is —Si($R^9$)($R^{10}$)—.

(3) Synthesis of phosphorus-containing amine compound: For example, an oxy-halogenated phosphorus compound which is obtained by oxy-phosphorylation or phosphorylaiton reaction of a phenolic compound or an aniline compound at the o-position and which contains a phenyl group having an oxygen-, sulfur- or nitrogen-containing substituent at the o-position to PO or P, can be reacted with an amine compound or an aniline compound in a similar manner described above, followed by hydrogenating the imine moiety in a similar manner described above, to produce the aforesaid compound (b) or (c) wherein D is —P(O)($R^{11}$)— or —P($R^{12}$)—. Alternatively, the imine moiety can be subjected to addition reaction such as alkylation, to produce the aforesaid compound (a) or (d) wherein D is —P(O)($R^{11}$)— or —P($R^{12}$)—.

(4) Synthesis of SO-containing amine compound: For example, a halogenated thionyl compound which is obtained by ortho-thionylation of a phenolic compound or an aniline compound and which contains a phenyl group having an oxygen-, sulfur- or nitrogen-containing substituent at the opposition to SO, can be reacted with an amine compound or an aniline compound in a similar manner described above, followed by hydrogenating the imine moiety in a similar manner described above, to produce the aforesaid compound (b) or (c) wherein D is —SO—. Alternatively, the imine moiety can be subjected to addition reaction such as alkylation, to produce the aforesaid compound (a) or (d) wherein D is —SO—.

(5) Synthesis of S-containing amine compound: For example, a phenolic compound or an aniline compound having a halogenated sulfur group at the o-position can be reacted with an amine compound or an aniline compound in a similar manner described above, followed by hydrogenating the imine moiety in a similar manner described above, to produce the aforesaid compound (b) or (c) wherein D is —S—. Alternatively, the imine moiety can be subjected to addition reaction such as alkylation, to produce the aforesaid compound (a) or (d) wherein D is —S—.

(6) The compound (b) or (c) obtained by any of the above processes (1) to (5) can be subjected to iminyzation reaction using for example a compound containing a formyl group or a ketone group, to produce the aforesaid compound (a) or (d) wherein Z is =$NR^{17}$.

An example of synthesis routs of the ligand precursors is illustrated below.

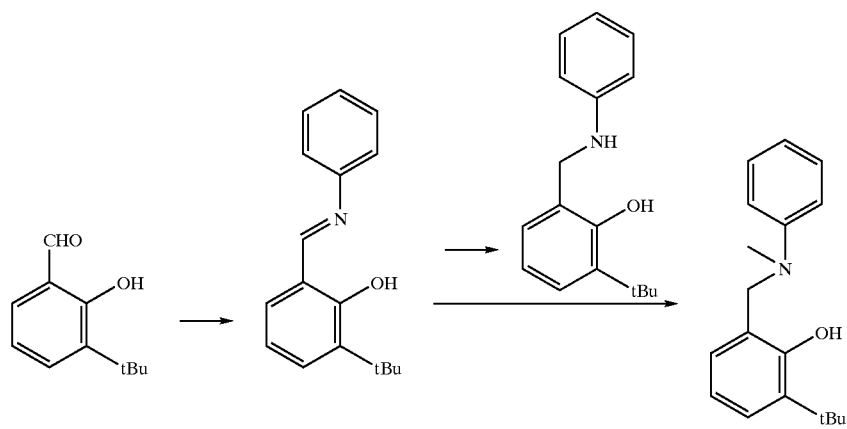

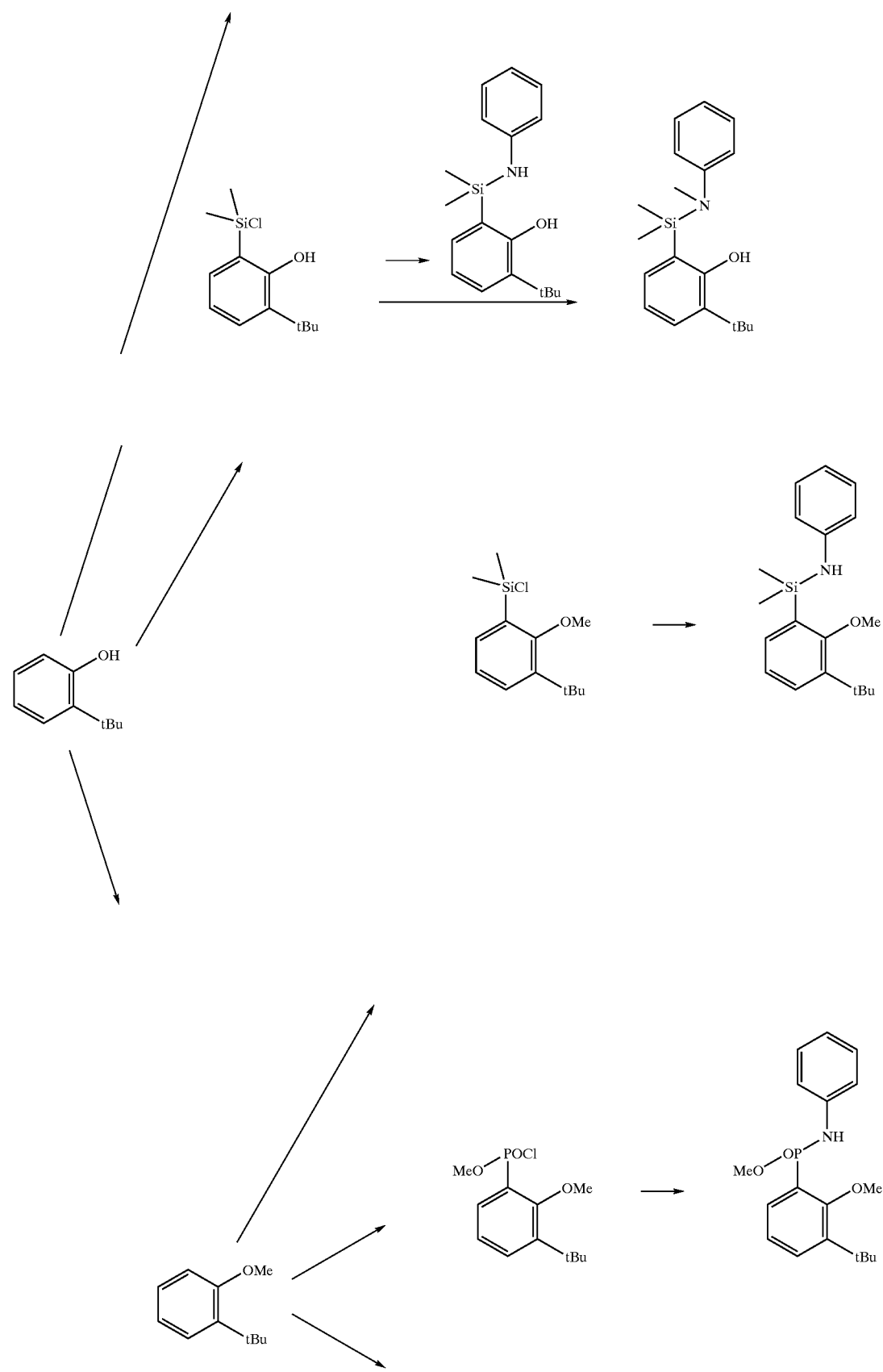

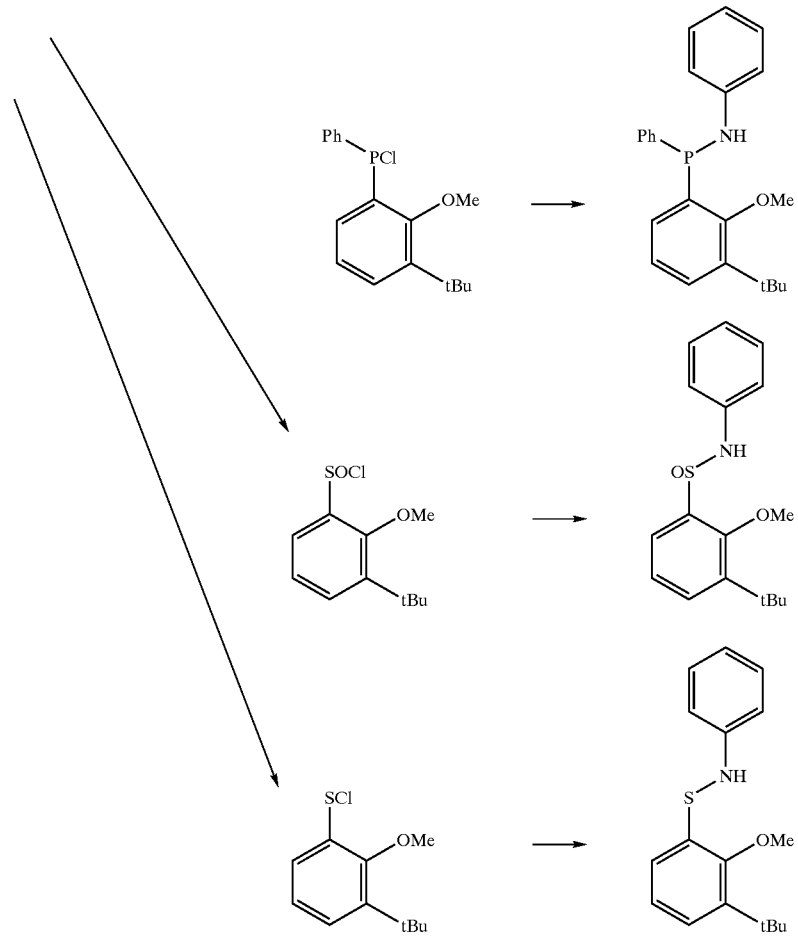

Then, the ligand precursor thus obtained can be reacted with a metal compound (e.g., the compound of the aforesaid formula MXk) to synthesize the corresponding transition metal compound. For example, the compound (a) can be anionized and then reacted with MXk to obtain the transition metal compound (I). Also, the compound (b) can be anionized and then reacted with MXk to obtain the transition metal compound (II). Similarly, the compound (c) can be dianionized and then reacted with MXk to obtain the transition metallic compound (III). The compound (d) can be reacted with MXk to obtain the transition metal compound (IV). The number of ligands, namely m in the formulas (I) to (IV), can be adjusted by changing the ratio of ligand to MXk to be used in the reaction.

More specifically, the synthesized ligand can be dissolved in a solvent, and if necessary, contacted with a base to prepare a salt, followed by mixing with a metallic compound such as a metallic halide or a metallic alkylate at a low temperature and stirring at a temperature of −78° C. to room temperature or under reflux for about 1 to 48 hours. As the solvents, those conventionally used for such reaction are employable. Above all, a polar solvent such as THF or a hydrocarbon solvent such as toluene is preferably employed. Examples of the bases used for preparing a salt include metallic salts such as lithium salts (e.g., n-butyllithium) and sodium salts (e.g., sodium hydride) and organic bases such as triethylamine and pyridine, but not limited thereto. The number of ligands to be reacted can be adjusted by changing the charge ratio between the transition metal M-containing compound and the ligand. In order to synthesize a transition metal compound wherein plural kinds of ligands are coordinated, a solution of two or more kinds of the compounds of the aforesaid formulas (a) to (d) in a solvent may be used to perform the reaction, or different kinds of the above compounds are successively added in the course of the reaction. By the change of the charge ratio between the compounds, the ratio between the corresponding ligands can be adjusted.

Depending upon properties of the compound, the ligand precursor can be directly reacted with the metallic compound without producing a salt, whereby the corresponding transition metal compound can be synthesized. For example, the compound of the formula (a), (b) or (c) can be reacted with the transition metal halide to prepare the corresponding transition metal compound, or the compound of the formula (d) can be reacted with the transition metal halide to prepare the corresponding transition metal compound.

It is also possible to exchange the metal M in the synthesized transition metal compound with another transition metal in a conventional manner. When any of $R^1$ to $R^{17}$ in the aforesaid formulas is H, a substituent other than H can be introduced in any stage of the synthesis process.

Further, an imine-containing metal complex compound can be reduced to prepare the corresponding amine-containing metal complex compound.

EFFECT OF THE INVENTION

According to the invention, olefin polymerization catalysts having high polymerization activities can be provided.

According to the olefin polymerization process of the invention, olefin (co)polymers can be produced with high polymerization activities.

EXAMPLE

The present invention is further described with reference to the following examples, but it should be construed that the invention is in no way limited to those examples.

The structures of the compounds obtained in the synthesis examples were determined by 270 MHz $^1$H-NMR (Japan Electron Optics Laboratory GSH-270 Model), FT-IR (SHIMAZU FTIR-8200 Model), FD-mass spectrometry (Japan Electron Optics Laboratory SX-102A Model), metal content analysis (analysis by ICP method after dry ashing and dissolution in dilute nitric acid, device: SHIMAZU ICPS-8000 Model), and elemental analysis for carbon, hydrogen and nitrogen (Helaus CHNO Model). The intrinsic viscosity (η) was measured in decalin at 135° C.

Examples of syntheses of the transition metal compounds for use in the invention and examples of the olefin polymerization processes are given below.

Synthesis Example 1

Synthesis of Ligand (L1)

3-t-Butylsalicylaldehyde was reacted with aniline in ethanol at room temperature to obtain the corresponding imine compound (yield: 95%).

Then, to a solution of 0.11 g (4.0 mmol) of the imine compound in 15 ml of THF was added a mixture of 0.47 g (2.0 mmol) of n-Bu$_2$SnH$_2$ and 0.63 g (2.0 mmol) of n-Bu$_2$SnCl$_2$ in a nitrogen atmosphere, and the resulting mixture was stirred for 20 minutes. To the mixture, 0.70 ml (4.0 mmol) of hexamethylphosphoramide (HMPA) and 0.25 ml (4.0 mmol) of methyl iodide were added, and they were stirred at 60° C. for 3 hours. The reaction solution was quenched with methanol and purified by means of a silica gel column to obtain 0.74 g (yield: 69%) of a ligand (L1) represented by the following formula.

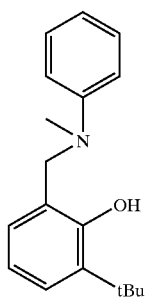

L1

FD-mass spectrometry: (M$^+$) 269
$^1$H-NMR (CDCl$_3$): 1.42 (s, 9H), 2.76 (s, 3H), 4.33 (s, 2H), 6.75–7.40 (m, 8H), 11.80 (s, 1H)

Synthesis of Compound (A-1)

To a 100 ml reactor thoroughly dried and purged with argon, 0.40 g (1.50 mmol) of the compound L1 and 10 ml of diethyl ether were introduced, and they were cooled to −78° C. and stirred. To the resulting mixture, 0.98 ml of n-butyllithium (1.60 mmol/ml-n-hexane solution, 1.58 mmol) was dropwise added over a period of 5 minutes, and they were slowly heated to room temperature and stirred at room temperature for 4 hours, to obtain a lithium salt solution. The solution was cooled to −78° C., and to the solution was slowly dropwise added 1.50 ml of a titanium tetrachloride solution (0.5 mmol/ml-heptane solution, 0.75 mmol). After the dropwise addition, the reaction solution was slowly heated to room temperature with stirring. The reaction solution was further stirred for another 4 hours at room temperature, and the solution was then concentrated under reduced pressure to precipitate a solid. The solid was dissolved in 20 ml of methylene chloride, and insolubles were removed. The filtrate obtained was concentrated under reduced pressure to precipitate a solid. The solid was washed with a mixed solution of diethyl ether and hexane, then further reslurried and washed with hexane, and vacuum dried to obtain 0.06 g (yield: 12%) of a compound (A-1) of brown powder represented by the following formula.

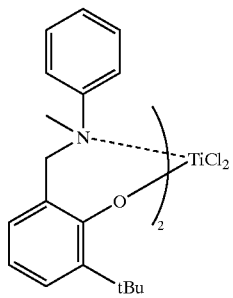

A-1

Elemental analysis:

Ti: 7.4% (7.3%)

( ): calculated value
$^1$H-NMR (CDCl$_3$): 1.46 (s, 18H), 3.24 (s, 6H), 4.55 (brs, 4H), 6.50–7.80, 7.25–7.70 (m, 16H)

Synthesis Example 2

Synthesis of Compound (B-1)

In a 100 ml reactor thoroughly dried and purged with argon, 0.56 g (2.1 mmol) of the compound L1 was dissolved in 15 ml of diethyl ether, and the resulting solution was cooled to −78° C. and stirred. To the solution, 1.36 ml of n-butyllithium (n-hexane solution, 1.60 N, 2.17 mmol) was dropwise added over a period of 5 minutes, and they were slowly heated to room temperature. The reaction solution was stirred at room temperature for 4 hours, and the solution was then slowly added to a solution of 0.39 g (1.03 mmol) of ZrCl$_4$.2THF complex in 15 ml of THF, which had been cooled to −78° C. After the addition, the reaction solution was slowly heated to room temperature and refluxed under heating for 4 hours. Then, the reaction solution was concentrated under reduced pressure to precipitate a solid. The solid was dissolved in 20 ml of methylene chloride, and insolubles were removed. The resulting methylene chloride solution was concentrated under reduced pressure to precipitate a solid. The solid was reprecipitated with a methylene chloride/hexene mixed solution, then further reslurried and washed with hexane, and vacuum dried to obtain 0.36 g (yield: 18%) of a compound (B-1) of yellow powder represented by the following formula.

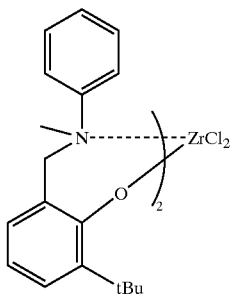

B-1

Elemental analysis:

Zr: 13.1% (13.0%)

( ): calculated value $^1$H-NMR (CDCl$_3$): 1.42 (s, 18H), 3.75 (s, 6H), 4.45 (brs, 4H), 6.40–7.00, 7.10–7.70 (m, 16H)

Synthesis Example 3

Synthesis of Ligand (L2)

3-t-Butylsalicylaldehyde was reacted with aniline in ethanol at room temperature to obtain the corresponding imine compound. Then, to a solution of 2.02 g (8.0 mmol) of the imine compound in 20 ml of methanol was slowly added a solution of 0.66 g (16.0 mmol) of NaBH$_4$ in 10 ml of methanol in a nitrogen atmosphere at room temperature, and they were stirred for 30 minutes. The reaction solution was quenched with ice water and purified by means of a silica gel column to obtain 2.01 g (yield: 99%) of a ligand (L2) of white crystals represented by the following formula.

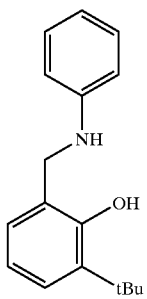

L2

FD-mass spectrometry: (M$^+$) 255

$^1$H-NMR (CDCl$_3$): 1.42 (s, 9H) , 4.13 (s, 2H), 6.75–7.30 (m, 8H)

Synthesis of Compound (A-2)

Using L2 synthesized above, a compound (A-2) of orange powder represented by the following formula was synthesized (yield: 7%) under the same conditions as in Synthesis Example 1.

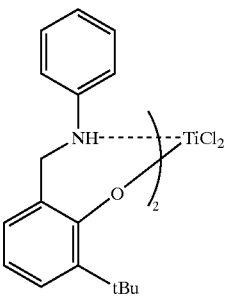

A-2

FD-mass spectrometry: (M$^+$) 626

Elemental analysis:

Ti: 7.8% (7.6%)

( ): calculated value

Synthesis Example 4

Synthesis of Compound (B-2)

Using L2 synthesized in Synthesis Example 3, a compound (B-2) of yellow powder represented by the following formula was synthesized (yield: 10%) under the same conditions as in Synthesis Example 2.

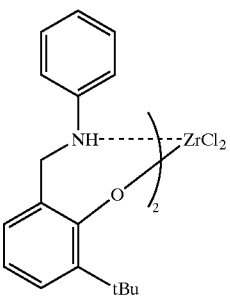

B-2

FD-mass spectrometry: (M$^+$) 669

Elemental analysis:

Zr: 13.3% (13.6%)

( ): calculated value

Synthesis Example 5

Synthesis of Compound (A-3)

To a 100 ml reactor thoroughly dried and purged with argon, 0.38 g (1.50 mmol) of the compound L2 synthesized in Synthesis Example 3 and 10 ml of diethyl ether were introduced, and they were cooled to −78° C. and stirred. To the mixture, 1.92 ml of n-butyllithium (1.60 mmol/ml-n-hexane solution, 3.08 mmol) was dropwise added over a period of 5 minutes, and they were slowly heated to room temperature and stirred at room temperature for 4 hours, to obtain a lithium salt solution. The solution was cooled to −78° C., and to the solution was slowly dropwise added 3.0 ml of a titanium tetrachloride solution (0.5 mmol/ml-heptane solution, 1.50 mmol). After the dropwise addition, the reaction solution was slowly heated to room temperature with stirring. The reaction solution was further stirred for another 4 hours at room temperature, and the solution was then concentrated under reduced pressure to precipitate a solid. The solid was dissolved in 20 ml of methylene chloride, and insolubles were removed. The filtrate obtained was concentrated under reduced pressure to precipitate a solid. The solid was washed with a mixed solution of diethyl ether and hexane, then further reslurried and washed with hexane, and vacuum dried to obtain 0.47 g (yield: 84%) of a compound (A-3) of orange powder represented by the following formula.

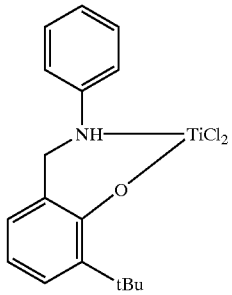

A-3

FD-mass spectrometry: (M⁺) 372

$^1$H-NMR (CDCl$_3$): 1.43 (s, 9H), 4.84 (brs, 2H), 6.50–6.80, 7.25–7.40 (m, 8H)

Elemental analysis:

Ti: 12.6% (12.9%)

( ): calculated value

Synthesis Example 6

Synthesis of Compound (B-3)

Using L2 synthesized in Synthesis Example 3 and ZrCl$_4$.2THF, a compound (B-3) of yellow powder represented by the following formula was synthesized (yield: 10%) under the same conditions as in Synthesis Example 5.

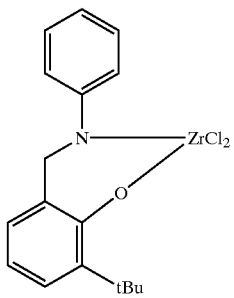

B-3

FD-mass spectrometry: (M⁺) 414

Elemental analysis:

Zr: 21.9% (22.0%)

( ): calculated value

Example 1

To a 500 ml glass autoclave thoroughly purged with nitrogen, 250 ml of toluene was introduced, and the liquid phase and the solid phase were saturated with 100 1/hr of ethylene. Then, 0.25 mmol of triisobutylaluminum (TIBA) was added, and subsequently 0.005 mmol of the compound A-1 and 0.006 mmol of triphenylcarbeniumtetrakis (pentafluorophenyl)borate (TrB) were added to initiate polymerization. The reaction was conducted at 25° C. for 30 minutes in an ethylene gas atmosphere at atmospheric pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for 10 hours to obtain 0.08 g of polyethylene.

The polymerization activity per 1 mol of titanium was 32 kg/mol.hr, and the polyethylene had an intrinsic viscosity (η) of 32.9 dl/g.

Example 2

To a 500 ml glass autoclave thoroughly purged with nitrogen, 250 ml of toluene was introduced, and the liquid phase and the solid phase were saturated with 100 1/hr of ethylene. Then, 1.1875 mmol (in terms of aluminum atom) of methylaluminoxane (MAO) was added, and subsequently 0.005 mmol of the compound B-1 obtained in Synthesis Example 2 was added to initiate polymerization. The reaction was conducted at 25° C. for 30 minutes in an ethylene gas atmosphere at atmospheric pressure. Then, a small amount of isobutanol was added to terminate the polymerization. After the polymerization was completed, the reaction mixture was introduced into a large amount of methanol to precipitate a total amount of a polymer. Then, hydrochloric acid was added, and the mixture was filtered through a glass filter. The resulting polymer was vacuum dried at 80° C. for ten hours to obtain 0.07 g of polyethylene.

The polymerization activity per 1 mol of zirconium was 28 kg/mol.hr, and the polyethylene had an intrinsic viscosity (η) of 22.8 dl/g.

Example 3

Using the compound B-1 obtained in Synthesis Example 2, polymerization reaction was conducted for 30 minutes under the same conditions as in Example 1. As a result, 0.14 g of polyethylene was obtained.

The polymerization activity per 1 mol of zirconium was 56 kg/mol.hr, and the polyethylene had an intrinsic viscosity (η) of 9.44 dl/g.

Example 4

Using the compound B-2 obtained in Synthesis Example 4, polymerization reaction was conducted for 30 minutes under the same conditions as in Example 1. As a result, 0.20 g of polyethylene was obtained.

The polymerization activity per 1 mol of zirconium was 80 kg/mol.hr, and the polyethylene had an intrinsic viscosity (η) of 4.20 dl/g.

Example 5

Using the compound A-2 obtained in Synthesis Example 3, polymerization reaction was conducted for 30 minutes under the same conditions as in Example 2. As a result, 0.03 g of polyethylene was obtained.

The polymerization activity per 1 mol of titanium was 12 kg/mol.hr.

Example 6

Using the compound A-3 obtained in Synthesis Example 4, polymerization reaction was conducted for 30 minutes under the same conditions as in Example 1. As a result, 0.17 g of polyethylene was obtained.

Example 7

Using the compound A-3 obtained in Synthesis Example 5, polymerization reaction was conducted for 30 minutes under the same conditions as in Example 2. As a result, 0.13 g of polyethylene was obtained.

The polymerization activity per 1 mol of titanium was 52 kg/mol.hr, and the polyethylene had an intrinsic viscosity (η) of 19.0 dl/g.

Example 8

Using the compound B-3 obtained in Synthesis Example 6, polymerization reaction was conducted for 30 minutes under the same conditions as in Example 2. As a result, 0.25 g of polyethylene was obtained.

The polymerization activity per 1 mol of titanium was 100 kg/mol.hr, and the polyethylene had an intrinsic viscosity (η) of 2.5 dl/g.

What is claimed is:

1. An olefin polymerization catalyst comprising:
   (A) a transition metal compound which is obtained by a bond-forming reaction of a compound represented by the following formula (a) with a metallic compound represented by the following formula (e) and in which the molar ratio of ligands to metal atoms is in the range of 1 to 6, said ligands being derived from the compound of the formula (a) and bonded to said metal atoms;

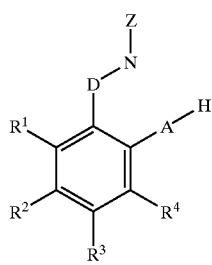

(a)

wherein
A is an oxygen atom, a sulfur atom, a selenium atom or a nitrogen atom having bonded to it a group —$R^5$,
D is —C($R^7$)($R^8$)—, —Si($R^9$)($R^{10}$)—, —P(O)($R^{11}$)—, —P($R^{12}$)—, —SO— or —S—,
Z is a group bonded to N and represents —$R^{13}R^{14}$, =C($R^{15}$)$R^{16}$ or =N$R^{17}$, and
$R^1$ to $R^5$ and $R^7$ to $R^{17}$ are the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring;

$MX_k$ (e)

wherein
M is a transition metal atom of Group 3 to Group 9 of the periodic table, palladium or Group 11 of the periodic table, k is a number satisfying the valence of M to make the compound neutral, and
X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when k is 2 or greater, plural groups X are the same or different, and may be bonded to each other to form a ring; and (B) at least one compound selected from the group consisting of:
   (B-1) an organometallic compound,
   (B-2) an organoaluminum oxy-compound, and
   (B-3) a compound which reacts with the transition metal compound (A) to form an ion pair.

2. An olefin polymerization catalyst comprising:
   (A) a transition metal compound which is obtained by a bond-forming reaction of a compound represented by the following formula (b) with a metallic compound represented by the following formula (e) and in which the molar ratio of ligands to metal atoms is in the range of 1 to 6, said ligands being derived from the compound of the formula (b) and bonded to said metal atoms;

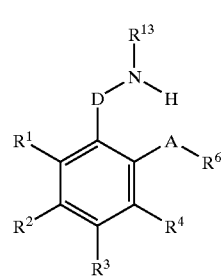

(b)

wherein
A is an oxygen atom, a sulfur atom, a selenium atom or a nitrogen atom having bonded to it a group —$R^5$,
D is —C($R^7$)($R^8$)—, —Si($R^9$)($R^{10}$)—, —P(O)($R^{11}$)—, —P($R^{12}$)—, —SO— or —S—, and
$R^1$ to $R^{13}$ are the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring;

$MX_k$ (e)

wherein
M is a transition metal atom of Group 3 to Group 9 of the periodic table, palladium, or Group 11 of the periodic table,
k is a number satisfying the valence of M to make the compound neutral, and
X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when k is 2 or greater, plural groups X are the same or different, and may be bonded to each other to form a ring; and (B) at least one compound selected from the group consisting of:
(B-1) an organometallic compound,
(B-2) an organoaluminum oxy-compound, and
(B-3) a compound which reacts with the transition metal compound (A) to form an ion pair.

3. An olefin polymerization catalyst comprising:
(A) a transition metal compound which is obtained by a bond-forming reaction of a compound represented by the following formula (c) with a metallic compound represented by the following formula (e) and in which the molar ratio of ligands to metal atoms is in the range of 1 to 6, said ligands being derived from the compound of the formula (c) and bonded to said metal atoms;

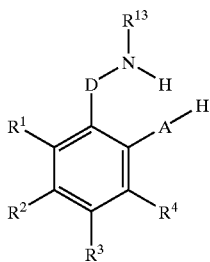

(c)

wherein
A is an oxygen atom, a sulfur atom, a selenium atom or a nitrogen atom having bonded to it a group —$R^5$,
D is —$C(R^7)(R^8)$—, —$Si(R^9)(R^{10})$—, —$P(O)(R^{11})$—, —$P(R^{12})$—, —SO— or —S—, and
$R^1$ to $R^5$ and $R^7$ to $R^{13}$ are the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring;

$MX_k$ (e)

wherein
M is a transition metal atom of Group 3 to Group 9 of the periodic table, palladium, or Group 11 of the periodic table,
k is a number satisfying the valence of M to make the compound neutral, and
X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when k is 2 or greater, plural groups X are the same or different, and may be bonded to each other to form a ring; and (B) at least one compound selected from the group consisting of:
(B-1) an organometallic compound,
(B-2) an organoaluminum oxy-compound, and
(B-3) a compound which reacts with the transition metal compound (A) to form an ion pair.

4. An olefin polymerization catalyst comprising:
(A) a transition metal compound which is obtained by a bond-forming reaction of a compound represented by the following formula (d) with a metallic compound represented by the following formula (e) and in which the molar ratio of ligands to metal atoms is in the range of 1 to 6, said ligands being derived from the compound of the formula (d) and bonded to said metal atoms:

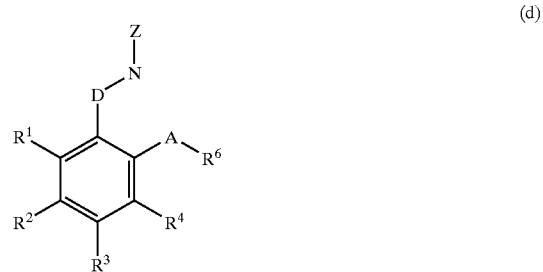

(d)

wherein
A is an oxygen atom, a sulfur atom, a selenium atom or a nitrogen atom having bonded to it a group —$R^5$,
D is —$C(R^7)(R^8)$—, —$Si(R^9)(R^{10})$, —$P(O)(R^{11})$—, —$P(R^{12})$—, —SO— or —S—,
Z is a group bonded to N and represents —$R^{13}R^{14}$, =$C(R^{15})R^{16}$ or =$NR^{17}$, and
$R^1$ to $R^{17}$ are the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, and two or more of them may be bonded to each other to form a ring;

$MX_k$ (e)

wherein
M is a transition metal atom of Group 3 to Group 9 of the periodic table, palladium, or Group 11 of the periodic table,
k is a number satisfying the valence of M to make the compound neutral, and
X is a hydrogen atom, a halogen atom, a hydrocarbon group, an oxygen containing group, a sulfur containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when k is 2 or greater, plural groups X are the same or different, and may be bonded to each other to form a ring; and (B) at least one compound selected from the group consisting of:
(B-1) an organometallic compound,
(B-2) an organoaluminum oxy-compound, and
(B-3) a compound which reacts with the transition metal compound (A) to form an ion pair.

5. An olefin polymerization catalyst comprising:
(A) a transition metal compound represented by the following formula (I):

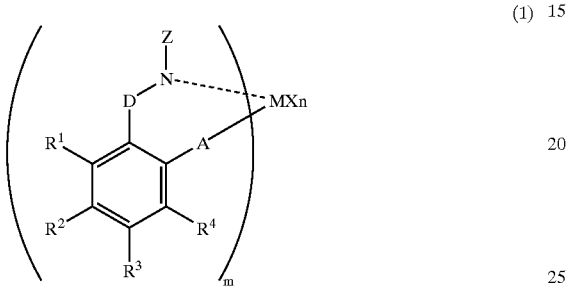

(1)

wherein
M is a transition metal atom of Group 3 to Group 11 of the periodic table, wherein $MX_n$ is bonded to at least one ligand as shown above, wherein
m is an integer of 1 to 6,
A is an oxygen atom, a sulfur atom, a selenium atom or a nitrogen atom having bonded to it a group $—R^5$,
D is $—C(R^7)(R^8)—$, $—Si(R^9)(R^{10})—$, $—P(O)(R^{11})—$, $—P(R^{12})—$, $—SO—$ or $—S—$,
Z is a group bonded to N and represents $—R^{13}R^{14}$, $=C(R^{15})R^{16}$ or $=NR^{17}$,
$R^1$ to $R^5$ and $R^7$ to $R^{17}$ are the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them may be bonded to each other to form a ring, and when m is a plural number, one group of $R^1$ to $R^5$ and $R^7$ to $R^{17}$ contained in one ligand and one group of $R^1$ to $R^5$ and $R^7$ to $R^{17}$ contained in other ligands may be bonded to each other,
n is a number satisfying the valence of M, and
X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or great, plural groups X are the same or different, and may be bonded to each other to form a ring; and (B) at least one compound selected from the group consisting of:
(B-1) an organometallic compound,
(B-2) an organoaluminum oxy-compound, and
(B-3) a compound which reacts with the transition metal compound (A) to form an ion pair.

6. An olefin polymerization catalyst comprising:
(A) a transition metal compound represented by the following formula (II):

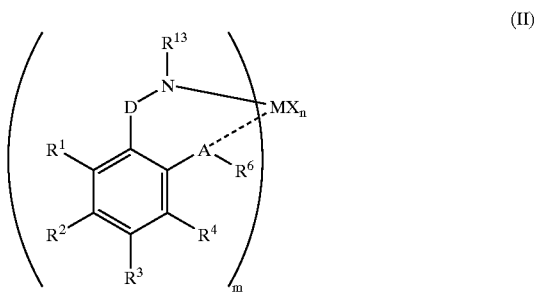

(II)

wherein
M is a transition metal atom of Group 3 to Group 11 of the periodic table, wherein $MX_n$ is bonded to at least one ligand as shown above, wherein
m is an integer of 1 to 6,
A is an oxygen atom, a sulfur atom, a selenium atom or a nitrogen atom having bonded to it a group $—R^5$,
D is $—C(R^7)(R^8)—$, $—Si(R^9)(R^{10})—$, $—P(O)(R^{11})—$, $—P(R^{12})—$, $—SO—$ or $—S—$,
$R^1$ to $R^{13}$ are the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them may be bonded to each other to form a ring, and when m is a plural number, one group of $R^1$ to $R^{13}$ contained in one ligand and one group of $R^1$ to $R^{13}$ contained in other ligands may be bonded to each other,
n is a number satisfying the valence of M, and
X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or great, plural groups X are the same or different, and may be bonded to each other to form a ring; and (B) at least one compound selected from the group consisting of:
(B-1) an organometallic compound,
(B-2) an organoaluminum oxy-compound, and
(B-3) a compound which reacts with the transition metal compound (A) to form an ion pair.

7. An olefin polymerization catalyst comprising:

(A) a transition metal compound represented by the following formula (III):

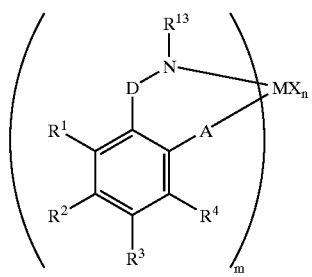

(III)

wherein

M is a transition metal atom of Group 3 to Group 11 of the periodic table, wherein $MX_n$ is bonded to at least one ligand as shown above, wherein m is an integer of 1 to 3, A is an oxygen atom, a sulfur atom, a selenium atom or a nitrogen atom having bonded to it a group —$R^5$, D is —$C(R^7)(R^8)$—, —$Si(R^9)(R^{10})$—, —$P(O)(R^{11})$—, —$P(R^{12})$—, —SO— or —S—, $R^1$ to $R^5$ and $R^7$ to $R^{13}$ are the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them may be bonded to each other to form a ring, and when m is a plural number, one group of $R^1$ to $R^5$ and $R^7$ to $R^{13}$ contained in one ligand and one group of $R^1$ to $R^5$ and $R^7$ to $R^{13}$ contained in other ligands may be bonded to each other, n is a number satisfying the valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or great, plural groups X are the same or different, and may be bonded to each other to form a ring; and (B) at least one compound selected.from the group consisting of:

(B-1) an organometallic compound, (B-2) an organoaluminum oxy-compound, and (B-3) a compound which reacts with the transition metal compound (A) to form an ion pair.

8. An olefin polymerization catalyst comprising:

(A) a transitional metal compound represented by the following formula (IV):

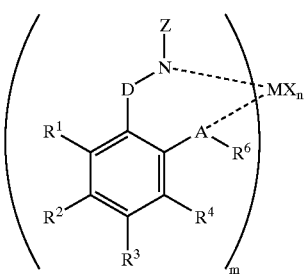

(IV)

wherein

M is a transition metal atom of Group 3 to Group 9 of the periodic table, palladium, or Group 11 of the periodic table, wherein $MX_n$ is bonded to at least one ligand as shown above, wherein m is an integer of 1 to 6, A is an oxygen atom, a sulfur atom, a selenium atom or a nitrogen atom bonded to a —$R^5$, D is —$C(R^7)(R^8)$—, —$Si(R^9)(R^{10})$—, —$P(O)(R^{11})$—, —$P(R^{12})$—, —SO— or —S—, Z is a group bonded to N and represents $R^{13}R^{14}$, =$C(R^{15})R^{16}$ or =$NR^{17}$, $R^1$ to $R^{17}$ may be the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them are bonded to each other to form a ring, and when m is a plural number, one group of $R^1$ to $R^{17}$ contained in one ligand and one group of $R^1$ to $R^{17}$ contained in other ligands may be bonded to each other, n is a number satisfying the valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual. group, a silicon-containing group, a germanium-containing group or a tin-containing group, and when n is 2 or greater, plural groups X are the same or different, and may be bonded to each other to form a ring; and (B) at least one compound selected from the group consisting of:

(B-1) an organometallic compound, (B-2) an organoaluminum oxy-compound, and (B-3) a compound which reacts with the transition metal compound (A) to form an ion pair.

9. An olefin polymerization catalyst comprising:

(A) a transition metal compound represented by the following formula (V):

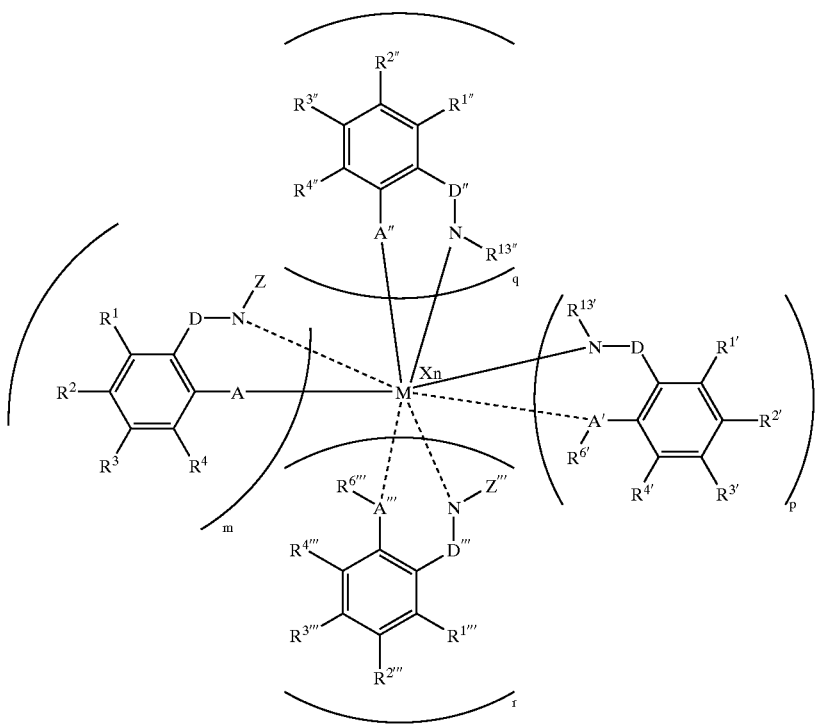

(V)

wherein

M is a transition metal atom of Group 3 to Group 11 of the periodic table, wherein $MX_n$ is bonded to at least one ligand as shown above, wherein m is an integer of 0 to 2, p is an integer of 0 to 2, q is an integer of 0 to 2, r is an integer of 0 to 2, three or more of them are not 0 at the same time, and they are numbers satisfying the conditions of m+p+q+r≦6 and m+p+2q≦6, A, A', A" and A''' are the same or different and are each an oxygen atom, a sulfur atom, a selenium atom or a nitrogen atom having bonded to it a group —$R^5$ (or —$R^{5'}$, '$R^{5"}$ and —$R^{5'''}$ correspondingly to A', A" and A''', respectively, and the same shall apply hereinafter), D, D', D" and D''' are the same or different and are each —$C(R^7)(R^8)$—, —$Si(R^9)(R^{10})$—, —$P(O)(R^{11})$—, —$P(R^{12})$—, —SO— or —S—, Z and Z''' are the same or different, and each of them is a group bonded to N and represents $R^{13}R^{14}$, =$C(R^{15})R^{16}$ or =$NR^{17}$, $R^1$ to $R^5$ and $R^7$ to $R^{17}$, $R^{1'}$ to $R^{13'}$, $R^{1"}$ to $R^{5"}$ and $R^{7"}$ to $R^{13"}$, or $R^{1'''}$ to $R^{17'''}$ are the same or different and are each a hydrogen atom, a halogen atom, a hydrocarbon group, a heterocyclic compound residual group, an oxygen-containing group, a nitrogen-containing group, a boron-containing group, an aluminum-containing group, a sulfur-containing group, a phosphorus-containing group, a silicon-containing group, a germanium-containing group or a tin-containing group, two or more of them may be bonded to each other to form a ring, and in the case of m+p+q+r≧2, one group of $R^1$ to $R^5$ and $R^7$ to $R^{17}$, $R^{1'}$ to $R^{13'}$, $R^{1"}$ to $R^{5"}$ and $R^{7"}$ to $R^{13"}$, or $R^{1'''}$ to $R^{17'''}$ contained in one ligand and one group of $R^1$ to $R^5$ and $R^7$ to $R^{17}$, $R^{1'}$ to $R^{13'}$, $R^{1"}$ to $R^{5"}$ and $R^{7"}$ to $R^{13"}$, or $R^{1'''}$ to $R^{17'''}$ contained in other ligands may be bonded to each other, n is a number satisfying the valence of M, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, plural groups X are the same or different, and may be bonded to each other to form a ring; and (B) at least one compound selected from the group consisting of:
 (B-1) an organometallic compound,
 (B-2) an organoaluminum oxy-compound, and
 (B-3) a compound which reacts with the transition metal compound (A) to form an ion pair.

10. An olefin polymerization catalyst as claimed in any one of claims 2, 4, 6 and 8 wherein $R^6$ is a hydrogen atom, a halogen atom, a hydrocarbon group, a heterocyclic compound residual group, an oxygen-containing group, a nitrogen-containing group, a boron-containing group, an aluminum-containing group, a sulfur-containing group, a silicon-containing group, a germanium-containing group or a tin-containing group.

11. An olefin polymerization catalyst as claimed in any one of claims 1 to 8, wherein the M is a metal atom of Group 11 of the periodic table.

12. The olefin polymerization catalyst as claimed in any one of claims 1 to 9, which catalyst further comprises a carrier (C).

13. An olefin polymerization process comprising polymerizing or copolymerizing an olefin in the presence of the olefin polymerization catalyst as claimed in any one of claims 1 to 9.

14. An olefin polymerization catalyst as claimed in any one of claims 1 to 8, wherein the M is a metal atom selected from the group consisting of Group 3 to Group 5, Group 8, Group 9 of the periodic table, and Palladium.

15. An olefin polymerization catalyst as claimed in any one of claims 1 to 8, wherein the M is a metal atom selected from the group consisting of titanium, zirconium, hafnium, vanadium, niobium, tantalum, iron, cobalt and rhodium.

16. An olefin polymerization catalyst as claimed in any one of claims 1 to 8, wherein the M is a metal atom of Group 6 of the periodic table.

17. The olefin polymerization catalyst as claimed in claim 1, wherein the transition metal compound (A) is a compound represented by formula (a), wherein D is —$C(R^7)(R^8)$.

18. The olefin polymerization catalyst as claimed in claim 2, wherein the transition metal compound (A) is a compound represented by formula (b), wherein D is —$C(R^7)(R^8)$.

19. The olefin polymerization catalyst as claimed in claim 3, wherein the transition metal compound (A) is a compound represented by formula (c), wherein D is is —$C(R^7)(R^8)$.

20. The olefin polymerization catalyst as claimed in claim 4, wherein the transition metal compound (A) is a compound represented by formula (d), wherein D is —$C(R^7)(R^8)$.

21. The olefin polymerization catalyst as claimed in claim 5, wherein the transition metal compound (A) is a compound represented by formula (I), wherein D is —$C(R^7)(R^8)$.

22. The olefin polymerization catalyst as claimed in claim 6, wherein the transition metal compound (A) is a compound represented by formula (II), wherein D is —$C(R^7)(R^8)$.

23. The olefin polymerization catalyst as claimed in claim 7, wherein the transition metal compound (A) is a compound represented by formula (III), wherein D is —$C(R^7)(R^8)$.

24. The olefin polymerization catalyst as claimed in claim 8, wherein the transition metal compound (A) is a compound represented by formula (IV), wherein D is —$C(R^7)(R^8)$.

25. The olefin polymerization catalyst as claimed in claim 9, wherein the transition metal compound (A) is a compound represented by formula (V), wherein D, D', D" and D'" are —$C(R^7)(R^8)$.

* * * * *